US008058903B2

(12) United States Patent
Zhao et al.

(10) Patent No.: US 8,058,903 B2
(45) Date of Patent: Nov. 15, 2011

(54) APPARATUS FOR PROVIDING A COMBINED DIGITAL SIGNAL

(75) Inventors: Jian Zhao, Zurich (CH); Marc Kuhn, Zurich (CH); Armin Wittneben, Niederrohrdorf (CH); Gerhard Bauch, Munich (DE)

(73) Assignee: NTT DoCoMo, Inc., Tokyo (JP)

( * ) Notice: Subject to any disclaimer, the term of this patent is extended or adjusted under 35 U.S.C. 154(b) by 0 days.

(21) Appl. No.: 12/701,196

(22) Filed: Feb. 5, 2010

(65) Prior Publication Data

US 2010/0201398 A1 Aug. 12, 2010

(30) Foreign Application Priority Data

Feb. 11, 2009 (EP) .................................... 09001925

(51) Int. Cl.
*H04J 99/00* (2009.01)
*H04B 7/15* (2006.01)

(52) U.S. Cl. .......................................... 326/52; 708/700

(58) Field of Classification Search .................... 326/52, 326/54, 105; 708/700, 702, 714
See application file for complete search history.

(56) References Cited

U.S. PATENT DOCUMENTS 6,055,557 A * 4/2000 Beck et al. .................... 708/700
2009/0268662 A1* 10/2009 Larsson et al. ................ 370/328

FOREIGN PATENT DOCUMENTS

WO WO-2006/071187 A2 7/2006
WO WO-2008/108708 A1 9/2008
WO WO-2008/109538 A1 9/2008

OTHER PUBLICATIONS

R. Ahlswede, "Multi-way communication channels," in *Proc. 2nd IEEE Int. Symposium on Inf. Theory*. Thakadsor, Armenian SSR: Akademiai Kiado, Budapest, Sep. 1971, pp. 23-52.
Liao, "Multiple access channels," Ph.D. dissertation, University of Hawaii, 1972.
Xie L.-L. Xie, "Network coding and random binning for multi-user channels," in *Proc. of the 10th Canadian Workshop on Information Theory*, Edmonton, Alberta, Canada, Jun. 6-8, 2007, pp. 85-88.
I. Hammerstroem, M. Kuhn, C. Esli, J. Zhao, A. Wittneben, and G. Bauch, "MIMO two-way relaying with transmit CSI at the relay," in *Proc. SPAWC*, Helsinki, Finland, Jun. 17-20, 2007.

(Continued)

*Primary Examiner* — Daniel D Chang
(74) *Attorney, Agent, or Firm* — Nutter McClennen & Fish LLP; John J. Penny, V.

(57) ABSTRACT

An apparatus for providing a combined digital signal comprises a bit adder and a combiner. The combined digital signal contains information of a first digital input signal and a second digital input signal, wherein a block length of the first digital input signal is shorter than a block length of the second digital input signal. The bit adder is configured to add at least one filling bit to a block of the first digital input signal to obtain an adapted first digital input signal, so that the block length of the adapted first digital input signal is equal to a block length of the second digital input signal. The combiner is configured to combine the adapted first digital input signal and the second digital input signal to obtain and provide the combined digital signal.

8 Claims, 56 Drawing Sheets

OTHER PUBLICATIONS

J. Zhao, M. Kuhn, A. Wittneben, and G. Bauch, "Optimum time-division in MIMO two-way decode-and-forward relaying systems," in *Proc. Asilomar Conf. Signals, Syst, Comput.*, Pacific Grove, CA, Oct. 26-Oct. 29, 2008.

B. Rankov and A. Wittneben, "Spectral efficient protocols for half-duplex fading relay channels," *IEEE J. Select. Areas Commun..*, vol. 25, No. 2, pp. 379-389, Feb. 2007.

R. F. Wyrembelski, T. J. Oechtering, I. Bjelakovic, C. Schnurr, and H. Boche, "Capacity of Gaussian MIMO bidirectional broadcast channels," in *IEEE Int. Symposium on Inf. Theory*, Toronto, Canada, Jul. 2008, pp. 584-588.

G. Ungerboeck, "Channel coding with multilevel/phase signals," *IEEE Trans. Inform. Theory*, vol. 28, No. 1, pp. 55-67, Jan. 1982.

N. Tran and H. Nguyen, "Multi-dimensional mappings of M-ary constellations for BICM-ID systems," in *Canadian Conference on Electrical and Computer Engineering*, pp. 135-138 May 2005.

L. Szczecinski, H. Chafnaji, and C. Hermosilla, "Modulation doping for iterative demapping of bit-interleaved coded modulation," *IEEE Commun. Lett.*, vol. 9, No. 12, pp. 1031-1033, 2005.

G. Caire, G. Taricco, and E. Biglieri, "Bit-interleaved coded modulation," *IEEE Trans. Inform. Theory*, vol. 44, No. 3, pp. 927-945, May 1998.

S. Baro, "Turbo detection for MIMO systems: bit labeling and pre-coding," *Europ. Trans. Telecommun.*, vol. 15, No. 4, pp. 343-350, 2004.

N. Muhammad and J. Speidel, "Design of multidimensional mappings for iterative MIMO detection with minimized bit error floor," Munich, Germany, Apr. 2006.

G. Pottie and D. Taylor, "Multilevel codes based on partitioning," *IEEE Trans. Inform. Theory*, vol. 35, No. 1, pp. 87-98, Jan. 1989.

S. Pietrobon and D. Costello, "Trellis coding with multidimensional QAM signal sets," *IEEE Trans. Inform. Theory*, vol. 39, No. 2, pp. 325-336, Mar. 1993.

ETSI, "Universal mobile telecommunications system (UMTS); multiplexing and channel coding (TDD)," Tech. Rep. 3GPP TS 25.222 version 4.2.0, Dec. 2001.

A. Chindapol and J. Ritcey, "Design, analysis, and performance evaluation for BICM-ID with square QAM constellations in rayleigh fading channels," *IEEE J. Select. Areas Commun.*, vol. 19, No. 5, pp. 944-957, May 2001.

A. C. X. Li and J. A. Ritcey, "Bit-interleaved coded modulation with iterative decoding and 8 PSK signaling," *IEEE Trans. Commun.*, vol. 50, No. 8, pp. 1250-1257, Aug. 2002.

X. Li and J. Ritcey, "Trellis-coded modulation with bit interleaving and iterative decoding," *J. Select. Areas Commun.*, vol. 17, No. 4, pp. 715-724, Apr. 1999.

N. Tran and H. Nguyen, "Design and performance of BICM-ID systems with hypercube constellations," *IEEE Trans. Wirel. Comm.*, vol. 5, No. 5, pp. 1169-1179, May 2006.

Signal mappings of 8-ary constellations for BICM-ID systems over a rayleigh fading channel, in Proc. IEEE Canadian Conf. on Elec. and Comp. Engineering, Niagra Falls, Canada, May 2004.

J. H. F. Schreckenbach, N. Gortz and G. Bauch, "Optimized symbol mappings for bit-interleaved coded modulation with iterative decoding," in *Proc. IEEE Global Comm. Conf.* (*GLOBECOM*), San Francisco, CA, Dec. 1-5, 2003.

European Search Report dated Aug. 24, 2009 issued in EP 09001925.8.

R. Ahlswede, "Multi-way communication channels," in *Proc. 2ndIEEE Int. Symposium on Inf. Theory.* Thakadsor, Armenian SSR: Akademiai Kiado, Budapest, Sep. 1971, pp. 23-52.

H. Liao, "Multiple access channels," Ph.D. dissertation, University of Hawaii, 1972.

Xie L.-L. Xie, "Network coding and random binning for multi-user channels," in *Proc. Of the 10thCanadian Workshop on Information Theory,* Edmonton, Alberta, Canada, Jun. 6-8, 2007, pp. 85-88.

T. J. Oechtering, C. Schnurr, I. Bjelakovic, and H. Boche, "Broadcast capacity region of two-phase bidirectional relaying," *IEEE Trans. Inform. Theory*, vol. 54, No. 1, pp. 454-458, Jan. 2008.

I. Hammerstroem, M. Kuhn, C. Esli, J. Zhao, A. Wittneben, and G. Bauch, "MIMO two-way relaying with transmit CSI at the relay," in *Proc. SPAWC*, Helsinki, Finland, Jun. 17-20, 2007.

Zhao, M. Kuhn, A. Wittneben, and G. Bauch, "Optimum time-division in MIMO two-way decode-and-forward relaying systems," in *Proc. Asilomar Conf. Signals, Syst, Comput.*, Pacific Grove, CA, Oct. 26-Oct. 29, 2008.

B. Rankov and a. Wittneben, "Spectral efficient protocols for half-duplex fading relay channels," *IEEE J. Select. Areas Commun.*, vol. 25, No. 2, pp. 379-389, Feb. 2007.

R. F. Wyrembelski, T. J. Oechtering, I. Bjelakovic, C. Schnurr, and H. Boche, "Capacity of Gaussian MIMO bidirectional broadcast channels," in *IEEE Int. Symposium on Inf. Theory*, Toronto, Canada, Jul. 2008, pp. 584-588.

G. Ungerboeck, "Channel coding with multilevel/phase signals," *IEEE Trans. Inform. Theory*, vol. 28, No. 1, pp. 55-67, Jan. 1982.

N. Tran and H. Nguyen, "Multi-dimensional mappings of M-ary constellations for BICM-ID systems," in *Canadian Conference on Electrical and Computer Engineering.*

* cited by examiner

FIG 17A encoding at relay

FIG 17B decoding at MS (weak link)

XOR at the receivers: they represent the "box plus" sum, i.e., they flip the sign of the soft inputs if the other input is bit "1"

FIG 17C decoding at BS (strong link)

XOR at the receivers: they represent the "box plus" sum, i.e., they flip the sign of the soft inputs if the other input is bit "1".

0.5 bit/16QAM transmission 1 bit/16QAM transmission

1bit/16QAM transmission 2 bits/16QAM transmission

| label d | symbol s | label d | symbol s | label d | symbol s | label d | symbol s |
|---|---|---|---|---|---|---|---|
| 00000000 | [0, 0; 1, 2] | 01000000 | [0, 0; 0, 3] | 10000000 | [0, 0; 1, 1] | 11000000 | [0, 0; 0, 0] |
| 00000001 | [0, 1; 3, 3] | 01000001 | [0, 1; 2, 2] | 10000001 | [0, 1; 3, 0] | 11000001 | [0, 1; 2, 1] |
| 00000010 | [0, 2; 1, 2] | 01000010 | [0, 2; 0, 3] | 10000010 | [0, 2; 1, 1] | 11000010 | [0, 2; 0, 0] |
| 00000011 | [0, 3; 3, 3] | 01000011 | [0, 3; 2, 2] | 10000011 | [0, 3; 3, 0] | 11000011 | [0, 3; 2, 1] |
| 00000100 | [1, 0; 3, 1] | 01000100 | [1, 0; 2, 0] | 10000100 | [1, 0; 3, 2] | 11000100 | [1, 0; 2, 3] |
| 00000101 | [1, 1; 1, 0] | 01000101 | [1, 1; 0, 1] | 10000101 | [1, 1; 1, 3] | 11000101 | [1, 1; 0, 2] |
| 00000110 | [1, 2; 3, 1] | 01000110 | [1, 2; 2, 0] | 10000110 | [1, 2; 3, 2] | 11000110 | [1, 2; 2, 3] |
| 00000111 | [1, 3; 1, 0] | 01000111 | [1, 3; 0, 1] | 10000111 | [1, 3; 1, 3] | 11000111 | [1, 3; 0, 2] |
| 00001000 | [2, 0; 0, 3] | 01001000 | [2, 0; 1, 2] | 10001000 | [2, 0; 0, 0] | 11001000 | [2, 0; 1, 1] |
| 00001001 | [2, 1; 2, 2] | 01001001 | [2, 1; 3, 3] | 10001001 | [2, 1; 2, 1] | 11001001 | [2, 1; 3, 0] |
| 00001010 | [2, 2; 0, 3] | 01001010 | [2, 2; 1, 2] | 10001010 | [2, 2; 0, 0] | 11001010 | [2, 2; 1, 1] |
| 00001011 | [2, 3; 2, 2] | 01001011 | [2, 3; 3, 3] | 10001011 | [2, 3; 2, 1] | 11001011 | [2, 3; 3, 0] |
| 00001100 | [3, 0; 2, 0] | 01001100 | [3, 0; 3, 1] | 10001100 | [3, 0; 2, 3] | 11001100 | [3, 0; 3, 2] |
| 00001101 | [3, 1; 0, 1] | 01001101 | [3, 1; 1, 0] | 10001101 | [3, 1; 0, 2] | 11001101 | [3, 1; 1, 3] |
| 00001110 | [3, 2; 2, 0] | 01001110 | [3, 2; 3, 1] | 10001110 | [3, 2; 2, 3] | 11001110 | [3, 2; 3, 2] |
| 00001111 | [3, 3; 0, 1] | 01001111 | [3, 3; 1, 0] | 10001111 | [3, 3; 0, 2] | 11001111 | [3, 3; 1, 3] |
| 00010000 | [0, 0; 3, 3] | 01010000 | [0, 0; 2, 2] | 10010000 | [0, 0; 3, 0] | 11010000 | [0, 0; 2, 1] |
| 00010001 | [0, 1; 1, 2] | 01010001 | [0, 1; 0, 3] | 10010001 | [0, 1; 1, 1] | 11010001 | [0, 1; 0, 0] |
| 00010010 | [0, 2; 3, 3] | 01010010 | [0, 2; 2, 2] | 10010010 | [0, 2; 3, 0] | 11010010 | [0, 2; 2, 1] |
| 00010011 | [0, 3; 1, 2] | 01010011 | [0, 3; 0, 3] | 10010011 | [0, 3; 1, 1] | 11010011 | [0, 3; 0, 0] |
| 00010100 | [1, 0; 1, 0] | 01010100 | [1, 0; 0, 1] | 10010100 | [1, 0; 1, 3] | 11010100 | [1, 0; 0, 2] |
| 00010101 | [1, 1; 3, 1] | 01010101 | [1, 1; 2, 0] | 10010101 | [1, 1; 3, 2] | 11010101 | [1, 1; 2, 3] |
| 00010110 | [1, 2; 1, 0] | 01010110 | [1, 2; 0, 1] | 10010110 | [1, 2; 1, 3] | 11010110 | [1, 2; 0, 2] |
| 00010111 | [1, 3; 3, 1] | 01010111 | [1, 3; 2, 0] | 10010111 | [1, 3; 3, 2] | 11010111 | [1, 3; 2, 3] |
| 00011000 | [2, 0; 2, 2] | 01011000 | [2, 0; 3, 3] | 10011000 | [2, 0; 2, 1] | 11011000 | [2, 0; 3, 0] |
| 00011001 | [2, 1; 0, 3] | 01011001 | [2, 1; 1, 2] | 10011001 | [2, 1; 0, 0] | 11011001 | [2, 1; 1, 1] |
| 00011010 | [2, 2; 2, 2] | 01011010 | [2, 2; 3, 3] | 10011010 | [2, 2; 2, 1] | 11011010 | [2, 2; 3, 0] |
| 00011011 | [2, 3; 0, 3] | 01011011 | [2, 3; 1, 2] | 10011011 | [2, 3; 0, 0] | 11011011 | [2, 3; 1, 1] |
| 00011100 | [3, 0; 0, 1] | 01011100 | [3, 0; 1, 0] | 10011100 | [3, 0; 0, 2] | 11011100 | [3, 0; 1, 3] |
| 00011101 | [3, 1; 2, 0] | 01011101 | [3, 1; 3, 1] | 10011101 | [3, 1; 2, 3] | 11011101 | [3, 1; 3, 2] |

| FIG 45 | FIG 45A |
|---|---|
| | FIG 45B |

FIG 45B

| | | | | | | | |
|---|---|---|---|---|---|---|---|
| 00011110 | [3, 2; 0, 1] | 01011110 | [3, 2; 1, 0] | 10011110 | [3, 2; 0, 2] | 11011110 | [3, 2; 1, 3] |
| 00011111 | [3, 3; 2, 0] | 01011111 | [3, 3; 3, 1] | 10011111 | [3, 3; 2, 3] | 11011111 | [3, 3; 3, 2] |
| 00100000 | [0, 0; 3, 1] | 01100000 | [0, 0; 2, 0] | 10100000 | [0, 0; 3, 2] | 11100000 | [0, 0; 2, 3] |
| 00100001 | [0, 1; 1, 0] | 01100001 | [0, 1; 0, 1] | 10100001 | [0, 1; 1, 3] | 11100001 | [0, 1; 0, 2] |
| 00100010 | [0, 2; 3, 1] | 01100010 | [0, 2; 2, 0] | 10100010 | [0, 2; 3, 2] | 11100010 | [0, 2; 2, 3] |
| 00100011 | [0, 3; 1, 0] | 01100011 | [0, 3; 0, 1] | 10100011 | [0, 3; 1, 3] | 11100011 | [0, 3; 0, 2] |
| 00100100 | [1, 0; 0, 3] | 01100100 | [1, 0; 1, 2] | 10100100 | [1, 0; 0, 0] | 11100100 | [1, 0; 1, 1] |
| 00100101 | [1, 1; 2, 2] | 01100101 | [1, 1; 3, 3] | 10100101 | [1, 1; 2, 1] | 11100101 | [1, 1; 3, 0] |
| 00100110 | [1, 2; 0, 3] | 01100110 | [1, 2; 1, 2] | 10100110 | [1, 2; 0, 0] | 11100110 | [1, 2; 1, 1] |
| 00100111 | [1, 3; 2, 2] | 01100111 | [1, 3; 3, 3] | 10100111 | [1, 3; 2, 1] | 11100111 | [1, 3; 3, 0] |
| 00101000 | [2, 0; 2, 0] | 01101000 | [2, 0; 3, 1] | 10101000 | [2, 0; 2, 3] | 11101000 | [2, 0; 3, 2] |
| 00101001 | [2, 1; 0, 1] | 01101001 | [2, 1; 1, 0] | 10101001 | [2, 1; 0, 2] | 11101001 | [2, 1; 1, 3] |
| 00101010 | [2, 2; 2, 0] | 01101010 | [2, 2; 3, 1] | 10101010 | [2, 2; 2, 3] | 11101010 | [2, 2; 3, 2] |
| 00101011 | [2, 3; 0, 1] | 01101011 | [2, 3; 1, 0] | 10101011 | [2, 3; 0, 2] | 11101011 | [2, 3; 1, 3] |
| 00101100 | [3, 0; 1, 2] | 01101100 | [3, 0; 0, 3] | 10101100 | [3, 0; 1, 1] | 11101100 | [3, 0; 0, 0] |
| 00101101 | [3, 1; 3, 3] | 01101101 | [3, 1; 2, 2] | 10101101 | [3, 1; 3, 0] | 11101101 | [3, 1; 2, 1] |
| 00101110 | [3, 2; 1, 2] | 01101110 | [3, 2; 0, 3] | 10101110 | [3, 2; 1, 1] | 11101110 | [3, 2; 0, 0] |
| 00101111 | [3, 3; 3, 3] | 01101111 | [3, 3; 2, 2] | 10101111 | [3, 3; 3, 0] | 11101111 | [3, 3; 2, 1] |
| 00110000 | [0, 0; 1, 0] | 01110000 | [0, 0; 0, 1] | 10110000 | [0, 0; 1, 3] | 11110000 | [0, 0; 0, 2] |
| 00110001 | [0, 1; 3, 1] | 01110001 | [0, 1; 2, 0] | 10110001 | [0, 1; 3, 2] | 11110001 | [0, 1; 2, 3] |
| 00110010 | [0, 2; 1, 0] | 01110010 | [0, 2; 0, 1] | 10110010 | [0, 2; 1, 3] | 11110010 | [0, 2; 0, 2] |
| 00110011 | [0, 3; 3, 1] | 01110011 | [0, 3; 2, 0] | 10110011 | [0, 3; 3, 2] | 11110011 | [0, 3; 2, 3] |
| 00110100 | [1, 0; 2, 2] | 01110100 | [1, 0; 3, 3] | 10110100 | [1, 0; 2, 1] | 11110100 | [1, 0; 3, 0] |
| 00110101 | [1, 1; 0, 3] | 01110101 | [1, 1; 1, 2] | 10110101 | [1, 1; 0, 0] | 11110101 | [1, 1; 1, 1] |
| 00110110 | [1, 2; 2, 2] | 01110110 | [1, 2; 3, 3] | 10110110 | [1, 2; 2, 1] | 11110110 | [1, 2; 3, 0] |
| 00110111 | [1, 3; 0, 3] | 01110111 | [1, 3; 1, 2] | 10110111 | [1, 3; 0, 0] | 11110111 | [1, 3; 1, 1] |
| 00111000 | [2, 0; 0, 1] | 01111000 | [2, 0; 1, 0] | 10111000 | [2, 0; 0, 2] | 11111000 | [2, 0; 1, 3] |
| 00111001 | [2, 1; 2, 0] | 01111001 | [2, 1; 3, 1] | 10111001 | [2, 1; 2, 3] | 11111001 | [2, 1; 3, 2] |
| 00111010 | [2, 2; 0, 1] | 01111010 | [2, 2; 1, 0] | 10111010 | [2, 2; 0, 2] | 11111010 | [2, 2; 1, 3] |
| 00111011 | [2, 3; 2, 0] | 01111011 | [2, 3; 3, 1] | 10111011 | [2, 3; 2, 3] | 11111011 | [2, 3; 3, 2] |
| 00111100 | [3, 0; 3, 3] | 01111100 | [3, 0; 2, 2] | 10111100 | [3, 0; 3, 0] | 11111100 | [3, 0; 2, 1] |
| 00111101 | [3, 1; 1, 2] | 01111101 | [3, 1; 0, 3] | 10111101 | [3, 1; 1, 1] | 11111101 | [3, 1; 0, 0] |
| 00111110 | [3, 2; 3, 3] | 01111110 | [3, 2; 2, 2] | 10111110 | [3, 2; 3, 0] | 11111110 | [3, 2; 2, 1] |
| 00111111 | [3, 3; 1, 2] | 01111111 | [3, 3; 0, 3] | 10111111 | [3, 3; 1, 1] | 11111111 | [3, 3; 0, 0] |

| FIG 45 | FIG 45A |
|---|---|
| | FIG 45B |

| label d | symbol s | label d | symbol s | label d | symbol s | label d | symbol s |
|---|---|---|---|---|---|---|---|
| 00000000 | [1, 1; 1, 0] | 01000000 | [1, 1; 0, 1] | 10000000 | [0, 0; 1, 1] | 11000000 | [0, 0; 0, 0] |
| 00000001 | [0, 0; 1, 2] | 01000001 | [0, 0; 0, 3] | 10000001 | [1, 1; 1, 3] | 11000001 | [1, 1; 0, 2] |
| 00000010 | [1, 0; 3, 1] | 01000010 | [1, 0; 2, 0] | 10000010 | [0, 1; 3, 0] | 11000010 | [0, 1; 2, 1] |
| 00000011 | [0, 1; 3, 3] | 01000011 | [0, 1; 2, 2] | 10000011 | [1, 0; 3, 2] | 11000011 | [1, 0; 2, 3] |
| 00000100 | [1, 3; 1, 0] | 01000100 | [1, 3; 0, 1] | 10000100 | [0, 2; 1, 1] | 11000100 | [0, 2; 0, 0] |
| 00000101 | [0, 2; 1, 2] | 01000101 | [0, 2; 0, 3] | 10000101 | [1, 3; 1, 3] | 11000101 | [1, 3; 0, 2] |
| 00000110 | [1, 2; 3, 1] | 01000110 | [1, 2; 2, 0] | 10000110 | [0, 3; 3, 0] | 11000110 | [0, 3; 2, 1] |
| 00000111 | [0, 3; 3, 3] | 01000111 | [0, 3; 2, 2] | 10000111 | [1, 2; 3, 2] | 11000111 | [1, 2; 2, 3] |
| 00001000 | [3, 1; 0, 1] | 01001000 | [3, 1; 1, 0] | 10001000 | [2, 0; 0, 0] | 11001000 | [2, 0; 1, 1] |
| 00001001 | [2, 0; 0, 3] | 01001001 | [2, 0; 1, 2] | 10001001 | [3, 1; 0, 2] | 11001001 | [3, 1; 1, 3] |
| 00001010 | [3, 0; 2, 0] | 01001010 | [3, 0; 3, 1] | 10001010 | [2, 1; 2, 1] | 11001010 | [2, 1; 3, 0] |
| 00001011 | [2, 1; 2, 2] | 01001011 | [2, 1; 3, 3] | 10001011 | [3, 0; 2, 3] | 11001011 | [3, 0; 3, 2] |
| 00001100 | [3, 3; 0, 1] | 01001100 | [3, 3; 1, 0] | 10001100 | [2, 2; 0, 0] | 11001100 | [2, 2; 1, 1] |
| 00001101 | [2, 2; 0, 3] | 01001101 | [2, 2; 1, 2] | 10001101 | [3, 3; 0, 2] | 11001101 | [3, 3; 1, 3] |
| 00001110 | [3, 2; 2, 0] | 01001110 | [3, 2; 3, 1] | 10001110 | [2, 3; 2, 1] | 11001110 | [2, 3; 3, 0] |
| 00001111 | [2, 3; 2, 2] | 01001111 | [2, 3; 3, 3] | 10001111 | [3, 2; 2, 3] | 11001111 | [3, 2; 3, 2] |
| 00010000 | [1, 0; 1, 0] | 01010000 | [1, 0; 0, 1] | 10010000 | [0, 1; 1, 1] | 11010000 | [0, 1; 0, 0] |
| 00010001 | [0, 1; 1, 2] | 01010001 | [0, 1; 0, 3] | 10010001 | [1, 0; 1, 3] | 11010001 | [1, 0; 0, 2] |
| 00010010 | [1, 1; 3, 1] | 01010010 | [1, 1; 2, 0] | 10010010 | [0, 0; 3, 0] | 11010010 | [0, 0; 2, 1] |
| 00010011 | [0, 0; 3, 3] | 01010011 | [0, 0; 2, 2] | 10010011 | [1, 1; 3, 2] | 11010011 | [1, 1; 2, 3] |
| 00010100 | [1, 2; 1, 0] | 01010100 | [1, 2; 0, 1] | 10010100 | [0, 3; 1, 1] | 11010100 | [0, 3; 0, 0] |
| 00010101 | [0, 3; 1, 2] | 01010101 | [0, 3; 0, 3] | 10010101 | [1, 2; 1, 3] | 11010101 | [1, 2; 0, 2] |
| 00010110 | [1, 3; 3, 1] | 01010110 | [1, 3; 2, 0] | 10010110 | [0, 2; 3, 0] | 11010110 | [0, 2; 2, 1] |
| 00010111 | [0, 2; 3, 3] | 01010111 | [0, 2; 2, 2] | 10010111 | [1, 3; 3, 2] | 11010111 | [1, 3; 2, 3] |
| 00011000 | [3, 0; 0, 1] | 01011000 | [3, 0; 1, 0] | 10011000 | [2, 1; 0, 0] | 11011000 | [2, 1; 1, 1] |
| 00011001 | [2, 1; 0, 3] | 01011001 | [2, 1; 1, 2] | 10011001 | [3, 0; 0, 2] | 11011001 | [3, 0; 1, 3] |
| 00011010 | [3, 1; 2, 0] | 01011010 | [3, 1; 3, 1] | 10011010 | [2, 0; 2, 1] | 11011010 | [2, 0; 3, 0] |
| 00011011 | [2, 0; 2, 2] | 01011011 | [2, 0; 3, 3] | 10011011 | [3, 1; 2, 3] | 11011011 | [3, 1; 3, 2] |
| 00011100 | [3, 2; 0, 1] | 01011100 | [3, 2; 1, 0] | 10011100 | [2, 3; 0, 0] | 11011100 | [2, 3; 1, 1] |
| 00011101 | [2, 3; 0, 3] | 01011101 | [2, 3; 1, 2] | 10011101 | [3, 2; 0, 2] | 11011101 | [3, 2; 1, 3] |

| FIG 46 | FIG 46A |
|---|---|
| | FIG 46B |

FIG 46B

| | | | | | | | |
|---|---|---|---|---|---|---|---|
| 00011110 | [3, 3; 2, 0] | 01011110 | [3, 3; 3, 1] | 10011110 | [2, 2; 2, 1] | 11011110 | [2, 2; 3, 0] |
| 00011111 | [2, 2; 2, 2] | 01011111 | [2, 2; 3, 3] | 10011111 | [3, 3; 2, 3] | 11011111 | [3, 3; 3, 2] |
| 00100000 | [0, 1; 0, 1] | 01100000 | [0, 1; 1, 0] | 10100000 | [1, 0; 1, 1] | 11100000 | [1, 0; 0, 0] |
| 00100001 | [1, 0; 1, 2] | 01100001 | [1, 0; 0, 3] | 10100001 | [0, 1; 0, 2] | 11100001 | [0, 1; 1, 3] |
| 00100010 | [0, 0; 2, 0] | 01100010 | [0, 0; 3, 1] | 10100010 | [1, 1; 3, 0] | 11100010 | [1, 1; 2, 1] |
| 00100011 | [1, 1; 3, 3] | 01100011 | [1, 1; 2, 2] | 10100011 | [0, 0; 2, 3] | 11100011 | [0, 0; 3, 2] |
| 00100100 | [0, 3; 0, 1] | 01100100 | [0, 3; 1, 0] | 10100100 | [1, 2; 1, 1] | 11100100 | [1, 2; 0, 0] |
| 00100101 | [1, 2; 1, 2] | 01100101 | [1, 2; 0, 3] | 10100101 | [0, 3; 0, 2] | 11100101 | [0, 3; 1, 3] |
| 00100110 | [0, 2; 2, 0] | 01100110 | [0, 2; 3, 1] | 10100110 | [1, 3; 3, 0] | 11100110 | [1, 3; 2, 1] |
| 00100111 | [1, 3; 3, 3] | 01100111 | [1, 3; 2, 2] | 10100111 | [0, 2; 2, 3] | 11100111 | [0, 2; 3, 2] |
| 00101000 | [2, 1; 1, 0] | 01101000 | [2, 1; 0, 1] | 10101000 | [3, 0; 0, 0] | 11101000 | [3, 0; 1, 1] |
| 00101001 | [3, 0; 0, 3] | 01101001 | [3, 0; 1, 2] | 10101001 | [2, 1; 1, 3] | 11101001 | [2, 1; 0, 2] |
| 00101010 | [2, 0; 3, 1] | 01101010 | [2, 0; 2, 0] | 10101010 | [3, 1; 2, 1] | 11101010 | [3, 1; 3, 0] |
| 00101011 | [3, 1; 2, 2] | 01101011 | [3, 1; 3, 3] | 10101011 | [2, 0; 3, 2] | 11101011 | [2, 0; 2, 3] |
| 00101100 | [2, 3; 1, 0] | 01101100 | [2, 3; 0, 1] | 10101100 | [3, 2; 0, 0] | 11101100 | [3, 2; 1, 1] |
| 00101101 | [3, 2; 0, 3] | 01101101 | [3, 2; 1, 2] | 10101101 | [2, 3; 1, 3] | 11101101 | [2, 3; 0, 2] |
| 00101110 | [2, 2; 3, 1] | 01101110 | [2, 2; 2, 0] | 10101110 | [3, 3; 2, 1] | 11101110 | [3, 3; 3, 0] |
| 00101111 | [3, 3; 2, 2] | 01101111 | [3, 3; 3, 3] | 10101111 | [2, 2; 3, 2] | 11101111 | [2, 2; 2, 3] |
| 00110000 | [0, 0; 0, 1] | 01110000 | [0, 0; 1, 0] | 10110000 | [1, 1; 1, 1] | 11110000 | [1, 1; 0, 0] |
| 00110001 | [1, 1; 1, 2] | 01110001 | [1, 1; 0, 3] | 10110001 | [0, 0; 0, 2] | 11110001 | [0, 0; 1, 3] |
| 00110010 | [0, 1; 2, 0] | 01110010 | [0, 1; 3, 1] | 10110010 | [1, 0; 3, 0] | 11110010 | [1, 0; 2, 1] |
| 00110011 | [1, 0; 3, 3] | 01110011 | [1, 0; 2, 2] | 10110011 | [0, 1; 2, 3] | 11110011 | [0, 1; 3, 2] |
| 00110100 | [0, 2; 0, 1] | 01110100 | [0, 2; 1, 0] | 10110100 | [1, 3; 1, 1] | 11110100 | [1, 3; 0, 0] |
| 00110101 | [1, 3; 1, 2] | 01110101 | [1, 3; 0, 3] | 10110101 | [0, 2; 0, 2] | 11110101 | [0, 2; 1, 3] |
| 00110110 | [0, 3; 2, 0] | 01110110 | [0, 3; 3, 1] | 10110110 | [1, 2; 3, 0] | 11110110 | [1, 2; 2, 1] |
| 00110111 | [1, 2; 3, 3] | 01110111 | [1, 2; 2, 2] | 10110111 | [0, 3; 2, 3] | 11110111 | [0, 3; 3, 2] |
| 00111000 | [2, 0; 1, 0] | 01111000 | [2, 0; 0, 1] | 10111000 | [3, 1; 0, 0] | 11111000 | [3, 1; 1, 1] |
| 00111001 | [3, 1; 0, 3] | 01111001 | [3, 1; 1, 2] | 10111001 | [2, 0; 1, 3] | 11111001 | [2, 0; 0, 2] |
| 00111010 | [2, 1; 3, 1] | 01111010 | [2, 1; 2, 0] | 10111010 | [3, 0; 2, 1] | 11111010 | [3, 0; 3, 0] |
| 00111011 | [3, 0; 2, 2] | 01111011 | [3, 0; 3, 3] | 10111011 | [2, 1; 3, 2] | 11111011 | [2, 1; 2, 3] |
| 00111100 | [2, 2; 1, 0] | 01111100 | [2, 2; 0, 1] | 10111100 | [3, 3; 0, 0] | 11111100 | [3, 3; 1, 1] |
| 00111101 | [3, 3; 0, 3] | 01111101 | [3, 3; 1, 2] | 10111101 | [2, 2; 1, 3] | 11111101 | [2, 2; 0, 2] |
| 00111110 | [2, 3; 3, 1] | 01111110 | [2, 3; 2, 0] | 10111110 | [3, 2; 2, 1] | 11111110 | [3, 2; 3, 0] |
| 00111111 | [3, 2; 2, 2] | 01111111 | [3, 2; 3, 3] | 10111111 | [2, 3; 3, 2] | 11111111 | [2, 3; 2, 3] |

| FIG 46 | FIG 46A |
|---|---|
| | FIG 46B |

| label d | symbol s | label d | symbol s | label d | symbol s | label d | symbol s |
|---|---|---|---|---|---|---|---|
| 00000000 | [1, 1; 1, 0] | 01000000 | [1, 1; 0, 1] | 10000000 | [0, 0; 1, 1] | 11000000 | [0, 0; 0, 0] |
| 00000001 | [0, 1; 3, 3] | 01000001 | [0, 1; 2, 2] | 10000001 | [1, 0; 3, 2] | 11000001 | [1, 0; 2, 3] |
| 00000010 | [1, 0; 3, 1] | 01000010 | [1, 0; 2, 0] | 10000010 | [0, 1; 3, 0] | 11000010 | [0, 1; 2, 1] |
| 00000011 | [0, 0; 1, 2] | 01000011 | [0, 0; 0, 3] | 10000011 | [1, 1; 1, 3] | 11000011 | [1, 1; 0, 2] |
| 00000100 | [3, 3; 0, 1] | 01000100 | [3, 3; 1, 0] | 10000100 | [2, 2; 0, 0] | 11000100 | [2, 2; 1, 1] |
| 00000101 | [2, 3; 2, 2] | 01000101 | [2, 3; 3, 3] | 10000101 | [3, 2; 2, 3] | 11000101 | [3, 2; 3, 2] |
| 00000110 | [3, 2; 2, 0] | 01000110 | [3, 2; 3, 1] | 10000110 | [2, 3; 2, 1] | 11000110 | [2, 3; 3, 0] |
| 00000111 | [2, 2; 0, 3] | 01000111 | [2, 2; 1, 2] | 10000111 | [3, 3; 0, 2] | 11000111 | [3, 3; 1, 3] |
| 00001000 | [3, 1; 0, 1] | 01001000 | [3, 1; 1, 0] | 10001000 | [2, 0; 0, 0] | 11001000 | [2, 0; 1, 1] |
| 00001001 | [2, 1; 2, 2] | 01001001 | [2, 1; 3, 3] | 10001001 | [3, 0; 2, 3] | 11001001 | [3, 0; 3, 2] |
| 00001010 | [3, 0; 2, 0] | 01001010 | [3, 0; 3, 1] | 10001010 | [2, 1; 2, 1] | 11001010 | [2, 1; 3, 0] |
| 00001011 | [2, 0; 0, 3] | 01001011 | [2, 0; 1, 2] | 10001011 | [3, 1; 0, 2] | 11001011 | [3, 1; 1, 3] |
| 00001100 | [1, 3; 1, 0] | 01001100 | [1, 3; 0, 1] | 10001100 | [0, 2; 1, 1] | 11001100 | [0, 2; 0, 0] |
| 00001101 | [0, 3; 3, 3] | 01001101 | [0, 3; 2, 2] | 10001101 | [1, 2; 3, 2] | 11001101 | [1, 2; 2, 3] |
| 00001110 | [1, 2; 3, 1] | 01001110 | [1, 2; 2, 0] | 10001110 | [0, 3; 3, 0] | 11001110 | [0, 3; 2, 1] |
| 00001111 | [0, 2; 1, 2] | 01001111 | [0, 2; 0, 3] | 10001111 | [1, 3; 1, 3] | 11001111 | [1, 3; 0, 2] |
| 00010000 | [1, 0; 1, 0] | 01010000 | [1, 0; 0, 1] | 10010000 | [0, 1; 1, 1] | 11010000 | [0, 1; 0, 0] |
| 00010001 | [0, 0; 3, 3] | 01010001 | [0, 0; 2, 2] | 10010001 | [1, 1; 3, 2] | 11010001 | [1, 1; 2, 3] |
| 00010010 | [1, 1; 3, 1] | 01010010 | [1, 1; 2, 0] | 10010010 | [0, 0; 3, 0] | 11010010 | [0, 0; 2, 1] |
| 00010011 | [0, 1; 1, 2] | 01010011 | [0, 1; 0, 3] | 10010011 | [1, 0; 1, 3] | 11010011 | [1, 0; 0, 2] |
| 00010100 | [3, 2; 0, 1] | 01010100 | [3, 2; 1, 0] | 10010100 | [2, 3; 0, 0] | 11010100 | [2, 3; 1, 1] |
| 00010101 | [2, 2; 2, 2] | 01010101 | [2, 2; 3, 3] | 10010101 | [3, 3; 2, 3] | 11010101 | [3, 3; 3, 2] |
| 00010110 | [3, 3; 2, 0] | 01010110 | [3, 3; 3, 1] | 10010110 | [2, 2; 2, 1] | 11010110 | [2, 2; 3, 0] |
| 00010111 | [2, 3; 0, 3] | 01010111 | [2, 3; 1, 2] | 10010111 | [3, 2; 0, 2] | 11010111 | [3, 2; 1, 3] |
| 00011000 | [3, 0; 0, 1] | 01011000 | [3, 0; 1, 0] | 10011000 | [2, 1; 0, 0] | 11011000 | [2, 1; 1, 1] |
| 00011001 | [2, 0; 2, 2] | 01011001 | [2, 0; 3, 3] | 10011001 | [3, 1; 2, 3] | 11011001 | [3, 1; 3, 2] |
| 00011010 | [3, 1; 2, 0] | 01011010 | [3, 1; 3, 1] | 10011010 | [2, 0; 2, 1] | 11011010 | [2, 0; 3, 0] |
| 00011011 | [2, 1; 0, 3] | 01011011 | [2, 1; 1, 2] | 10011011 | [3, 0; 0, 2] | 11011011 | [3, 0; 1, 3] |
| 00011100 | [1, 2; 1, 0] | 01011100 | [1, 2; 0, 1] | 10011100 | [0, 3; 1, 1] | 11011100 | [0, 3; 0, 0] |
| 00011101 | [0, 2; 3, 3] | 01011101 | [0, 2; 2, 2] | 10011101 | [1, 3; 3, 2] | 11011101 | [1, 3; 2, 3] |

| FIG 47 | |
|---|---|
| | FIG 47A |
| | FIG 47B |

FIG 47B

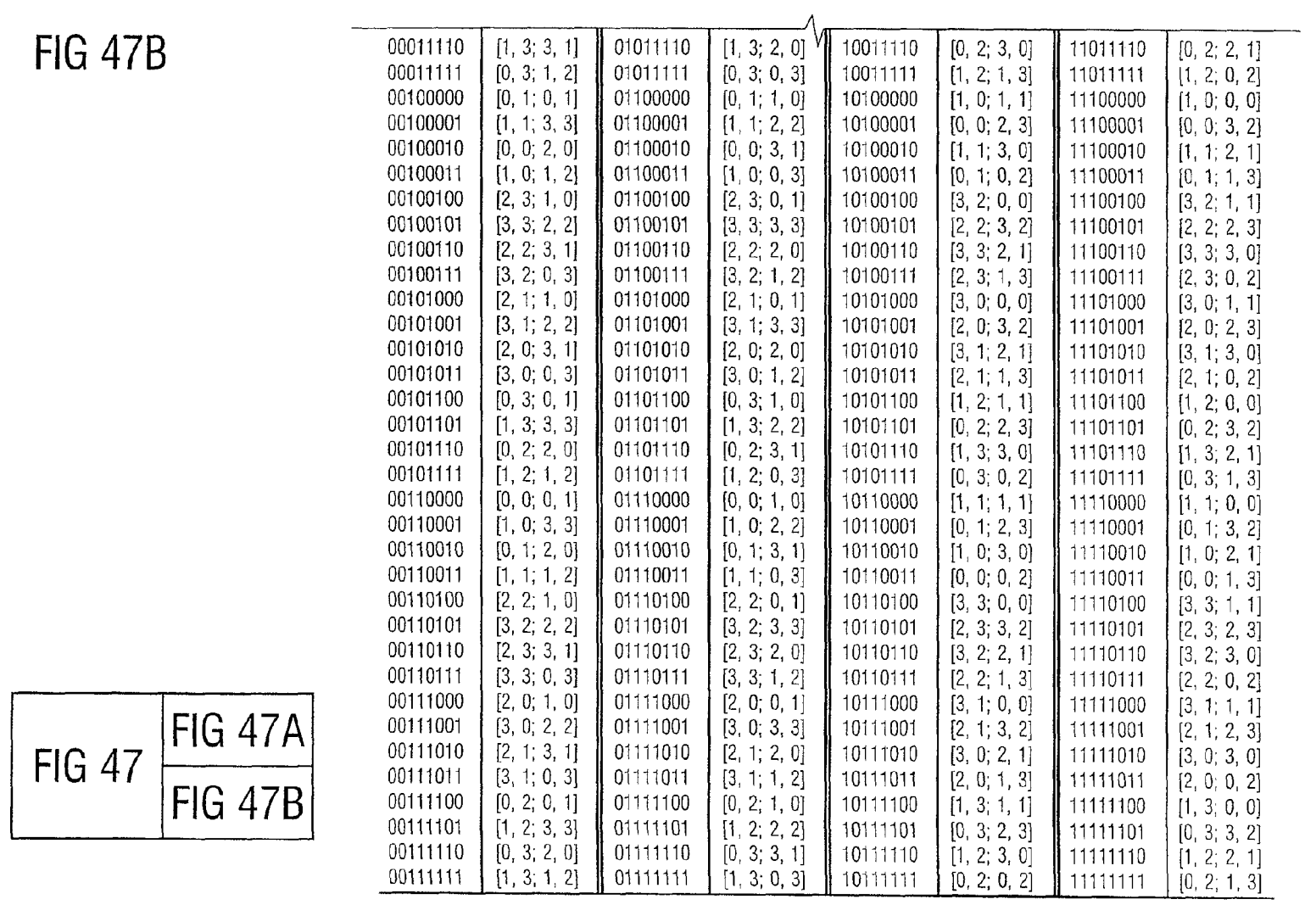

| | | | | | | | |
|---|---|---|---|---|---|---|---|
| 00011110 | [1, 3; 3, 1] | 01011110 | [1, 3; 2, 0] | 10011110 | [0, 2; 3, 0] | 11011110 | [0, 2; 2, 1] |
| 00011111 | [0, 3; 1, 2] | 01011111 | [0, 3; 0, 3] | 10011111 | [1, 2; 1, 3] | 11011111 | [1, 2; 0, 2] |
| 00100000 | [0, 1; 0, 1] | 01100000 | [0, 1; 1, 0] | 10100000 | [1, 0; 1, 1] | 11100000 | [1, 0; 0, 0] |
| 00100001 | [1, 1; 3, 3] | 01100001 | [1, 1; 2, 2] | 10100001 | [0, 0; 2, 3] | 11100001 | [0, 0; 3, 2] |
| 00100010 | [0, 0; 2, 0] | 01100010 | [0, 0; 3, 1] | 10100010 | [1, 1; 3, 0] | 11100010 | [1, 1; 2, 1] |
| 00100011 | [1, 0; 1, 2] | 01100011 | [1, 0; 0, 3] | 10100011 | [0, 1; 0, 2] | 11100011 | [0, 1; 1, 3] |
| 00100100 | [2, 3; 1, 0] | 01100100 | [2, 3; 0, 1] | 10100100 | [3, 2; 0, 0] | 11100100 | [3, 2; 1, 1] |
| 00100101 | [3, 3; 2, 2] | 01100101 | [3, 3; 3, 3] | 10100101 | [2, 2; 3, 2] | 11100101 | [2, 2; 2, 3] |
| 00100110 | [2, 2; 3, 1] | 01100110 | [2, 2; 2, 0] | 10100110 | [3, 3; 2, 1] | 11100110 | [3, 3; 3, 0] |
| 00100111 | [3, 2; 0, 3] | 01100111 | [3, 2; 1, 2] | 10100111 | [2, 3; 1, 3] | 11100111 | [2, 3; 0, 2] |
| 00101000 | [2, 1; 1, 0] | 01101000 | [2, 1; 0, 1] | 10101000 | [3, 0; 0, 0] | 11101000 | [3, 0; 1, 1] |
| 00101001 | [3, 1; 2, 2] | 01101001 | [3, 1; 3, 3] | 10101001 | [2, 0; 3, 2] | 11101001 | [2, 0; 2, 3] |
| 00101010 | [2, 0; 3, 1] | 01101010 | [2, 0; 2, 0] | 10101010 | [3, 1; 2, 1] | 11101010 | [3, 1; 3, 0] |
| 00101011 | [3, 0; 0, 3] | 01101011 | [3, 0; 1, 2] | 10101011 | [2, 1; 1, 3] | 11101011 | [2, 1; 0, 2] |
| 00101100 | [0, 3; 0, 1] | 01101100 | [0, 3; 1, 0] | 10101100 | [1, 2; 1, 1] | 11101100 | [1, 2; 0, 0] |
| 00101101 | [1, 3; 3, 3] | 01101101 | [1, 3; 2, 2] | 10101101 | [0, 2; 2, 3] | 11101101 | [0, 2; 3, 2] |
| 00101110 | [0, 2; 2, 0] | 01101110 | [0, 2; 3, 1] | 10101110 | [1, 3; 3, 0] | 11101110 | [1, 3; 2, 1] |
| 00101111 | [1, 2; 1, 2] | 01101111 | [1, 2; 0, 3] | 10101111 | [0, 3; 0, 2] | 11101111 | [0, 3; 1, 3] |
| 00110000 | [0, 0; 0, 1] | 01110000 | [0, 0; 1, 0] | 10110000 | [1, 1; 1, 1] | 11110000 | [1, 1; 0, 0] |
| 00110001 | [1, 0; 3, 3] | 01110001 | [1, 0; 2, 2] | 10110001 | [0, 1; 2, 3] | 11110001 | [0, 1; 3, 2] |
| 00110010 | [0, 1; 2, 0] | 01110010 | [0, 1; 3, 1] | 10110010 | [1, 0; 3, 0] | 11110010 | [1, 0; 2, 1] |
| 00110011 | [1, 1; 1, 2] | 01110011 | [1, 1; 0, 3] | 10110011 | [0, 0; 0, 2] | 11110011 | [0, 0; 1, 3] |
| 00110100 | [2, 2; 1, 0] | 01110100 | [2, 2; 0, 1] | 10110100 | [3, 3; 0, 0] | 11110100 | [3, 3; 1, 1] |
| 00110101 | [3, 2; 2, 2] | 01110101 | [3, 2; 3, 3] | 10110101 | [2, 3; 3, 2] | 11110101 | [2, 3; 2, 3] |
| 00110110 | [2, 3; 3, 1] | 01110110 | [2, 3; 2, 0] | 10110110 | [3, 2; 2, 1] | 11110110 | [3, 2; 3, 0] |
| 00110111 | [3, 3; 0, 3] | 01110111 | [3, 3; 1, 2] | 10110111 | [2, 2; 1, 3] | 11110111 | [2, 2; 0, 2] |
| 00111000 | [2, 0; 1, 0] | 01111000 | [2, 0; 0, 1] | 10111000 | [3, 1; 0, 0] | 11111000 | [3, 1; 1, 1] |
| 00111001 | [3, 0; 2, 2] | 01111001 | [3, 0; 3, 3] | 10111001 | [2, 1; 3, 2] | 11111001 | [2, 1; 2, 3] |
| 00111010 | [2, 1; 3, 1] | 01111010 | [2, 1; 2, 0] | 10111010 | [3, 0; 2, 1] | 11111010 | [3, 0; 3, 0] |
| 00111011 | [3, 1; 0, 3] | 01111011 | [3, 1; 1, 2] | 10111011 | [2, 0; 1, 3] | 11111011 | [2, 0; 0, 2] |
| 00111100 | [0, 2; 0, 1] | 01111100 | [0, 2; 1, 0] | 10111100 | [1, 3; 1, 1] | 11111100 | [1, 3; 0, 0] |
| 00111101 | [1, 2; 3, 3] | 01111101 | [1, 2; 2, 2] | 10111101 | [0, 3; 2, 3] | 11111101 | [0, 3; 3, 2] |
| 00111110 | [0, 3; 2, 0] | 01111110 | [0, 3; 3, 1] | 10111110 | [1, 2; 3, 0] | 11111110 | [1, 2; 2, 1] |
| 00111111 | [1, 3; 1, 2] | 01111111 | [1, 3; 0, 3] | 10111111 | [0, 2; 0, 2] | 11111111 | [0, 2; 1, 3] |

| | |
|---|---|
| FIG 47 | FIG 47A |
| | FIG 47B |

APPARATUS FOR PROVIDING A COMBINED DIGITAL SIGNAL

Embodiments according to the invention relate to communication systems and, more, particularly, to an apparatus and a method for providing a combined digital signal.

Some embodiments according to the invention relate to coding and modulation techniques for two-way relaying systems with asymmetric channel quality.

Relay technology has been a hot area of research in the wireless communication community in recent years. It is widely accepted that relay or multi-hop networks will become essential for beyond 3G mobile radio systems due to the range problem that appears there. As higher carrier frequencies or center frequencies can be envisaged for future mobile radio communication systems, where the expected center frequencies range up to 5 to 10 GHz and with bandwidth requirements of up to 100 MHz, it can be foreseen that a significantly increased path loss and noise power level has to be expected, which translates into a significantly reduced area a base station can cover.

In order to circumvent the introduction of a denser grid of base stations (BS), the basic idea is to introduce relay stations (RS), which forward data packages to a mobile station (MS) that is out of reach of the base station. Such relay stations can be realized utilizing additional dedicated infrastructure relay stations having fixed power supplies, or they can be built into other mobile stations. Two main concepts of relaying were identified in the past: Amplify-and-forward (AF) and Decoded-and-forward (DF). While AF has the advantage of being transparent to modulation and coding since a sampled version of the received signal is stored and retransmitted by the relay station without performing any decoding, DF allows for a separate adaptation to both links and avoids also the effect of noise enhancement since DF means that the relay station decodes and re-encodes the signal.

Two-way relaying is a spectrum-efficient relaying scheme that considers the scenario where two half-duplex wireless terminals exchange data via another half duplex wireless relay. Here, half-duplex means that the terminals cannot transmit and receive signals at the same time using the same frequency channel due to the coupling between the transmit and receive circuits. The two-way relaying technique consists of two phases: the multiple access (MAC) phase and the broadcast (BRC) phase. In the MAC phase, the two terminals transmit their data simultaneously to the relay; the relay decodes and retransmits the combined data signals in the BRC phase. The back-propagated data signals received at the two terminals are called self-interference, which is known to the receiving terminals and is canceled before decoding. The two phases are separated in time (TDD, time division duplex) or in frequency (FDD, frequency division duplex). Compared to traditional relaying techniques, the two-way relaying technique achieves bidirectional communication between the two terminals in two channel uses instead of four. The MAC and BRC phases are independent from each other, thus each phase can be considered separately. In the MAC phase, there is a classical multiple access channel, where the optimal coding strategies and the capacity region is known and shown for example in "R. Ahlswede, "Multi-way communication channels," in *Proc. 2nd IEEE Int. Symposium on Inf. Theory*. Thakadsor, Armenian SSR: Akademiai Kiado, Budapest, September 1971, pp. 23-52.", or in "H. Liao, "Multiple access channels," Ph.D. dissertation, University of Hawaii, 1972.". However, the capacity region of the BRC phase was an open problem. Recently, this problem was solved by "Xie L.-L. Xie, "Network coding and random binning for multi-user channels," in *Proc. Of the 10th Canadian Workshop on Information Theory*, Edmonton, Alberta, Canada, Jun. 6-8, 2007, pp. 85-88." and "Oechtering T. J. Oechtering, C. Schnurr, I. Bjelakovic, and H. Boche, "Broadcast capacity region of two-phase bidirectional relaying," *IEEE Trans. Inform. Theory*, vol. 54, no. 1, pp. 454-458, January 2008".

A relaying system is considered where two wireless terminals A and B exchange data via a half-duplex decode-and-forward (DF) relay terminal as shown in FIG. 2. It is assumed that there is no direct connection between terminal A 210 and B 220 (for example, due to shadowing or too large distance between them). In FIG. 2, $x_1$, $x_2$ and x denote the transmitted and $y_1$, $y_2$ and y denote the received symbols of terminal A 210, B 220 and the relay terminal, respectively. The rate region (capacity region) describes the transmission rates simultaneously achievable by terminals A 210 and B 220 under certain channel conditions. FIG. 2 shows a two-way DF relaying channel with equal time division.

In the BRC phase, this is a broadcast channel where the receiving terminals A and B have perfect knowledge about the message that should be transmitted to the other terminal. Let $R_{A,2}$ and $R_{B,2}$ denote the achievable rates between the relay and terminal A, B in the BRC phase. Its capacity region is described by the following theorem:

For the considered broadcast channel, with each receiver knowing a priori the messages for the other receivers, any rates ($R_{A,2}$, $R_{B,2}$) satisfying the following inequalities are simultaneously achievable:

$$R_{A,2} \leq I(X;Y_1) \tag{4.1}$$

$$R_{B,2} \leq I(X;Y_2) \tag{4.2}$$

for some probability distribution p(x).

The proof can be found in "L.-L. Xie, "Network coding and random binning for multi-user channels," in *Proc. Of the 10th Canadian Workshop on Information Theory*, Edmonton, Alberta, Canada, Jun. 6-8, 2007, pp. 85-88." Or in "T. J. Oechtering, C. Schnurr, I. Bjelakovic, and H. Boche, "Broadcast capacity region of two-phase bidirectional relaying," *IEEE Trans. Inform. Theory*, vol. 54, no. 1, pp. 454-458, January 2008", where the authors used a coding technique called random binning. However, this coding scheme is not a practical scheme and only has theoretical values.

The Theorem has an interesting implication that if both terminals have perfect information about the messages that is intended for the other side, they can decode the messages transmitted by the relay as if the other side does not exist.

The BRC phase capacity region of a MIMO two-way relaying system corresponding to one channel realization is shown in FIG. 3, where the rate regions achievable by the superposition coding scheme 320, the conventional XOR scheme 310 and the optimal scheme using random binning 330 ("Joint coding") are compared. Here $N_A=N_R=N_B=4$, $P_R/\sigma_A^2$ is 3 dB lower than $P_R/\sigma_B^2$, wherein $N_A/N_R/N_B$ is the number of antennas at node A/relay/node B, $\sigma_A^2/\sigma_B^2$ is the noise variance at node A/node B and $P_R$ is the transmit power of the relay. Each entry in the channel $H_3$ and $H_4$ (MIMO channels between the relay and A and the relay and B) is randomly generated ~CN(0,1). "Joint coding" refers to the capacity region according to the Theorem mentioned above. As it can be seen, both XOR and superposition coding schemes are suboptimum compared to the capacity region calculated according to Theorem.

The XOR scheme is a promising scheme as shown in many papers, e.g., in "I. Hammerstroem, M. Kuhn, C. Esli, J. Zhao, A. Wittneben, and G. Bauch, "MIMO two-way relaying with transmit CSI at the relay," in *Proc. SPAWC*, Helsinki, Finland, Jun. 17-20, 2007". The drawback of the pure XOR scheme is that it is limited by the weak link in asymmetric channel conditions, and the relay can only transmit at the same rate to BS and MS in the BRC phase.

The intersection of the MAC phase capacity region and the BRC phase capacity region determines the achievable rate region of the system. FIG. 4 shows the achievable rate region of a two-way relaying system. FIG. 4*a* illustrates, for certain channel realizations, the achievable rate region 400 of the system when the MAC and BRC phase have the same duration. The achievable rate region of the system using the optimal scheme and that using the XOR scheme do not differ much. This is because the data from the two terminals have to pass through both the good link and the weak link. However, if the duration of the MAC phase is increased, and the duration of the BRC phase (unequal time-division) is decreased, the achievable rate region of the system can be much larger than that achievable by the XOR scheme as shown in FIG. 4*b*. The achievable rate region 410 of the system when the MAC phase has larger duration than the BRC phase is illustrated. The detailed discussion can be found in "J. Zhao, M. Kuhn, A. Wittneben, and G. Bauch, "Optimum time-division in MIMO two-way decode-and-forward relaying systems," in *Proc. Asilomar Conf. Signals, Syst, Comput*., Pacific Grove, Calif., Oct. 26-Oct. 29, 2008".

Two-way relaying is a spectrum-efficient relaying scheme proposed in "B. Rankov and A. Wittneben, "Spectral efficient protocols for half-duplex fading relay channels," *IEEE J. Select. Areas Commun., vol.* 25, no. 2, pp. 379-389, February 2007". Such a scheme has been shown to be able to compensate for a large portion of the spectrum-efficiency loss that is due to the half-duplex constraint of practical relays. It works best when the channel conditions are symmetric. Recently, people are interested in how to transmit data in asymmetric channel conditions, especially in cellular systems. The information theoretical capacity region in two-way relaying systems is shown to be much larger than those offered by known solutions that are for example:

- XOR for symmetric data rates, i.e. for two data streams of equal lengths (e.g. "I. Hammerstroem, M. Kuhn, C. Esli, J. Zhao, A. Wittneben, and G. Bauch, "MIMO two-way relaying with transmit CSI at the relay," in *Proc. SPAWC*, Helsinki, Finland, Jun. 17-20, 2007").
- Information theory publications describe the theoretical performance bounds of the joint encoding at the two-way relay, but a practical solution is not given (e.g. "T. J. Oechtering, C. Schnurr, I. Bjelakovic, and H. Boche, "Broadcast capacity region of two-phase bidirectional relaying," *IEEE Trans. Inform. Theory*, vol. 54, no. 1, pp. 454-458, January 2008").
- The superposition coding scheme B. Rankov and A. Wittneben, in ""Spectral efficient protocols for half-duplex fading relay channels," *IEEE J. Select. Areas Commun., vol.* 25, no. 2, pp. 379-389, February 2007." can transmit asymmetric data rates in two-way relaying systems. However, it generally cannot approach the information theoretical limits.

Typical relaying systems may have asymmetric channel conditions, i.e., the quality of the channel from the relay to one receiving terminal is much better than the other. The traditional XOR scheme requires that both terminals decode the XOR-ed information in the BRC phase. Thus, the information rate transmitted by the relay in the BRC phase is limited by the weaker link to the two terminals. The optimum coding scheme has been shown in "R. F. Wyrembelski, T. J. Oechtering, I. Bjelakovic, C. Schnurr, and H. Boche, "Capacity of Gaussian MIMO bidirectional broadcast channels," in *IEEE Int. Symposium on Inf. Theory*, Toronto, Canada, July 2008, pp. 584-588" and in "L.-L. Xie, "Network coding and random binning for multi-user channels," in *Proc. Of the 10th Canadian Workshop on Information Theory*, Edmonton, Alberta, Canada, Jun. 6-8, 2007, pp. 85-88." where it was proved that full capacities for the two links can be simultaneously achieved in the BRC phase if each receiving terminal has perfect information about the message that is intended for the other terminal. This is due to the availability of the a priori information at the receivers and is proved by a random binning technique. The question is whether it is possible to achieve the performance promised by information theory using simple schemes, e.g., by using the basic idea of the conventional XOR scheme. In a cellular scenario, this may be equivalent to finding a modified XOR scheme such that it is possible to transmit high data rate to the receiving terminal of the strong link while transmitting to the receiver of the weaker link with lower data rate. Both terminals satisfy certain bit error rate (BER) performance requirements.

It is the objective of the present invention to provide an apparatus for processing signals for transmission to terminals with asymmetric channel conditions, or in other words, to provide an apparatus for providing a combined signal of two digital signals with unequal block length, which allows to increase the achievable data rate.

This object is solved by an apparatus according to claim 1 and a method according to claim 11.

An embodiment of the invention provides an apparatus for providing a combined digital signal comprising a bit adder and a combiner. The combined digital signal contains information of a first digital input signal and a second digital input signal, wherein a block length of the first digital input signal is shorter than a block length of the second digital input signal.

The bit adder is configured to add at least one filling bit to a block of the first digital input signal to obtain an adapted first digital input signal, so that the block length of the adapted first digital input signal is equal to the block length of the second digital input signal.

The combiner is configured to combine the adapted first digital input signal and the second digital input signal to obtain and provide the combined digital signal.

Embodiment according to the present invention are based on the central idea that the receiver of the weaker link has some a priori information about the combined signal. Based on the a priori information, the receiver of the weaker link only needs to decode from a subset of the signal constellations. Subject to the same bit-error rate constraint, different data rates can be transmitted to receivers in this asymmetric channel conditions.

Some embodiments according to the invention relate to an apparatus for providing a modulated signal comprising an apparatus for providing a combined digital signal and a mapping means. The mapping means is configured to generate a complex symbol for a block of the combined digital signal based on a selected mapping constellation.

The bit error rate of a transmission of the modulated signal may be improved by a smart selection of the mapping constellation.

Some further embodiments according to the invention relate to an apparatus for providing a combined digital signal comprising a first encoder, a second encoder and a combiner. The combined digital signal contains information of a first digital input signal and a second digital input signal, wherein a block length of the first digital input signal is shorter than a block length of the second digital input signal.

The first encoder comprises a first coding rate and is configured to provide a first encoded digital signal based on the first digital input signal.

The second encoder comprises a second coding rate and is configured to provide a second encoded digital signal based on the second digital input signal.

The ratio of the first coding rate and the second coding rate is selected, so that a block length of the first encoded digital signal is equal to a block length of the second encoded digital signal.

The combiner is configured to combine the first encoded digital signal and the second encoded digital signal to obtain and provide the combined digital signal.

Some embodiments according to the invention relate to an apparatus for providing a separated digital signal based on a combined digital signal comprising a bit determiner and a separator. The combined digital signal contains information of a known digital signal and an unknown digital signal. A block of the combined digital signal comprises bits associated with bits to be decoded of the unknown digital signal and bits associated with filling bits of the unknown digital signal.

The bit determiner is configured to determine the bits of the block of the combined digital signal associated with bits to be decoded of the unknown digital signal based on a bit significance information.

For example, the bit significance information tells the bit determiner at which position of a bit sequence of a block of the combined digital signal a bit to be decoded and/or a filling bit is arranged. The bit significance information may also tell the bit determiner the value of the filling bit. This information may be used to reduce the bit error rate.

The separator is configured to separate the bit to be decoded of the unknown signal from the combined digital signal based on the known digital signal to obtain and provide the separated digital signal.

Some further embodiments according to the invention relate to a wireless communication system comprising a relay station, a first terminal and a second terminal.

The relay station comprises an apparatus for providing a combined signal and is configured to transmit a combined transmission signal containing the information of the combined digital signal to the first terminal and the second terminal.

The first terminal is configured to transmit a first transmission signal containing the information of the first digital input signal to the relay station.

The second terminal comprises an apparatus for providing a separated unknown digital signal, wherein the separated unknown digital signal corresponds to the first digital input signal. The second terminal is configured to transmit a second transmission signal containing the information of the second digital input signal to the relay station and is configured to receive the combined digital signal from the relay station.

Embodiments according to the invention will be detailed subsequently, referring to the appended drawings, in which:

FIG. 1 is a block diagram of an apparatus for providing a combined digital signal;

FIG. 2*a*, 2*b* is a schematic illustration of a two-way DF relaying system;

FIG. 3 is a data rate for base station versus data rate for mobile station diagram;

FIG. 4*a*, 4*b* is a schematic "data rate for base station" versus "data rate for mobile station" diagram;

FIG. 5 is a block diagram of an apparatus for providing a combined digital signal;

FIG. 6*a*, 6*b* is a block diagram of an apparatus for providing a separated digital signal;

Figure 9A:
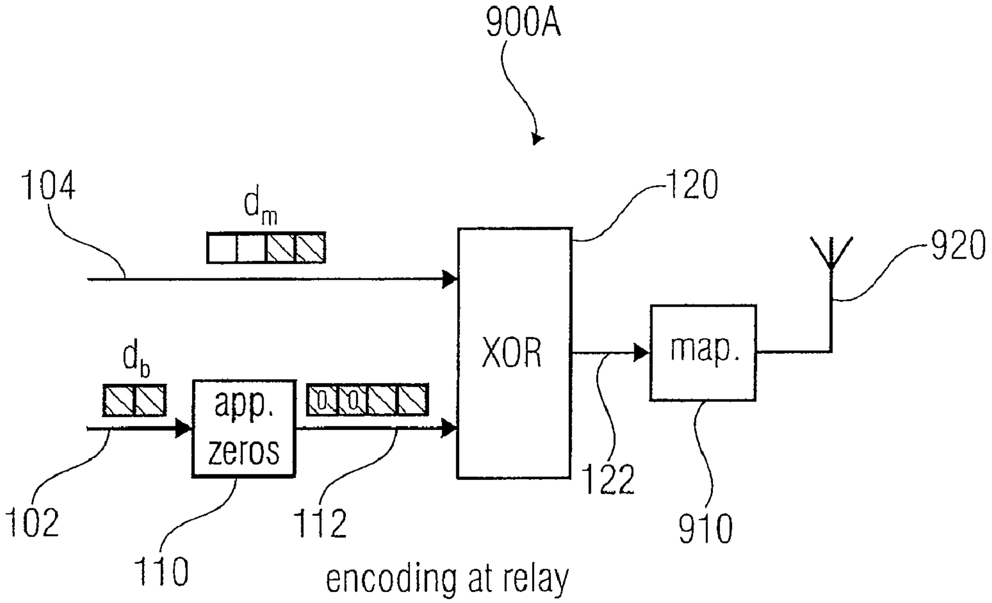
Figure 9B:
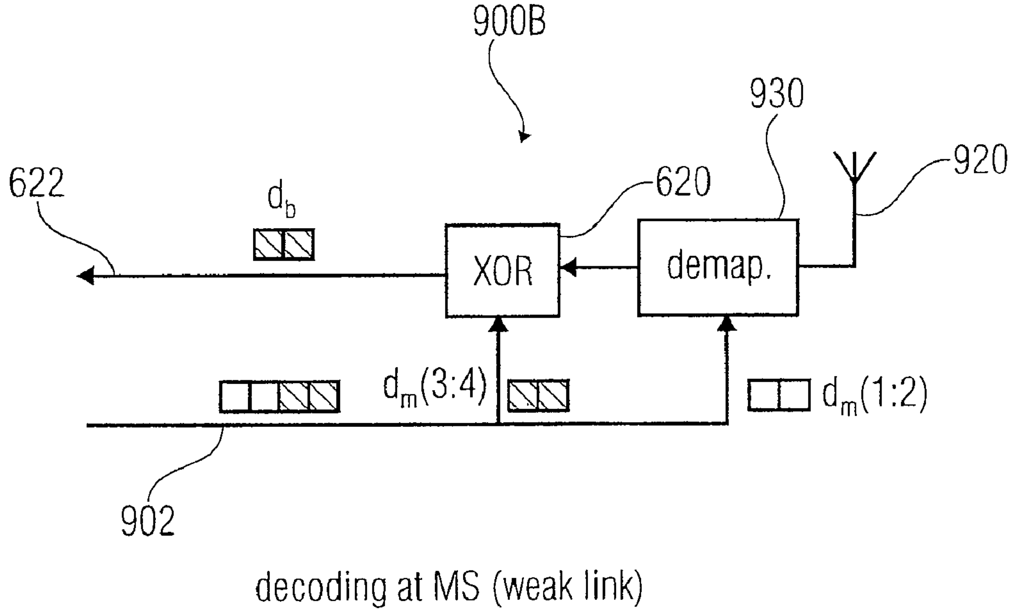
Figure 9C:
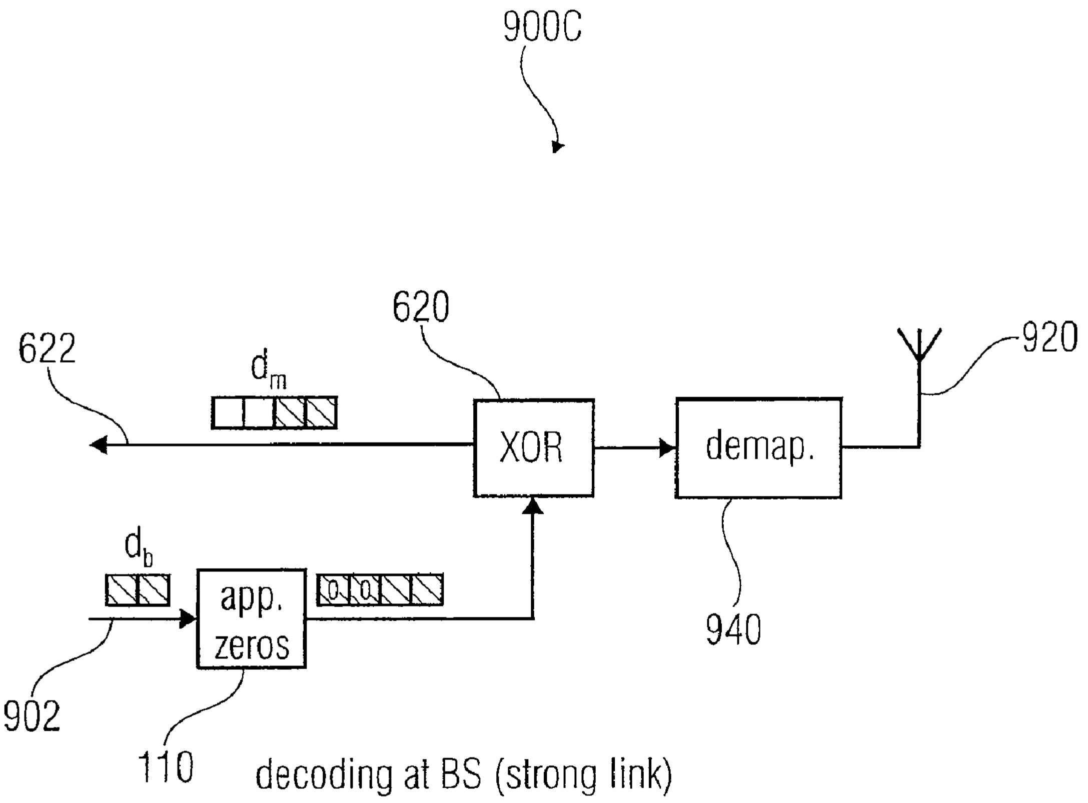
Figure 10B:
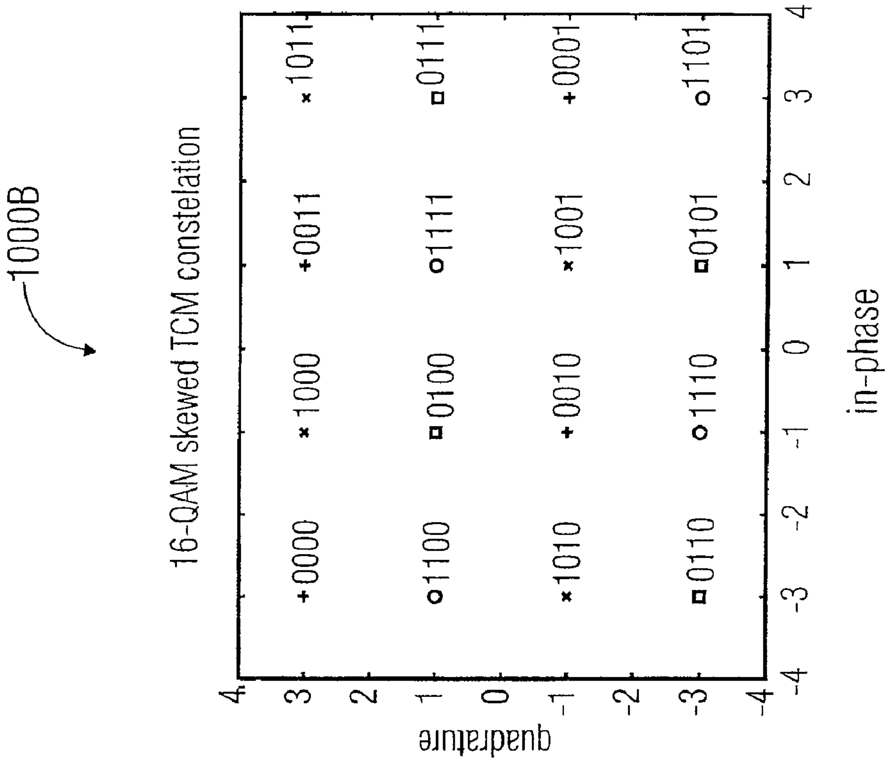
Figure 10A:
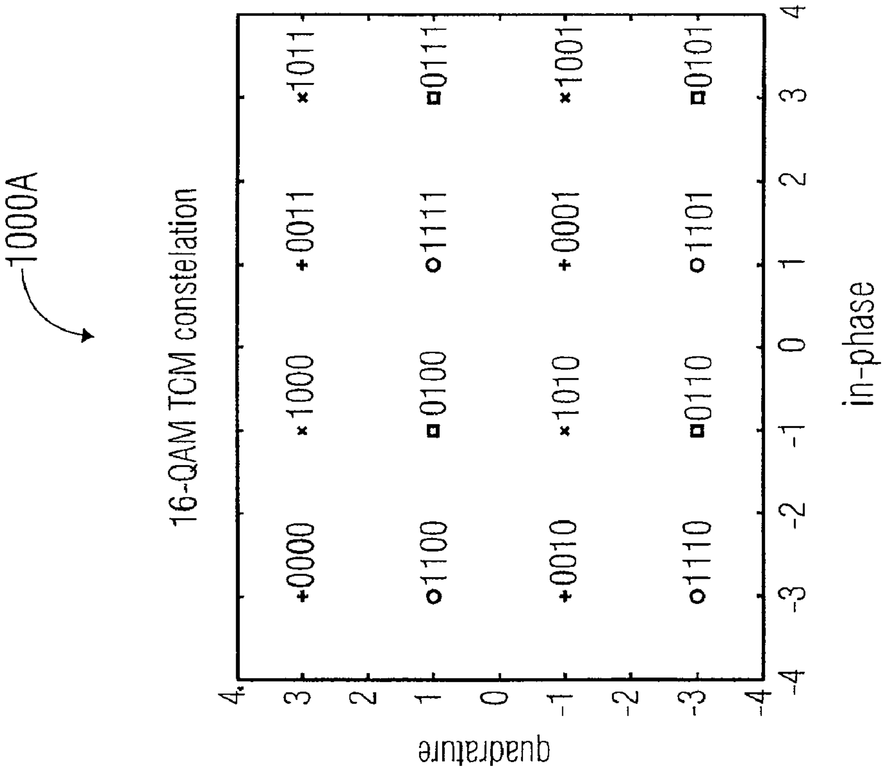
Figure 11B:
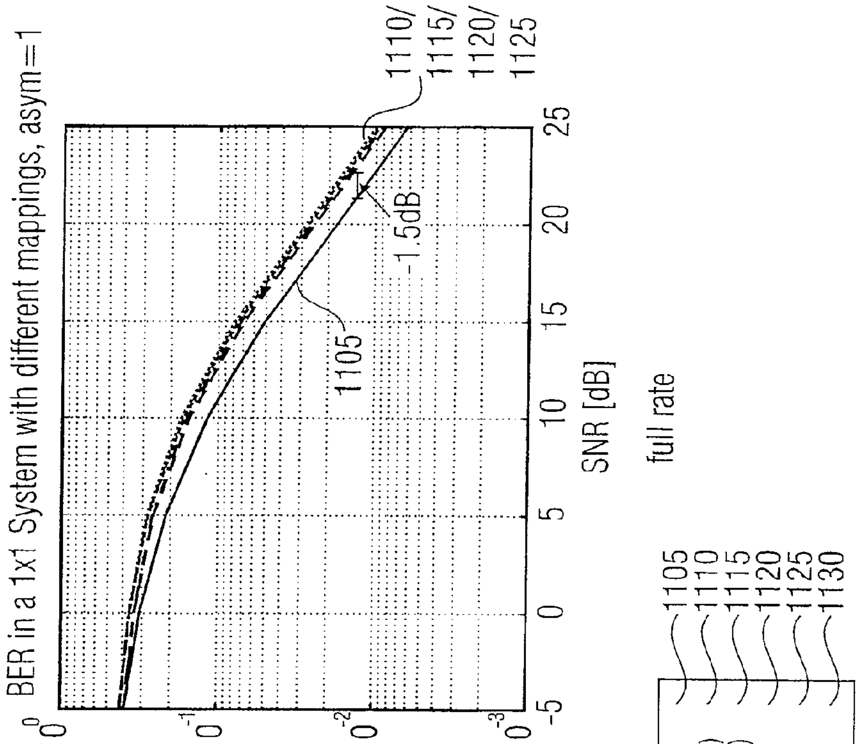
Figure 11A:
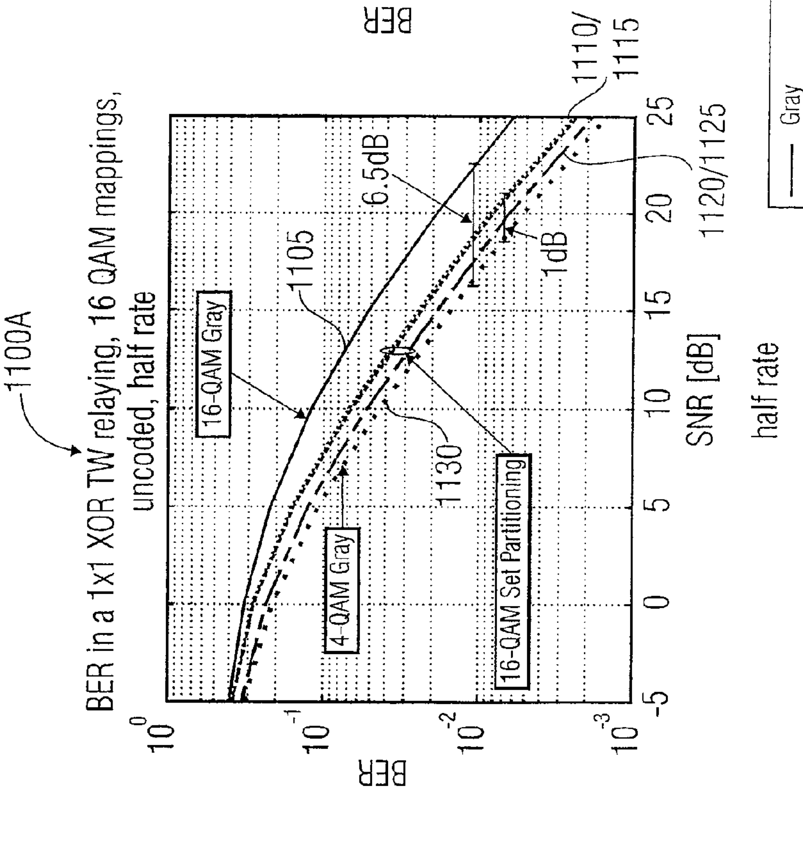
Figure 12B:
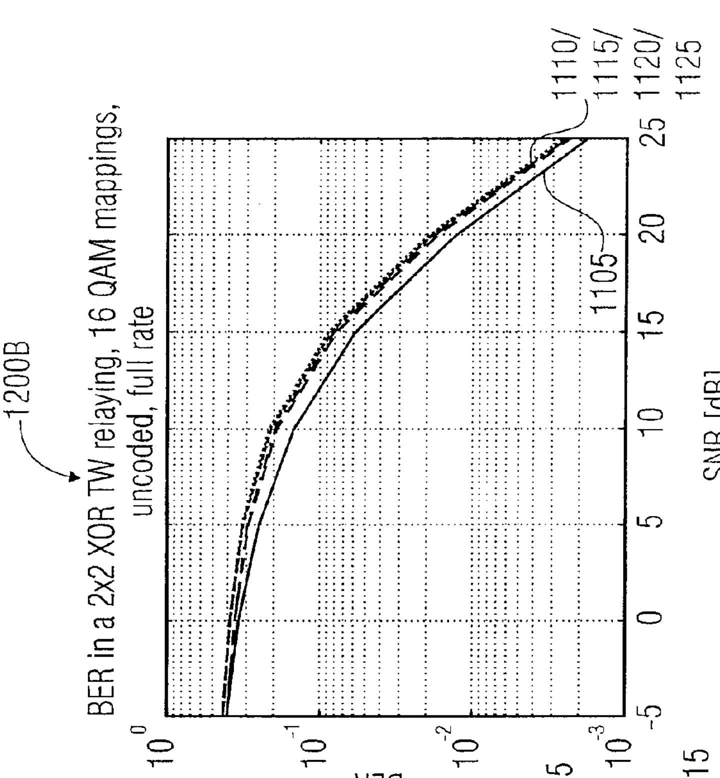
Figure 12A:
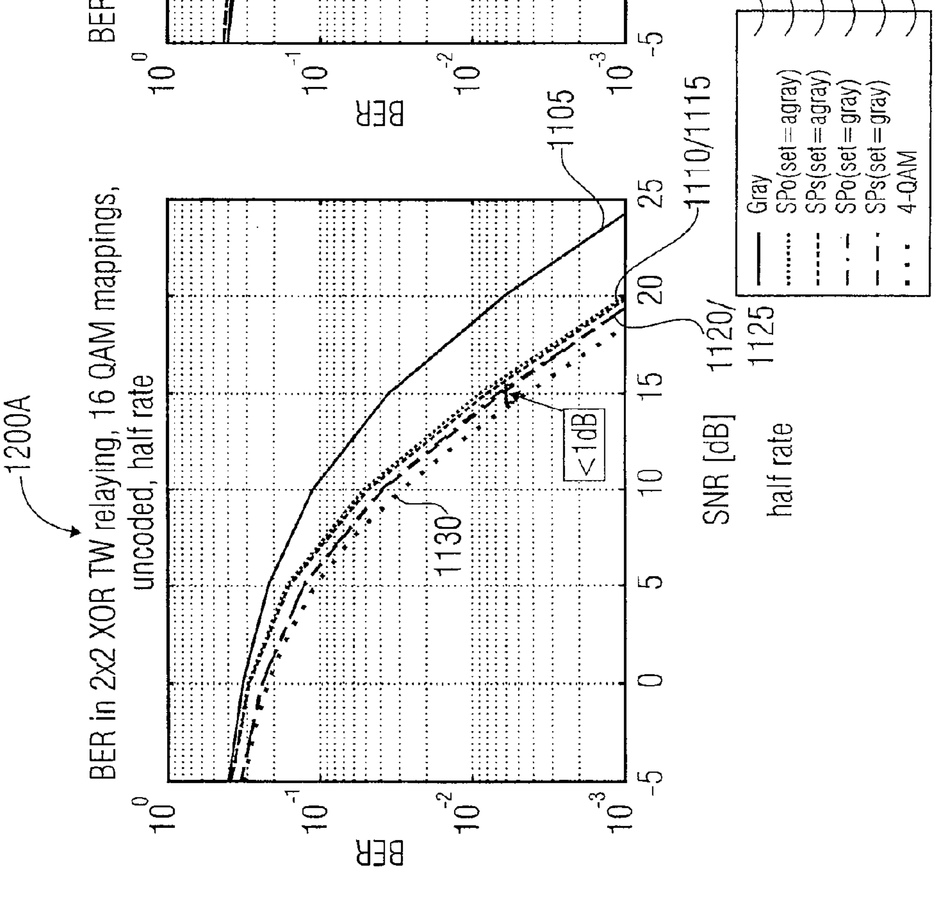
Figures 14A, 14B:
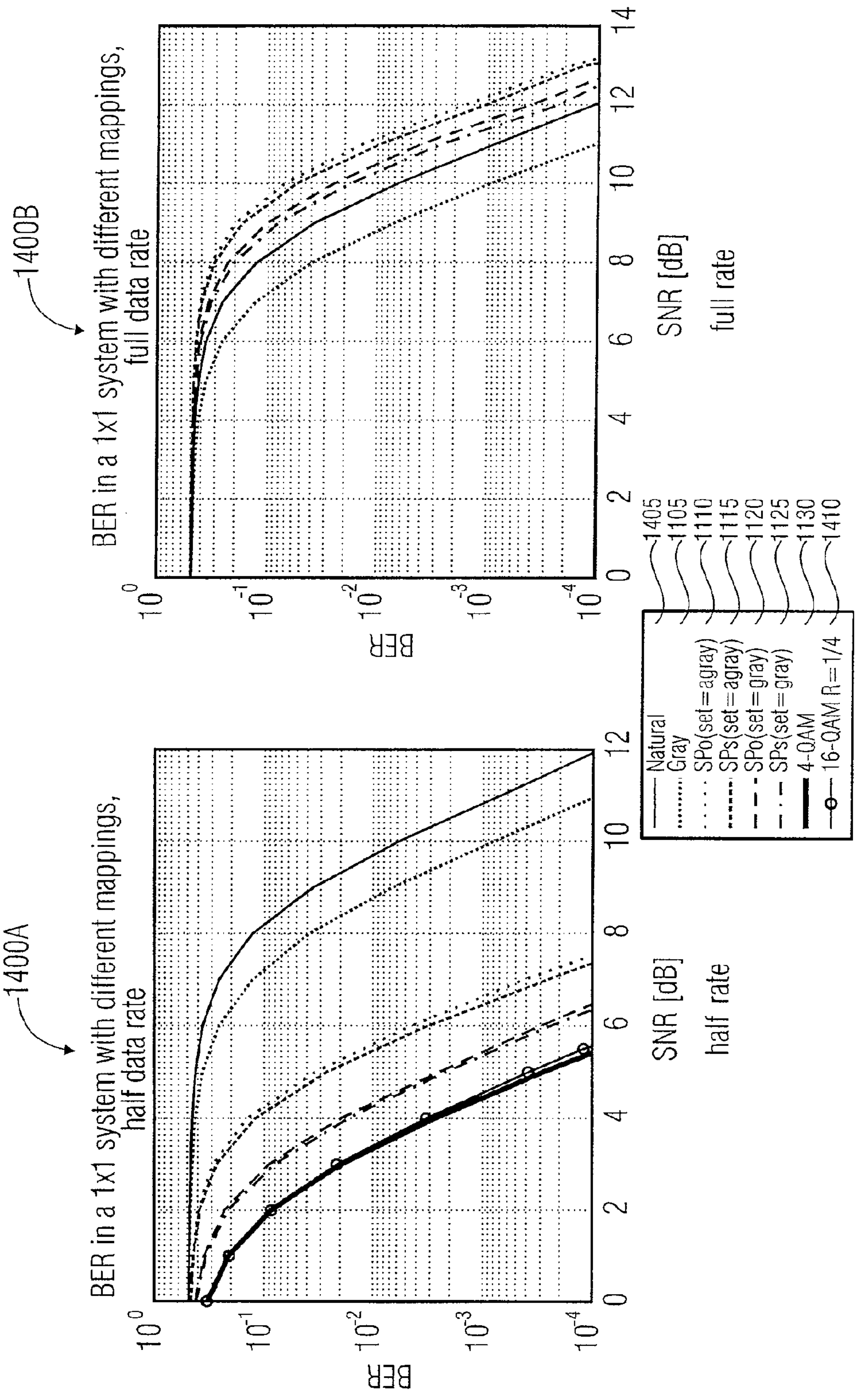
Figure 15B:
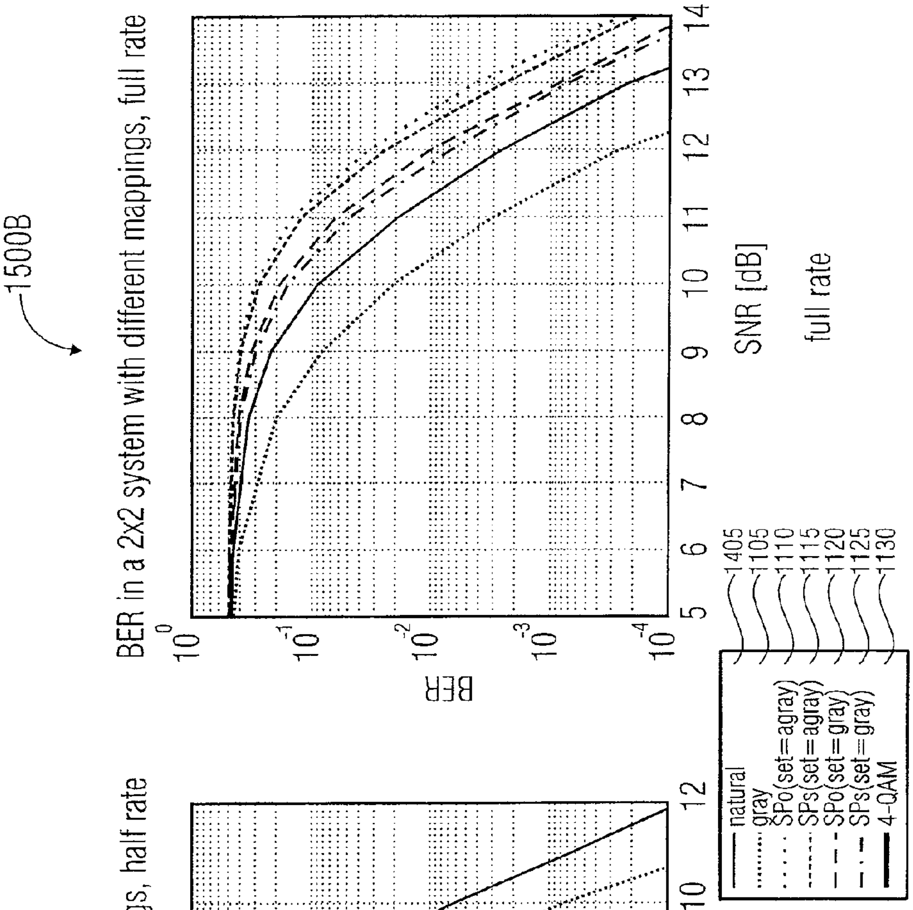
Figure 15A:
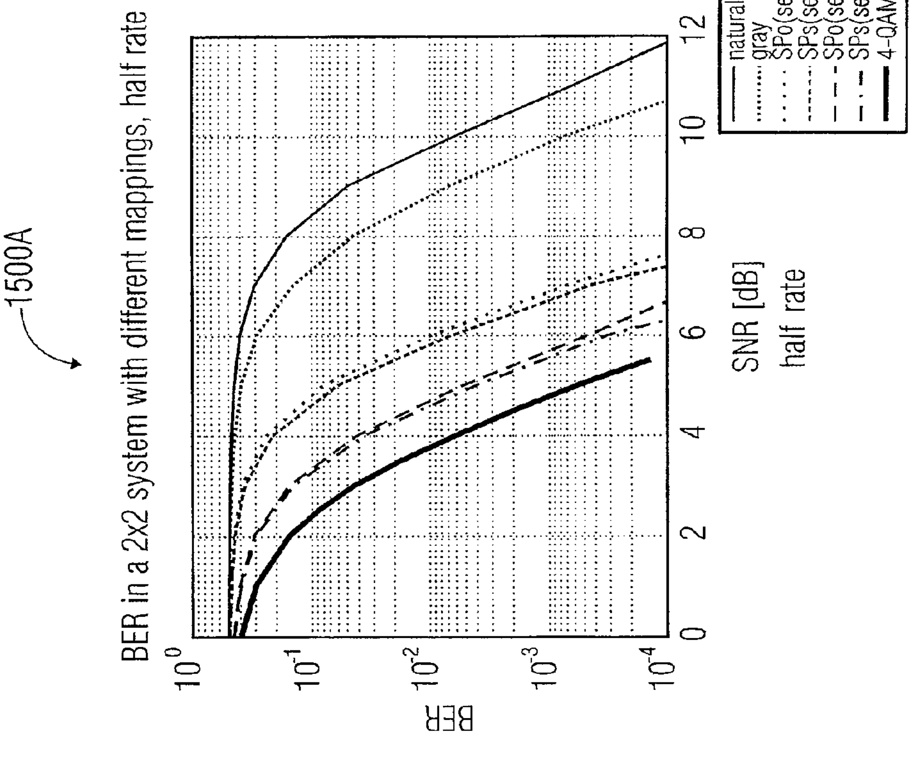
Figure 17A:
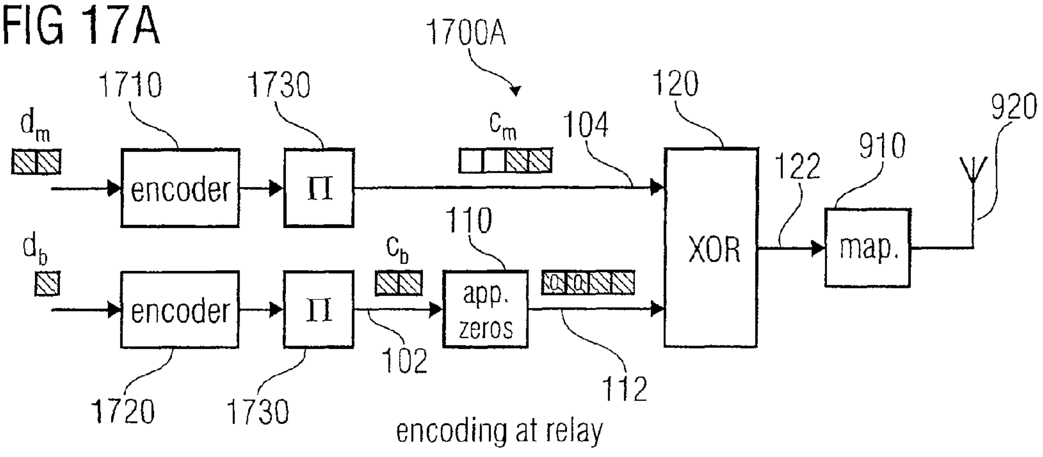
Figure 17B:
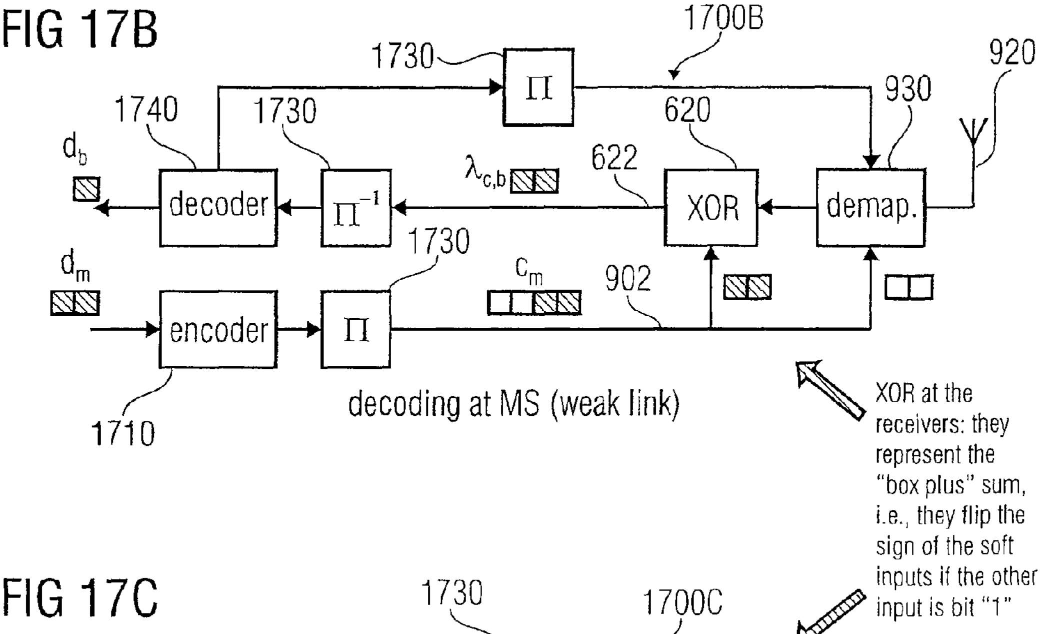
Figure 17C:
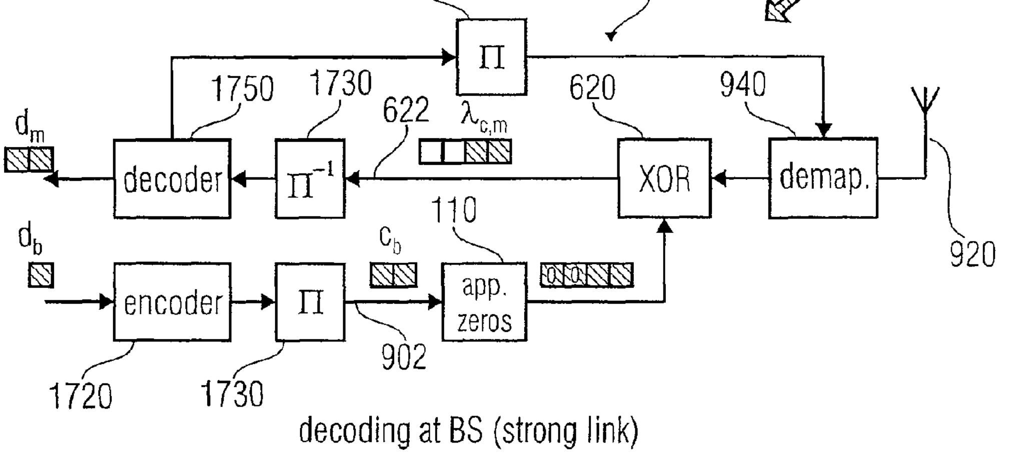
Figure 18B:
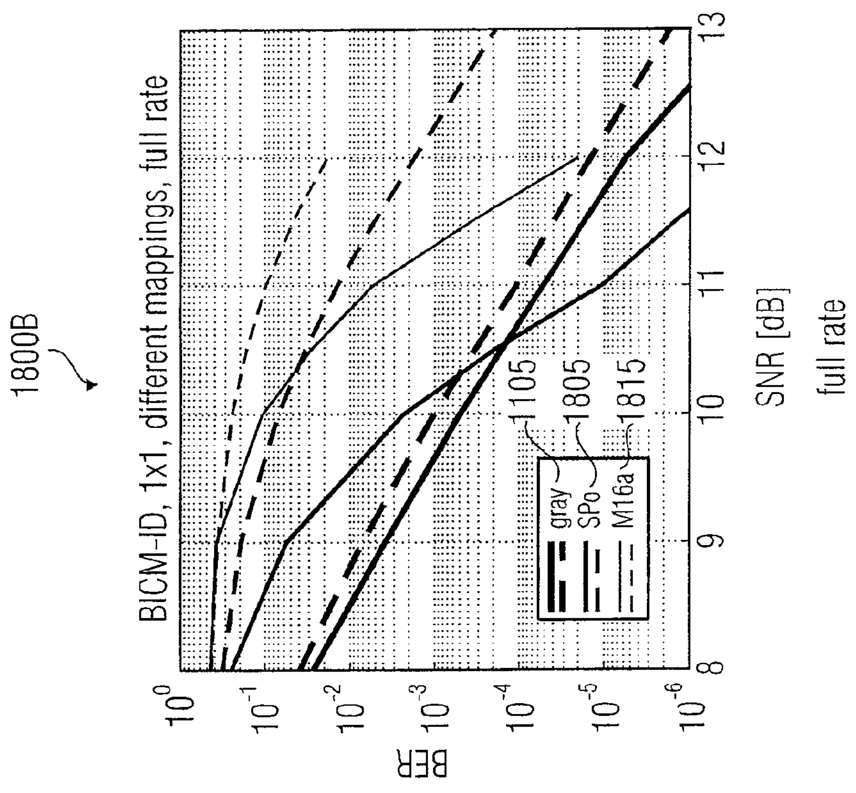
Figure 18A:
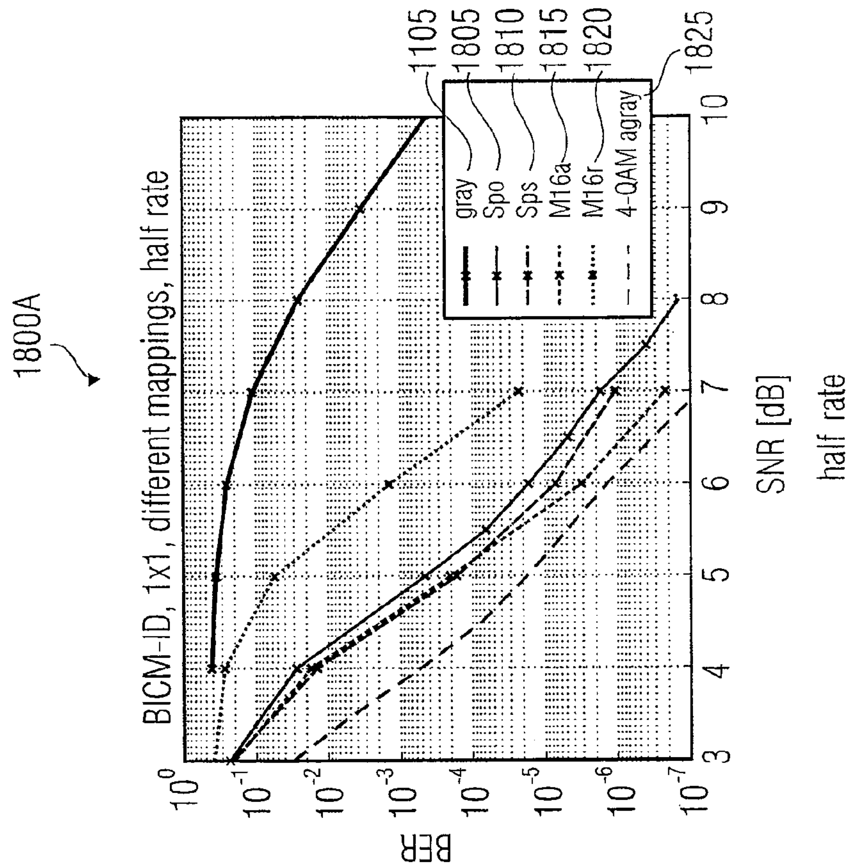
Figure 19A:
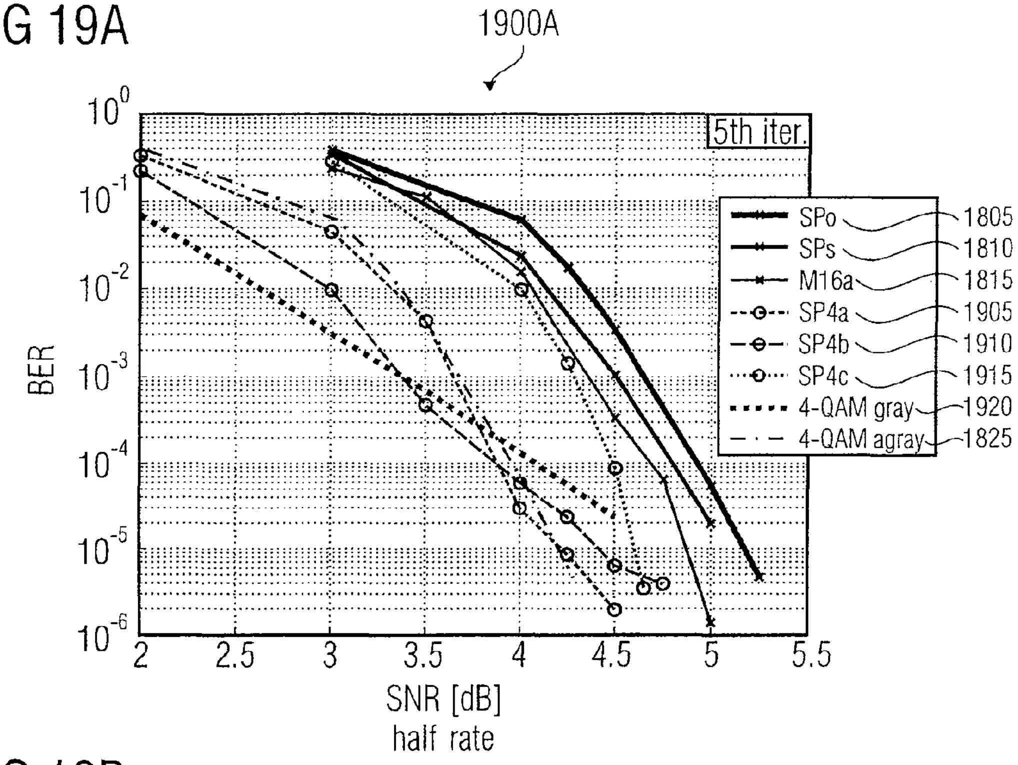
Figure 19B:
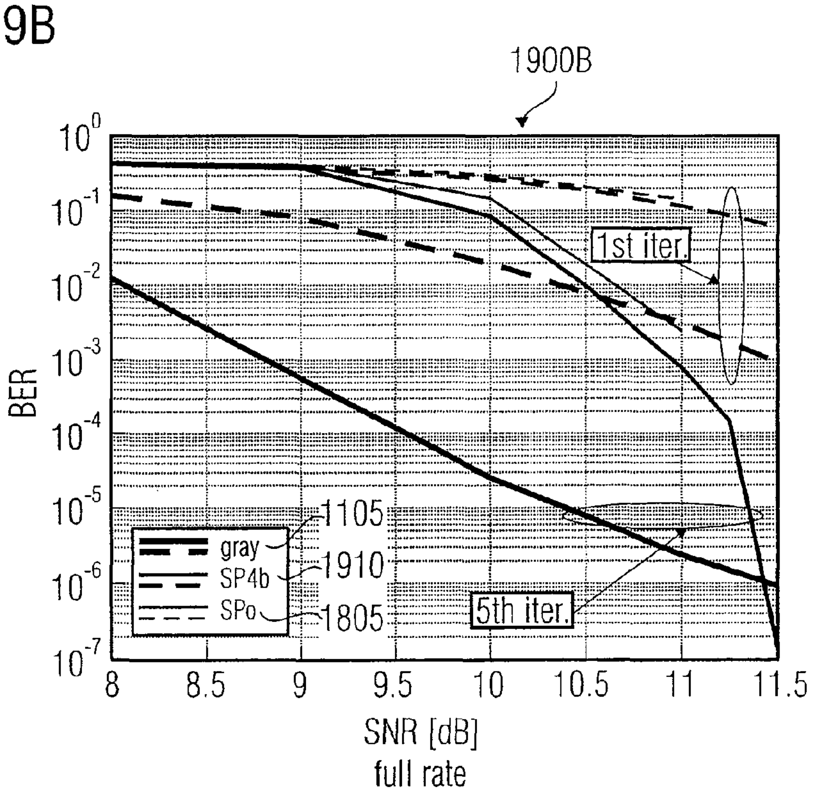
Figure 20A:
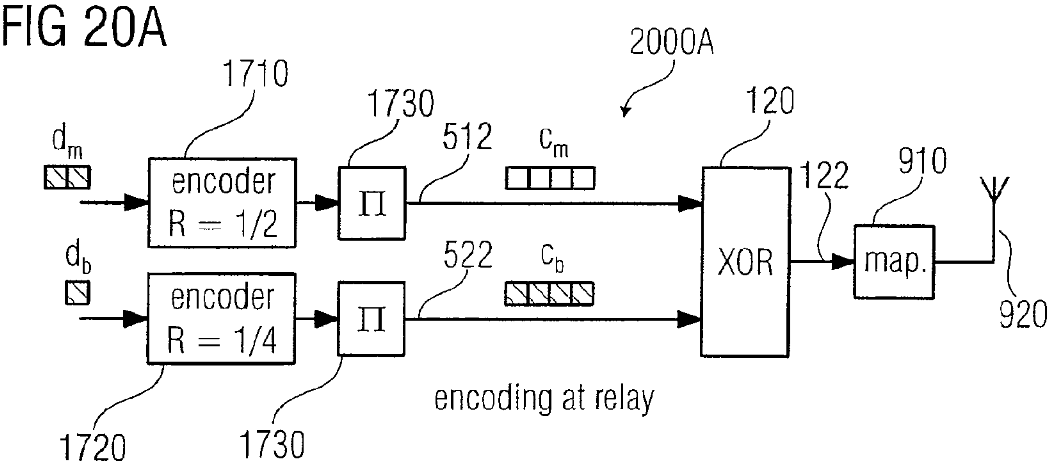
Figure 20B:
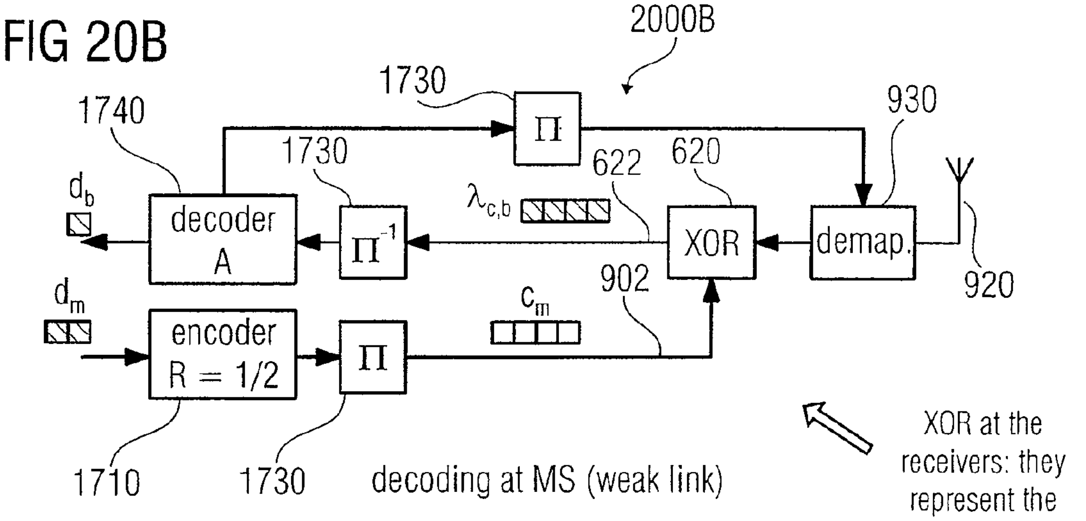
Figure 20C:
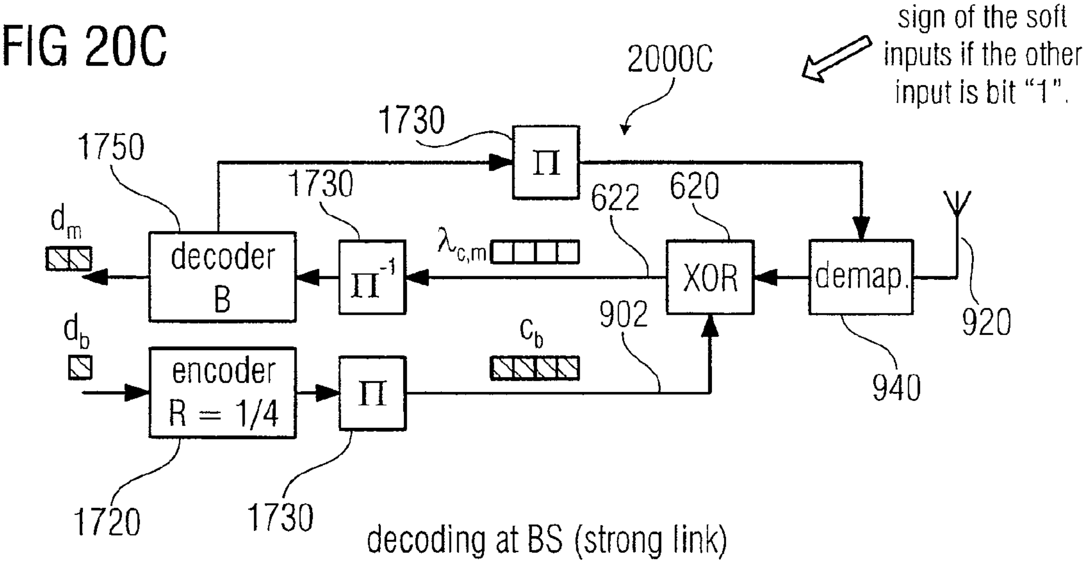
Figure 21A:
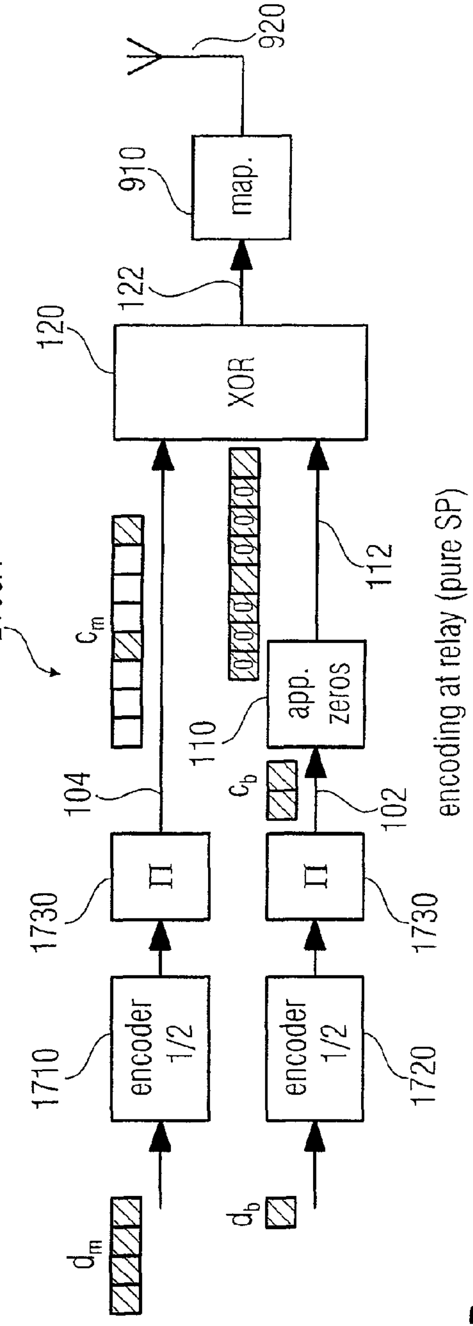
Figure 21B:
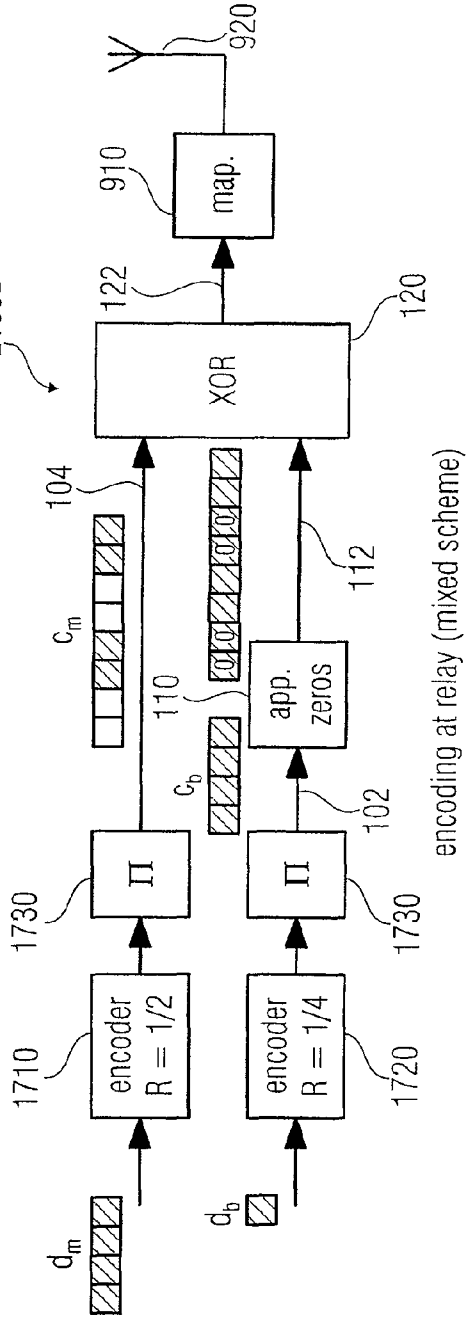
Figure 22A:
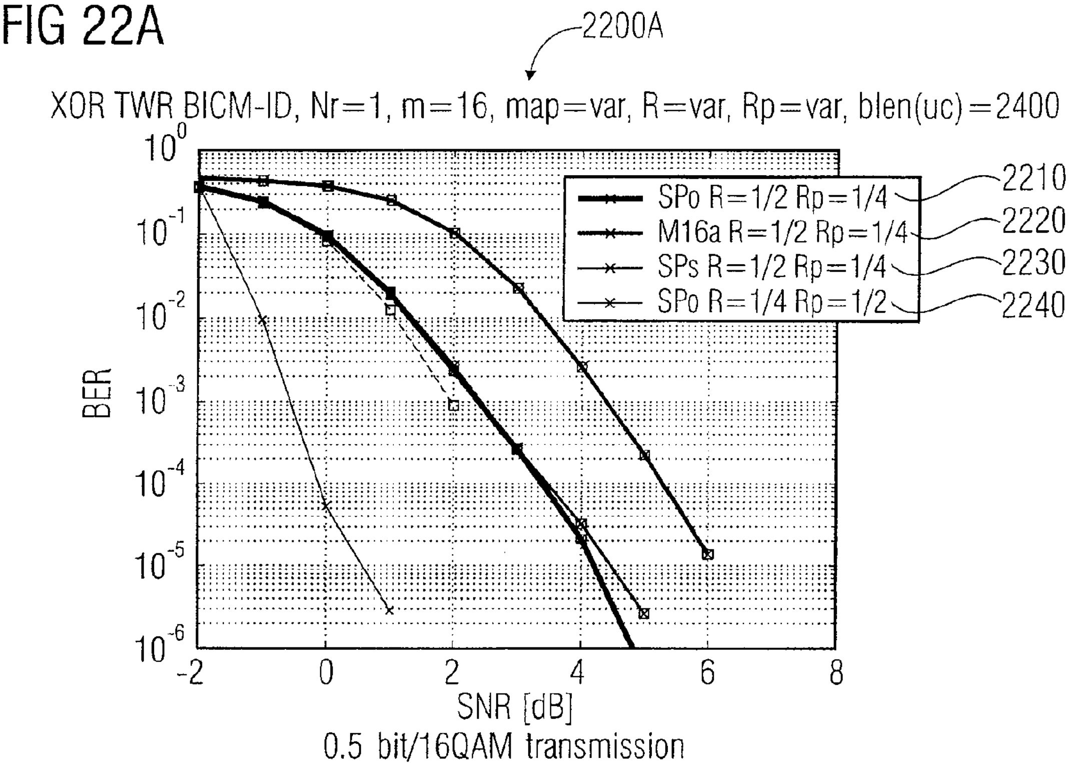
Figure 22B:
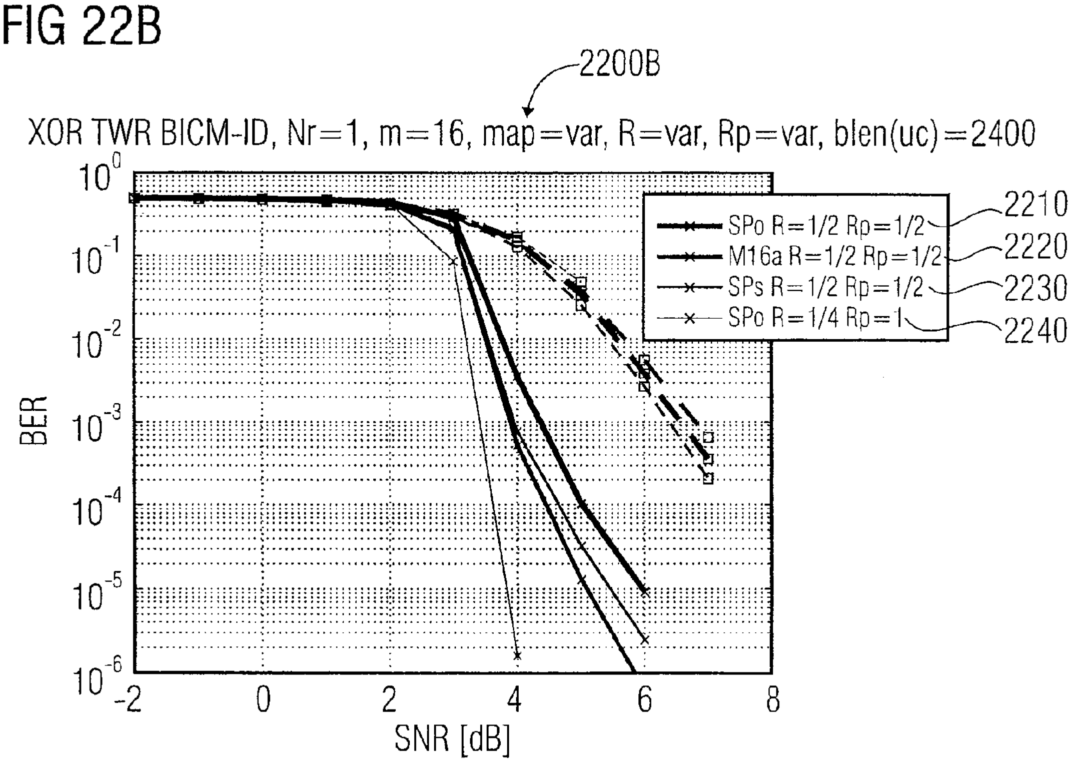
Figure 23A:
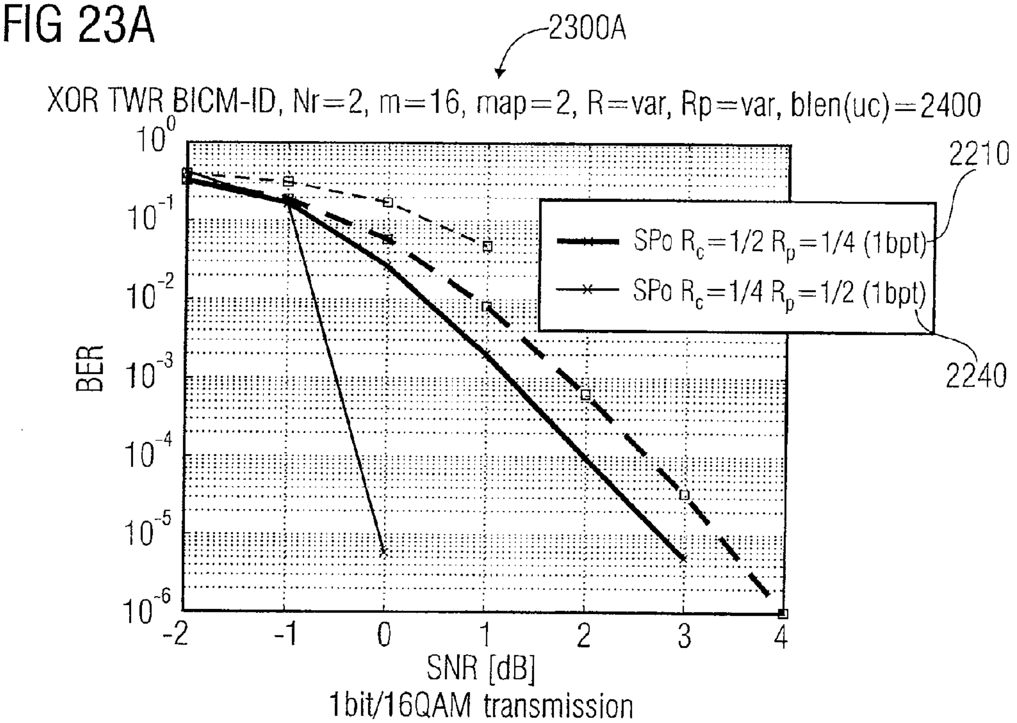
Figure 23B:
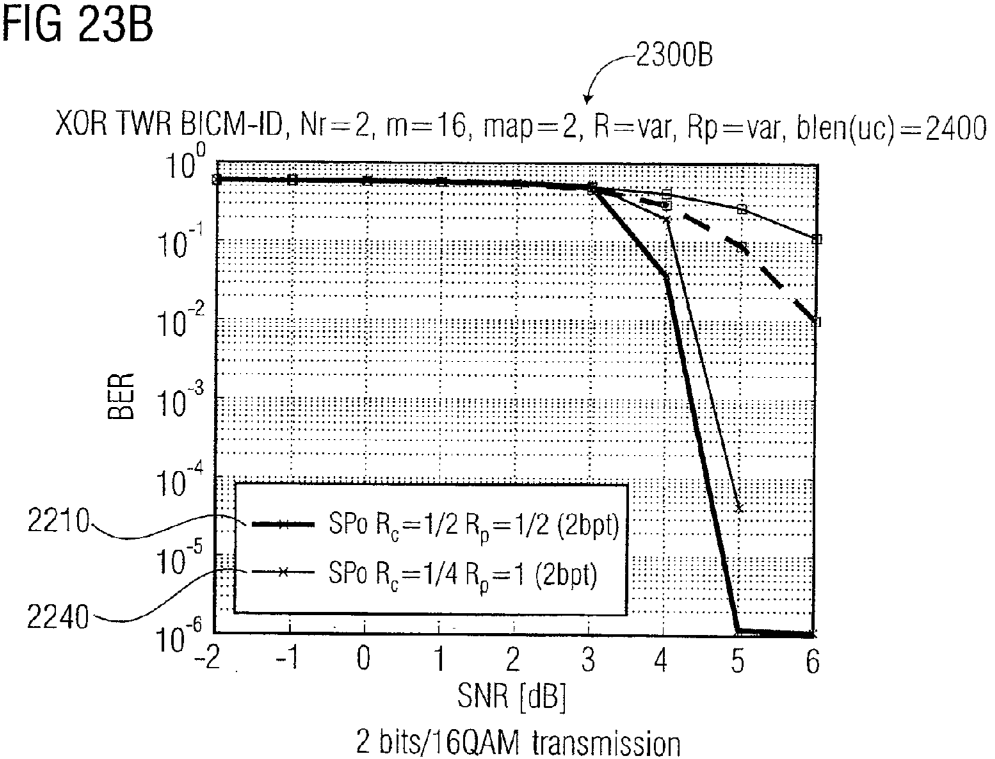
Figure 24:
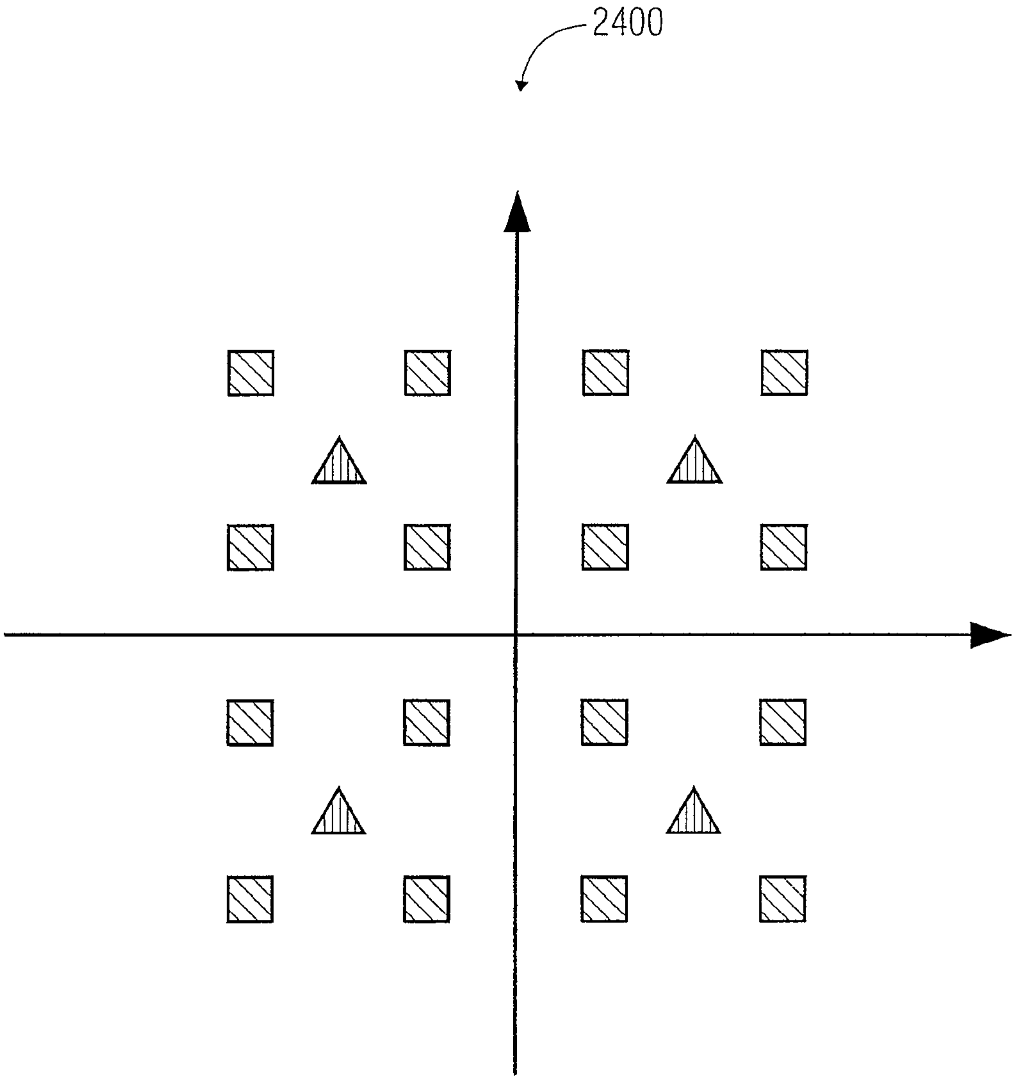
Figure 25B:
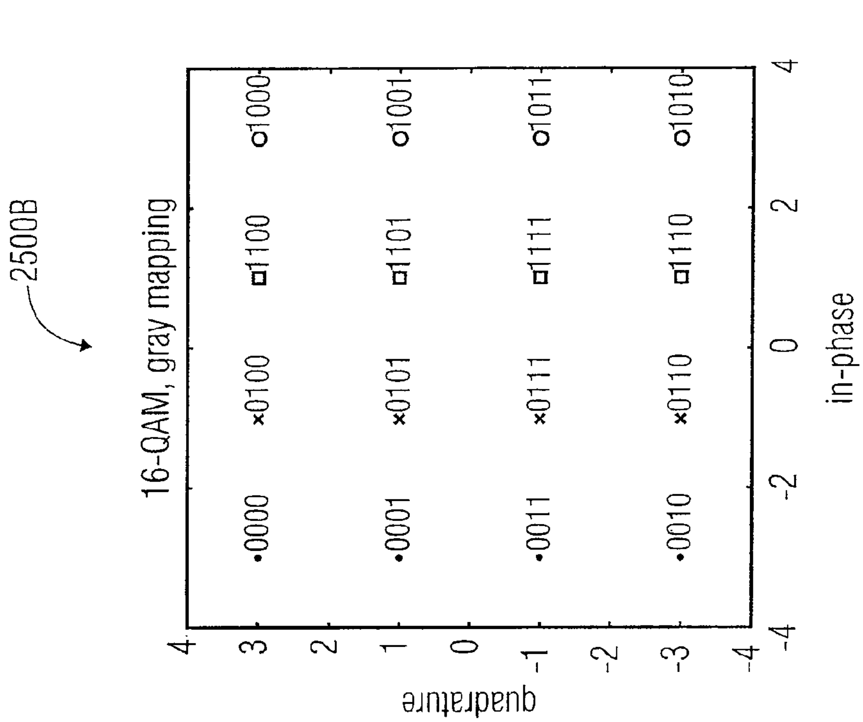
Figure 25A:
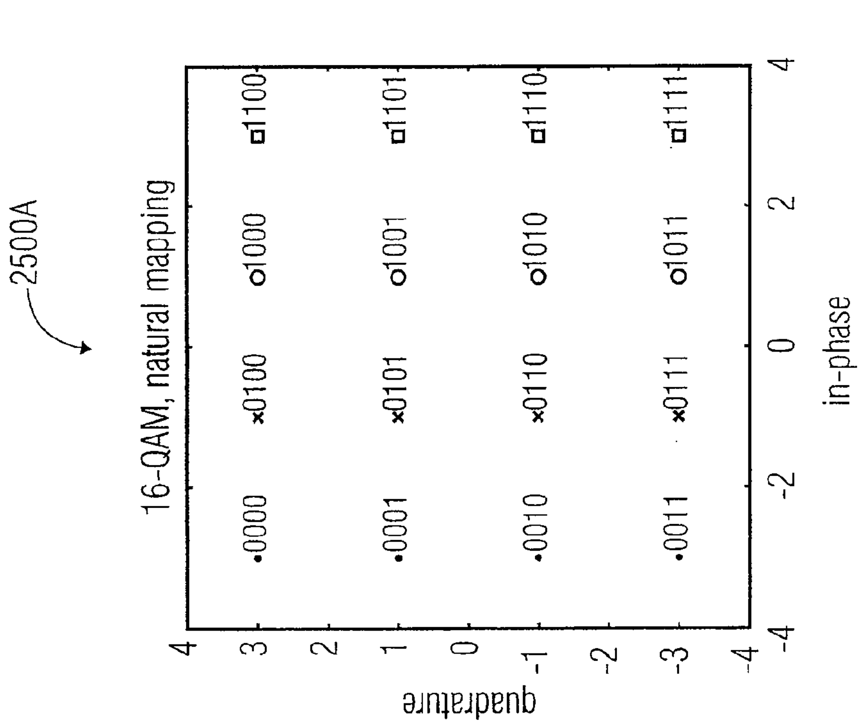
Figure 26A:
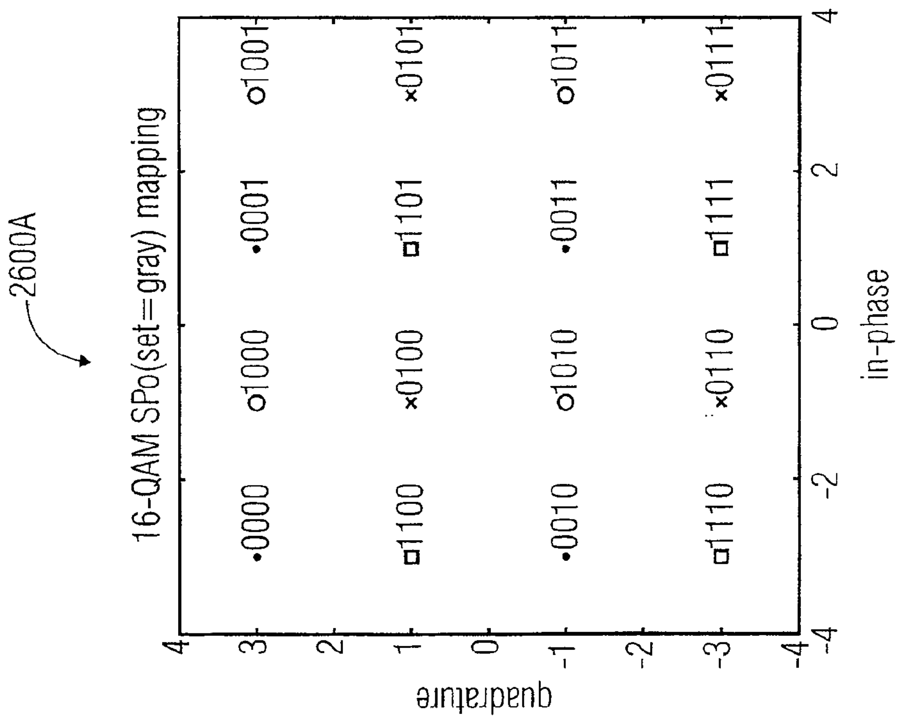
Figure 26B:
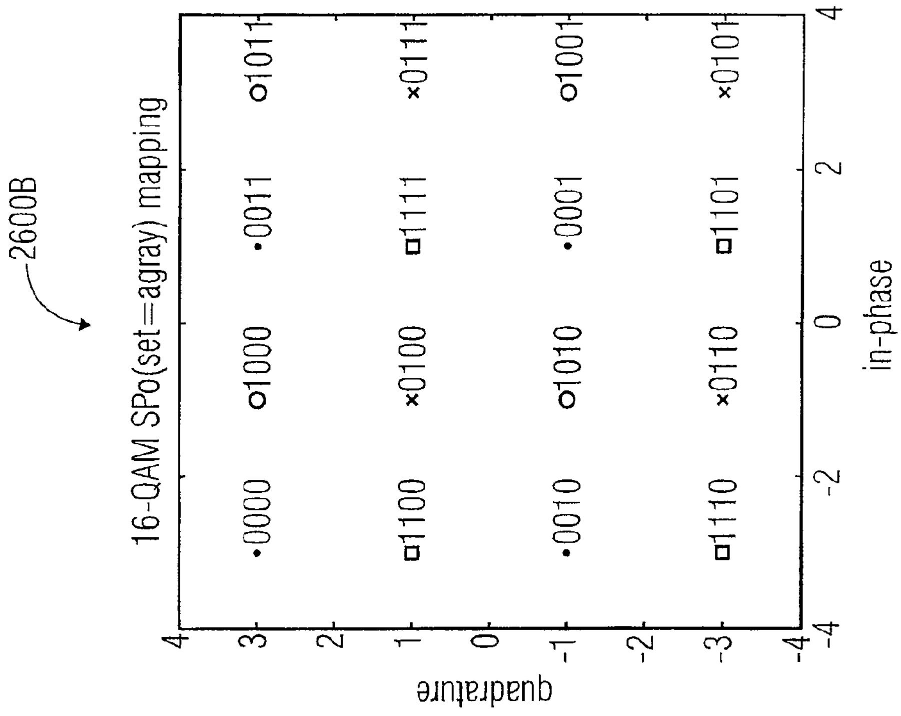
Figure 27A:
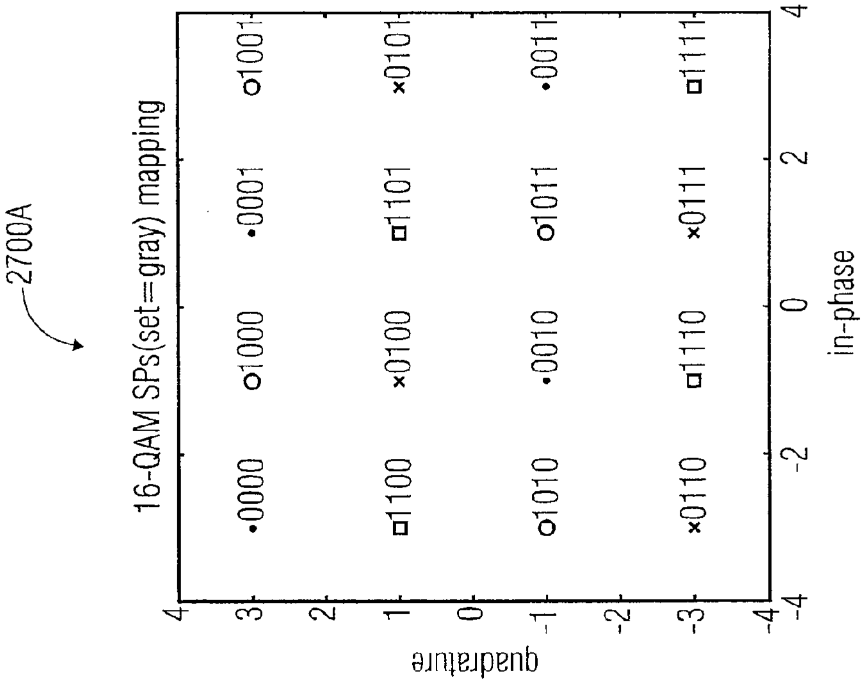
Figure 27B:
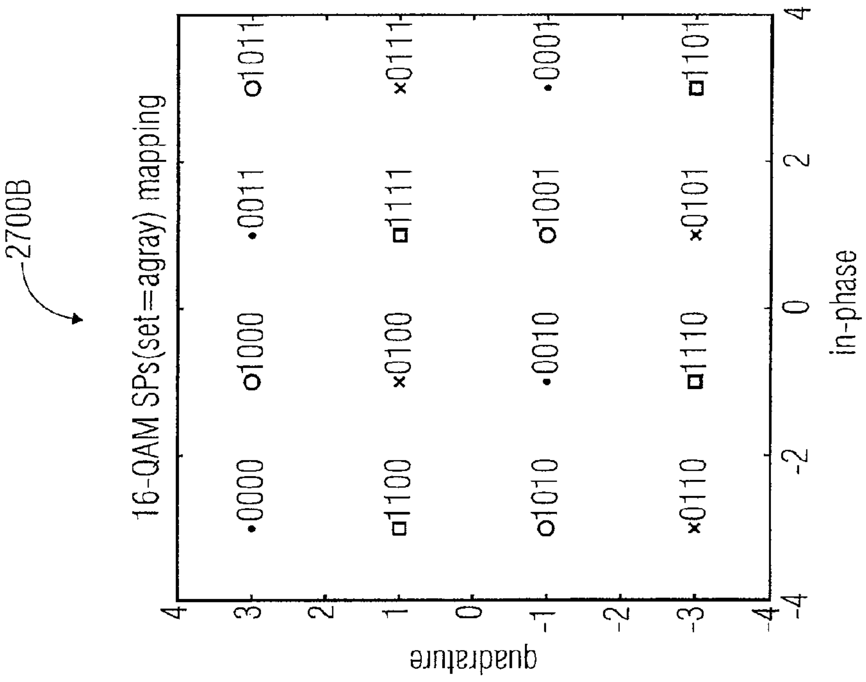
Figure 28B:
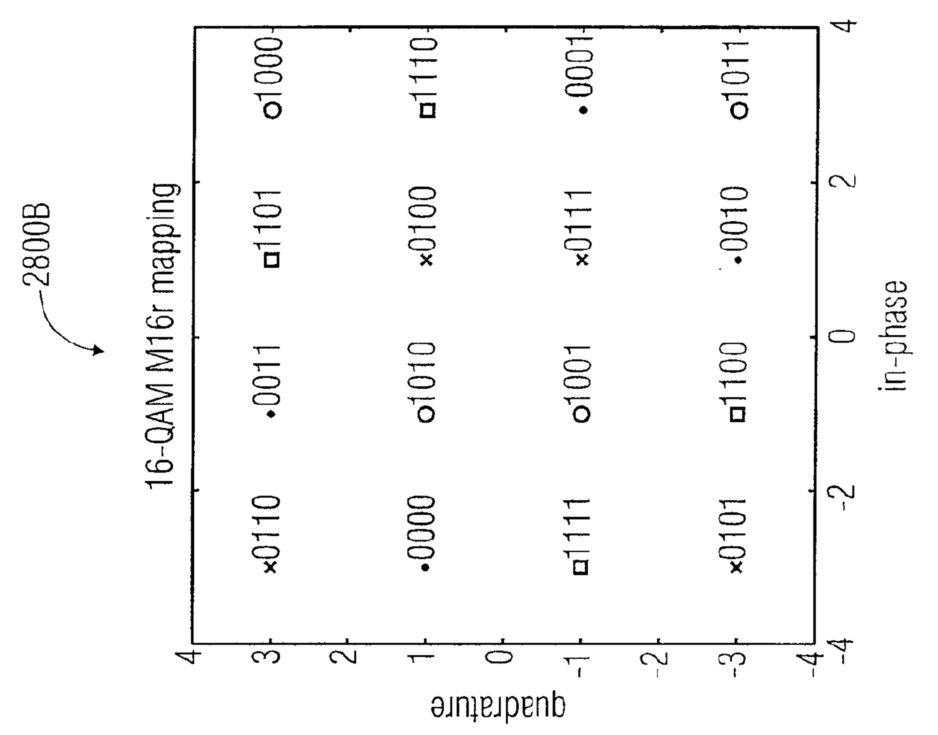
Figure 28A:
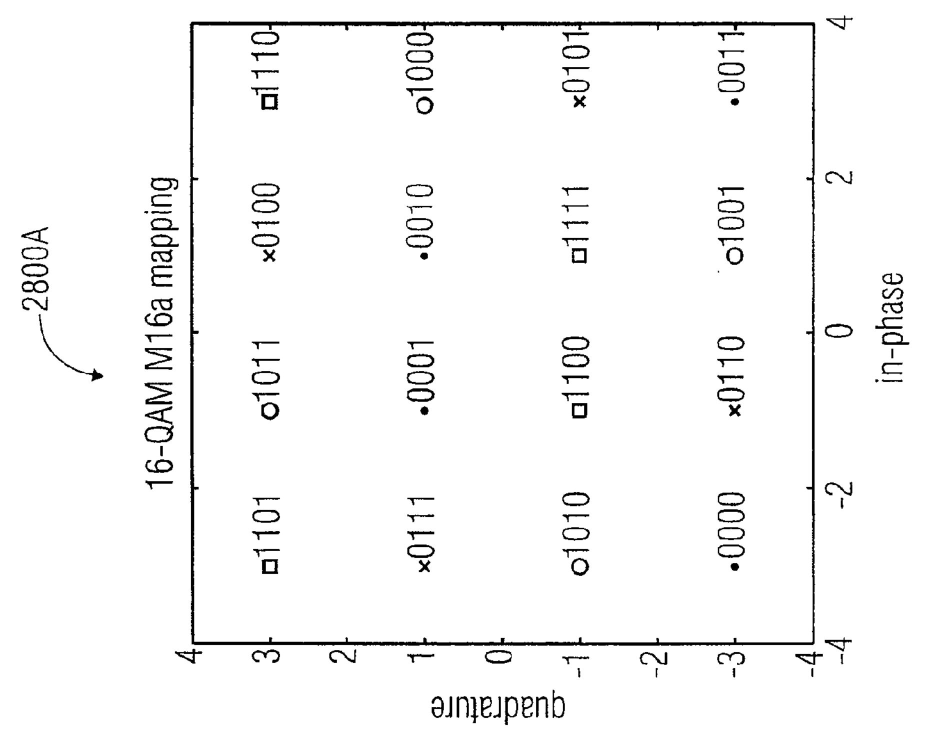
Figure 29:
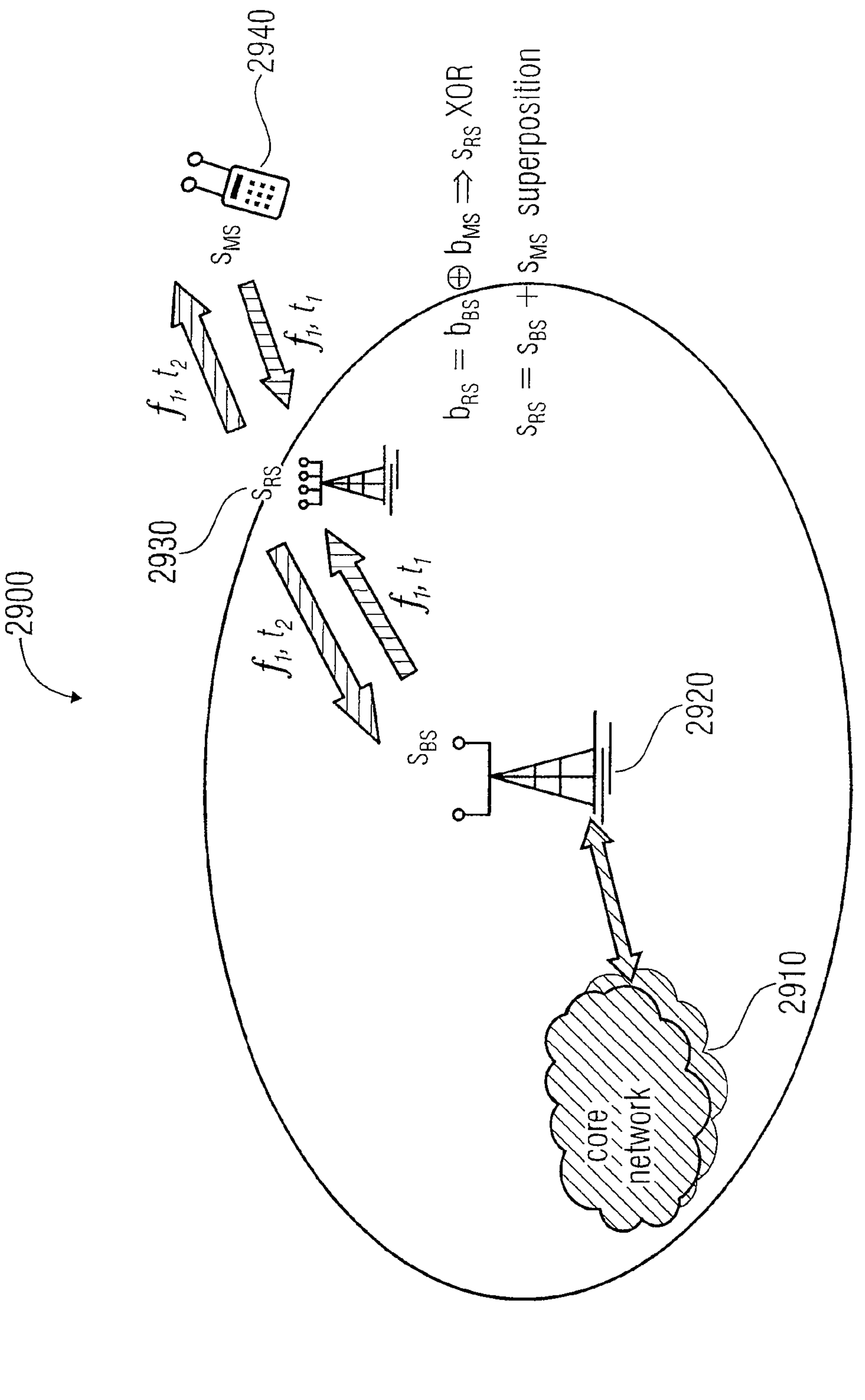
Figure 30A:
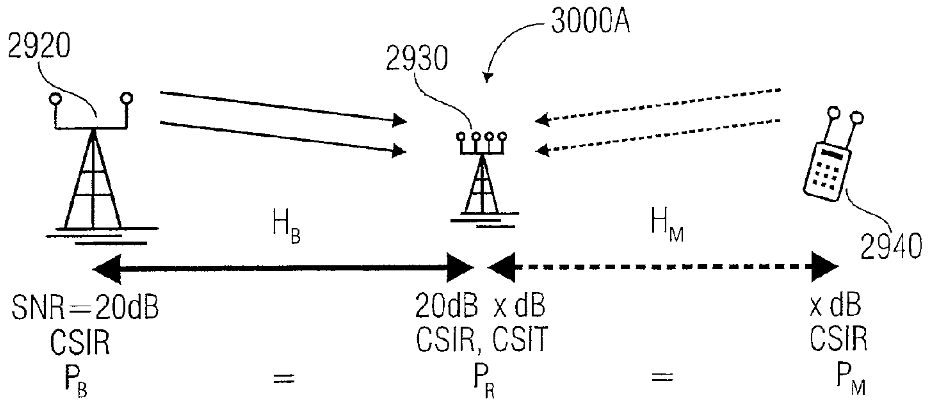
Figure 30B:
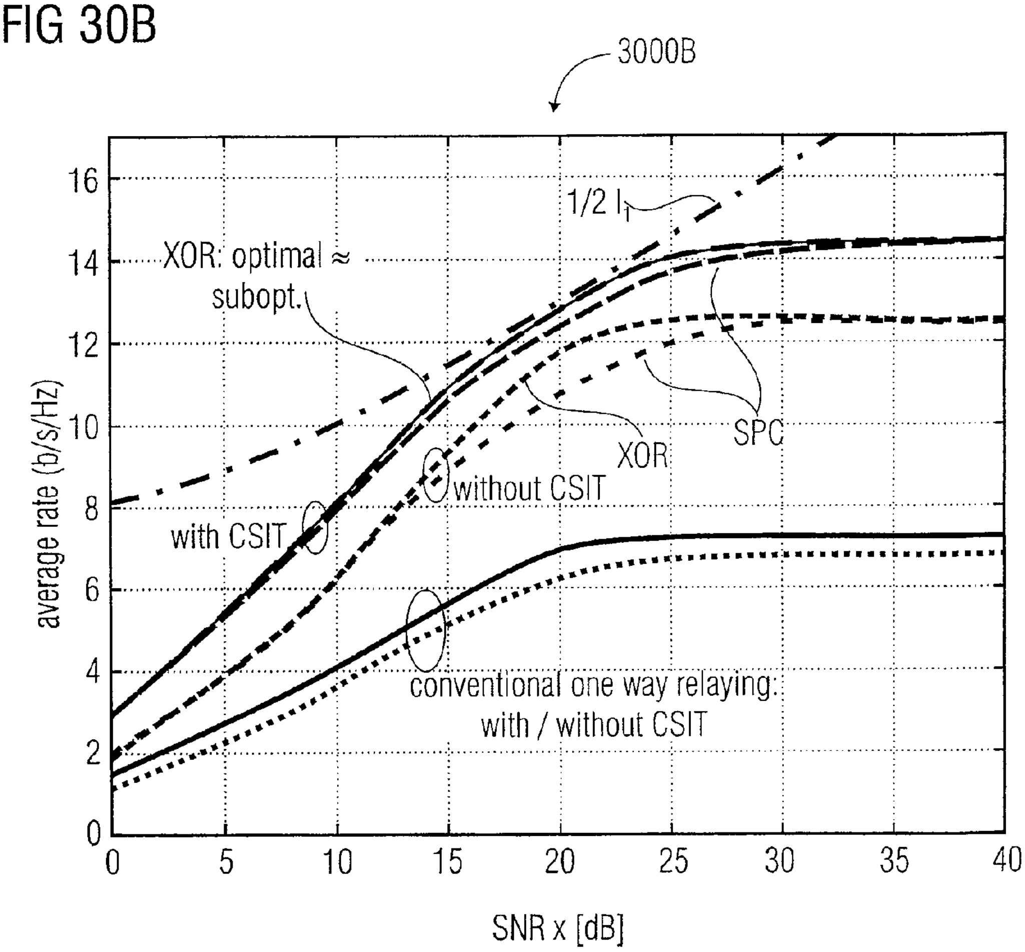
Figure 31:
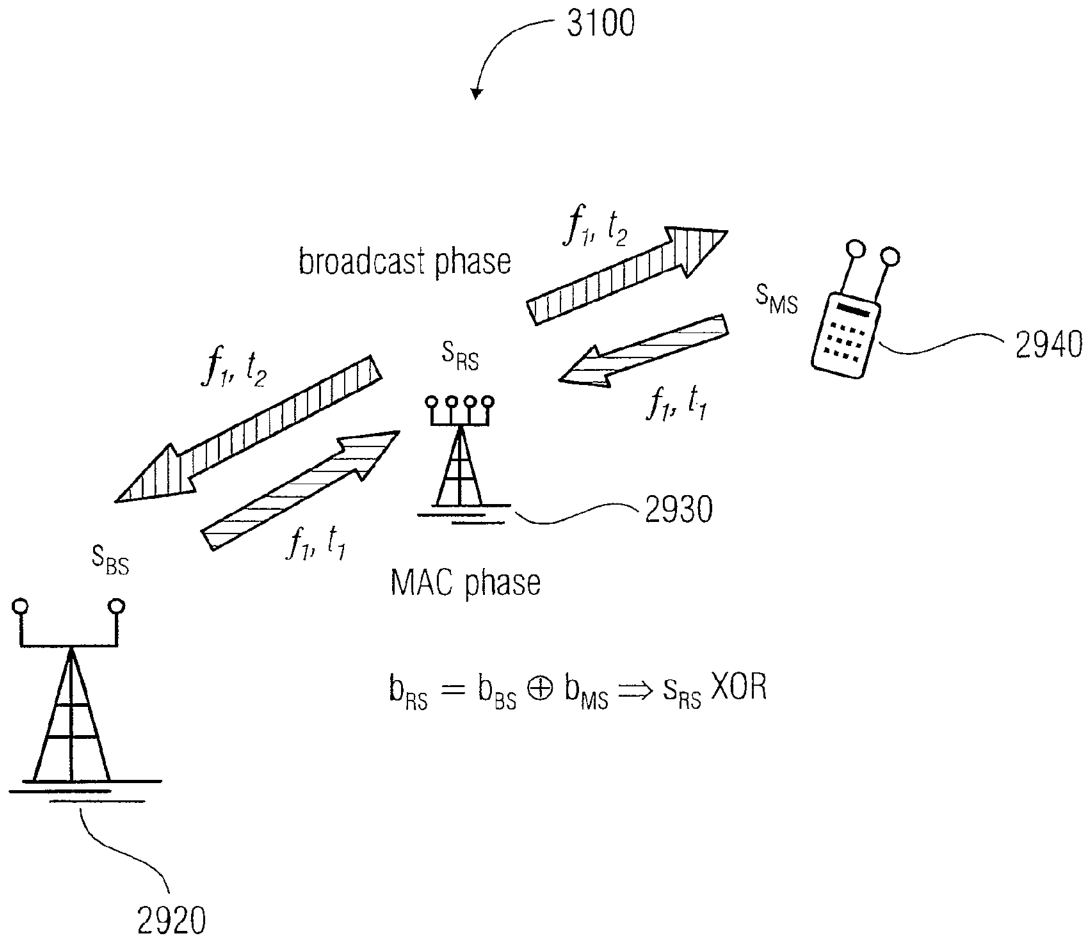
Figure 32A:
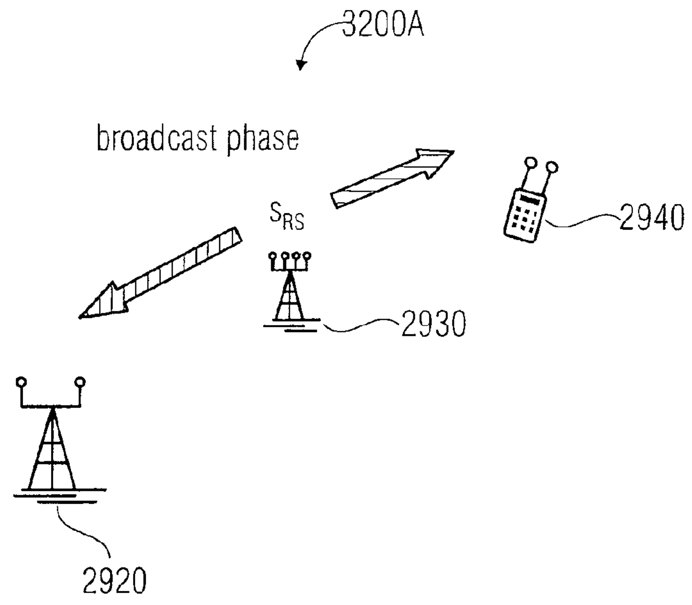
Figure 32B:
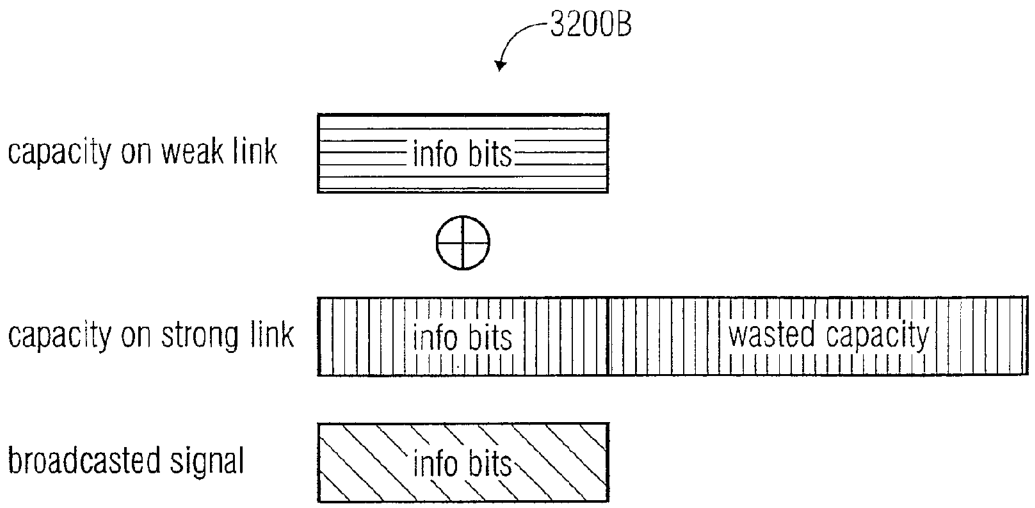
Figure 33A:
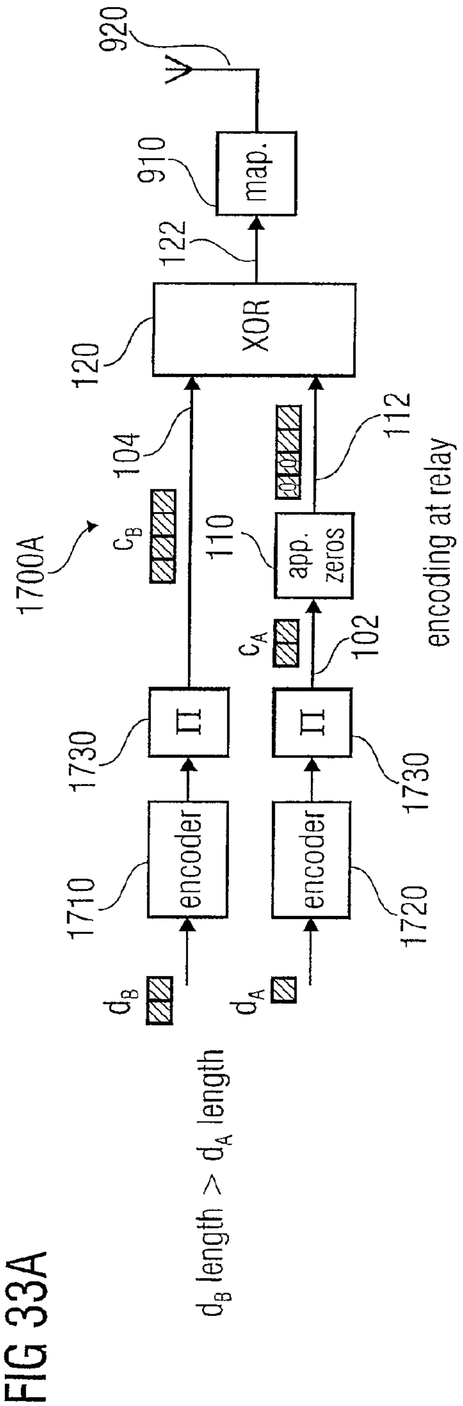
Figure 33B:
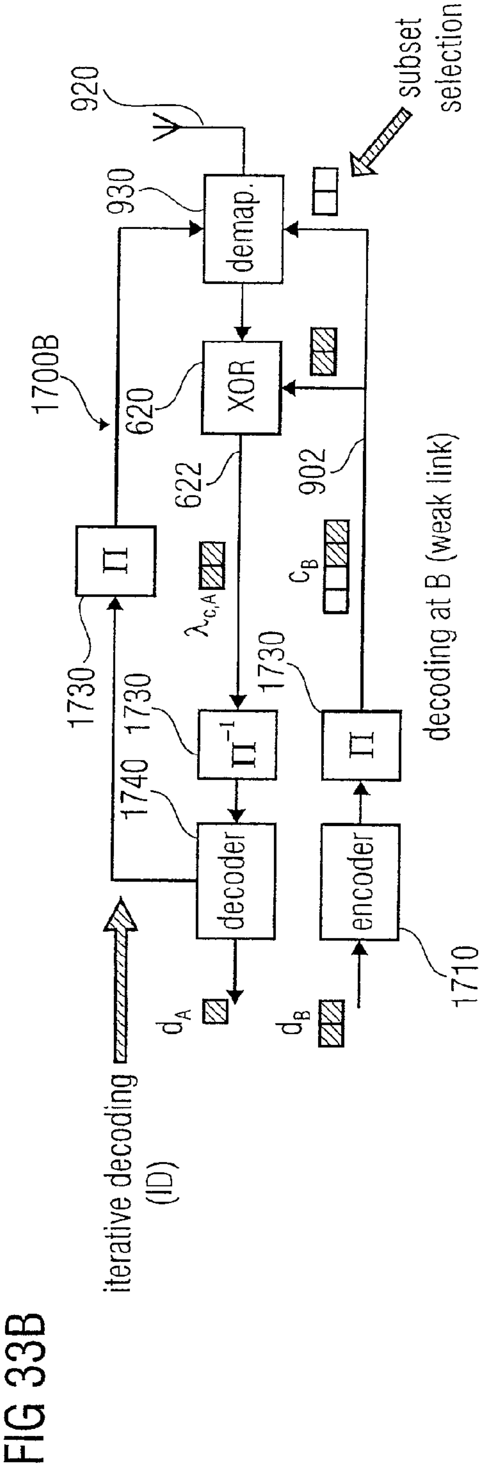
Figure 33C:
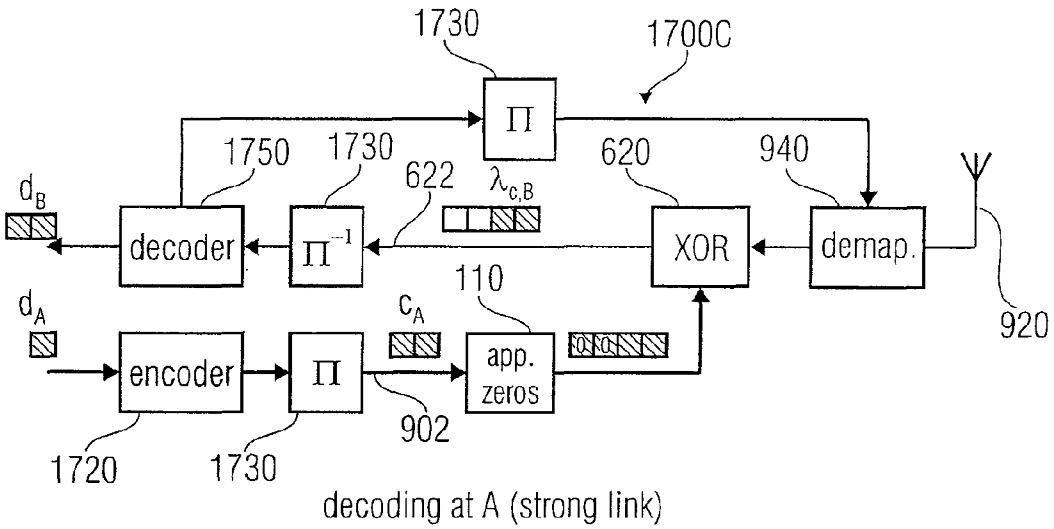
Figure 34A:
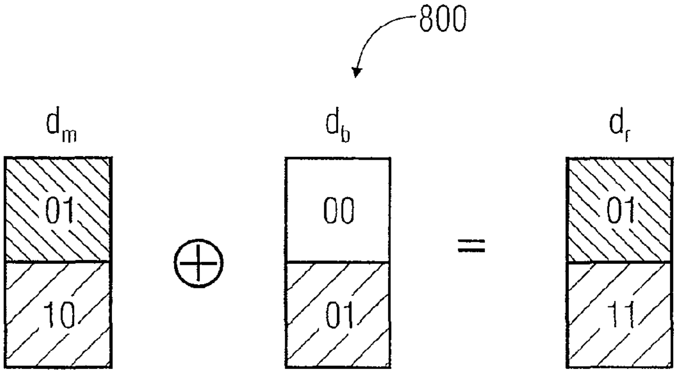
Figure 34C:
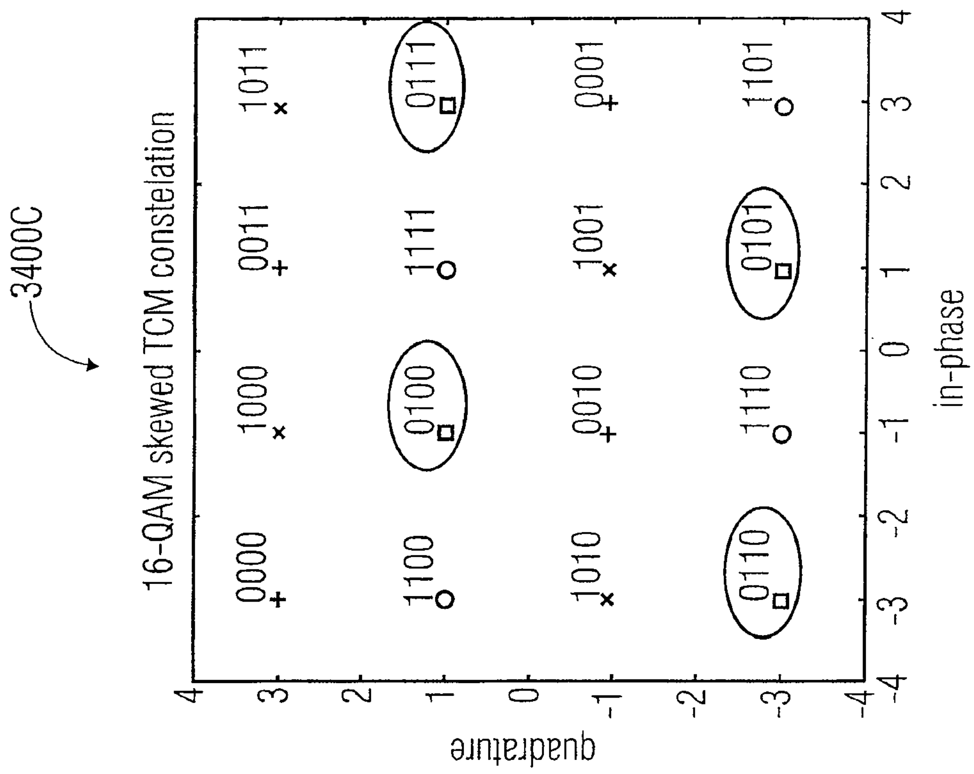
Figure 34B:
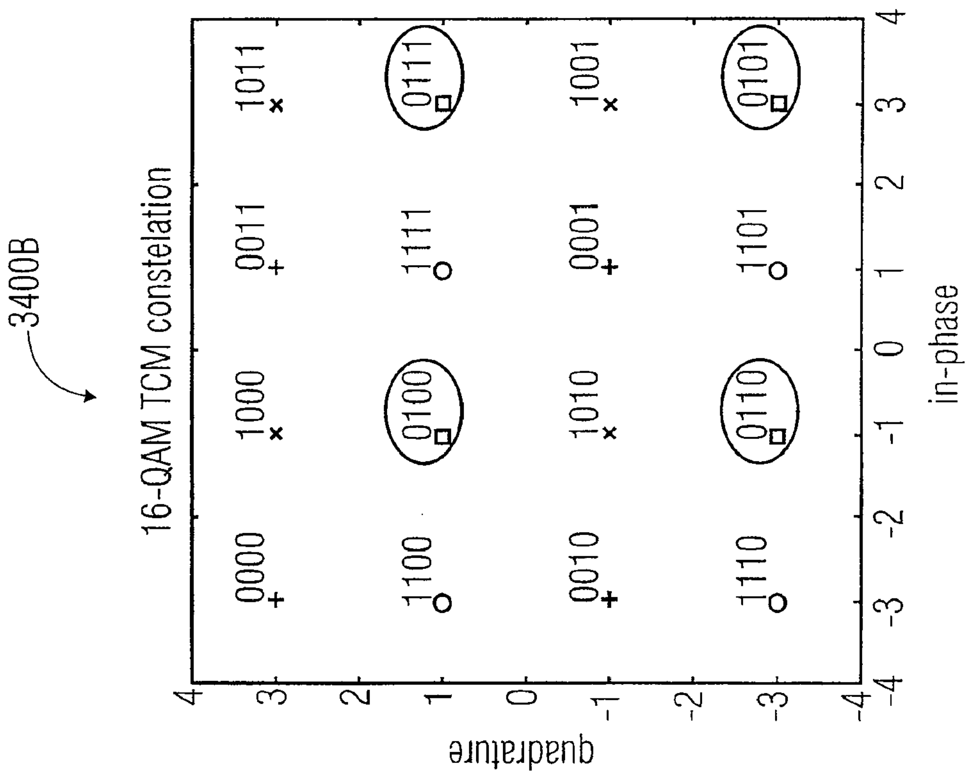
Figure 35A:
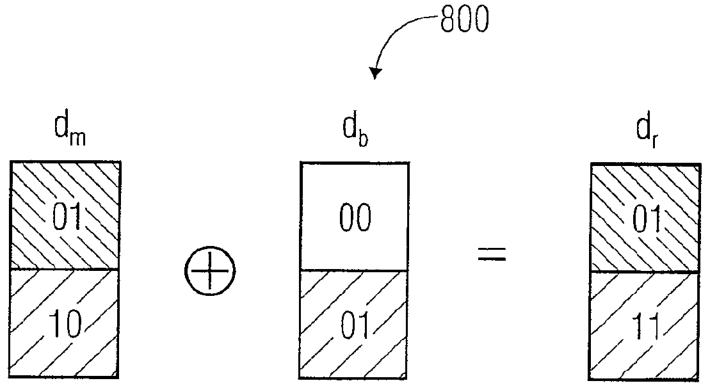
Figure 36A:
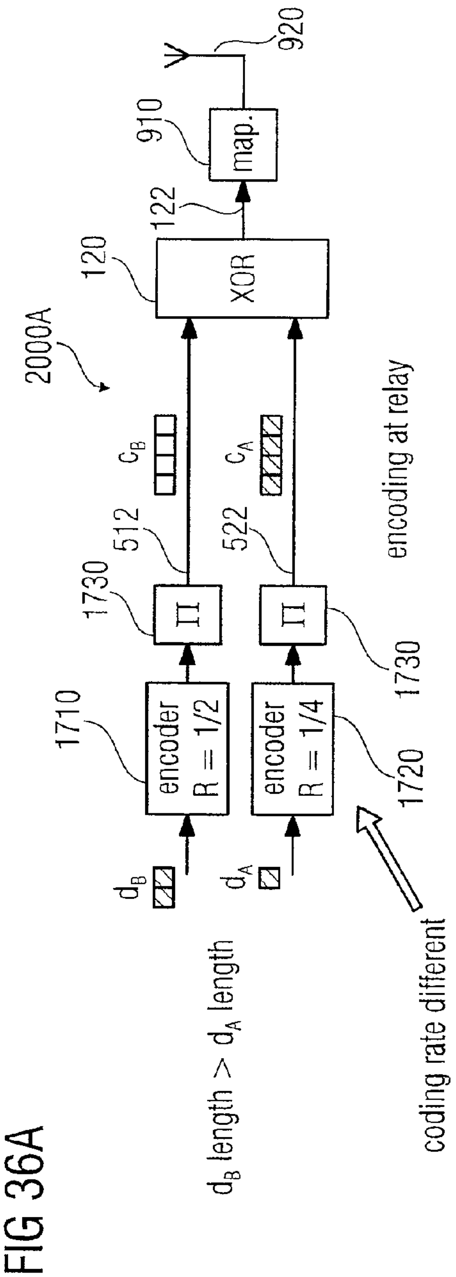
Figure 36B:
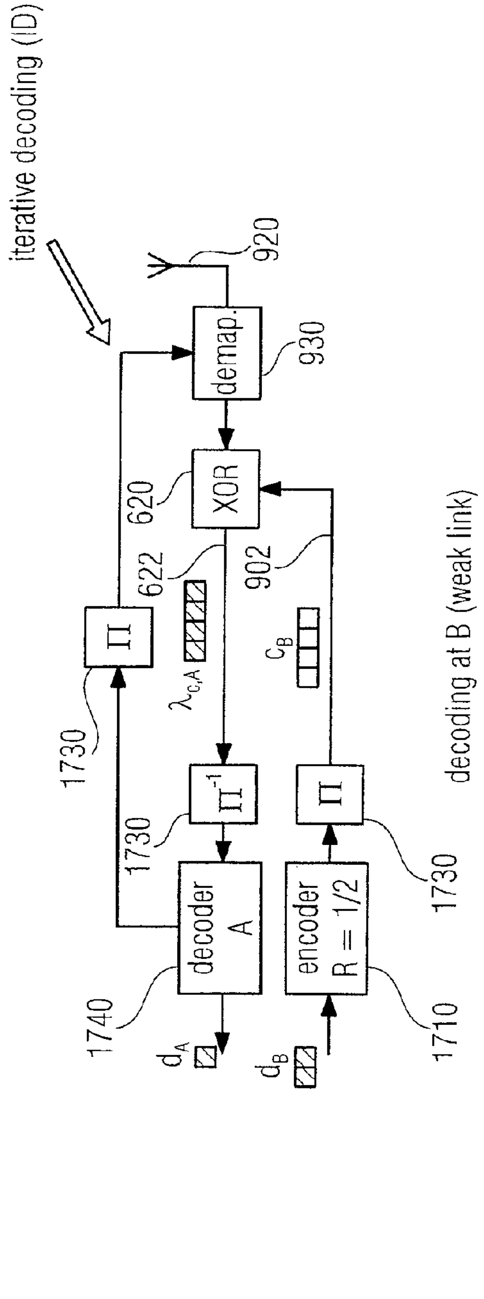
Figure 36C:
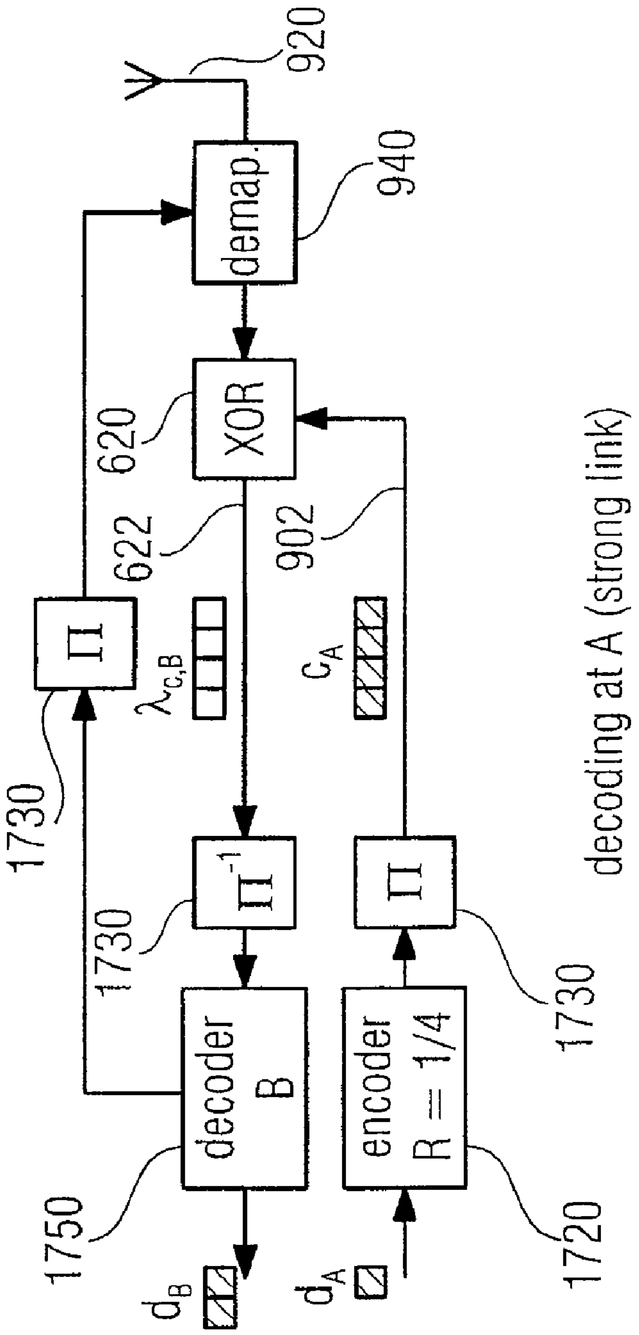
Figure 37A:
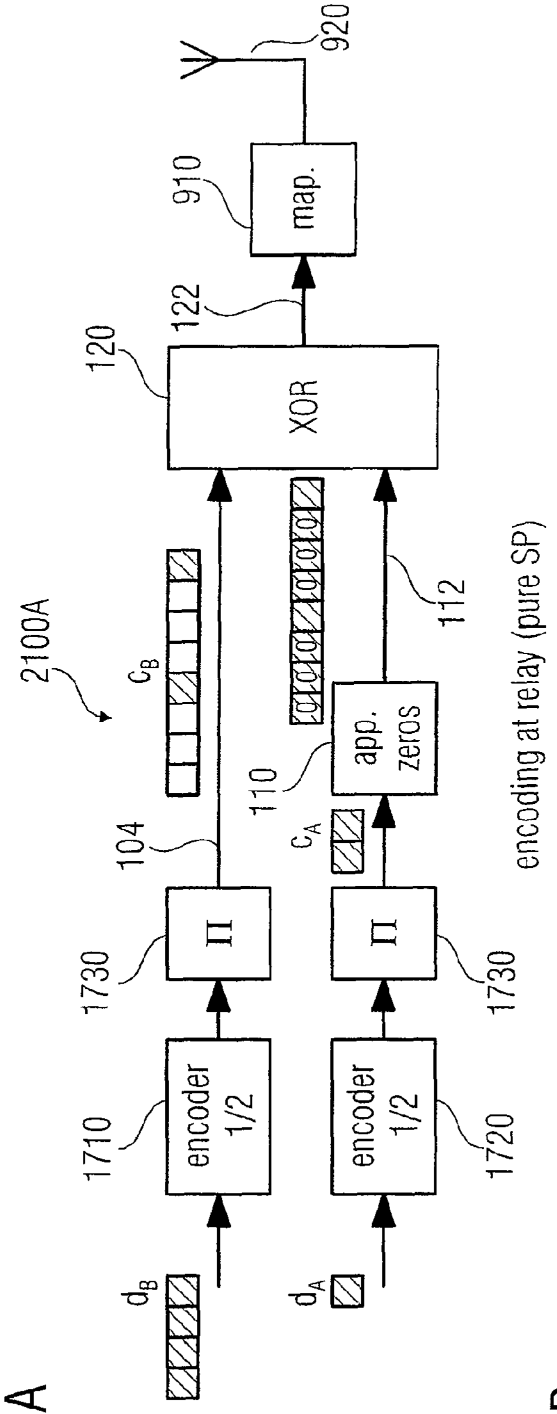
Figure 37B:
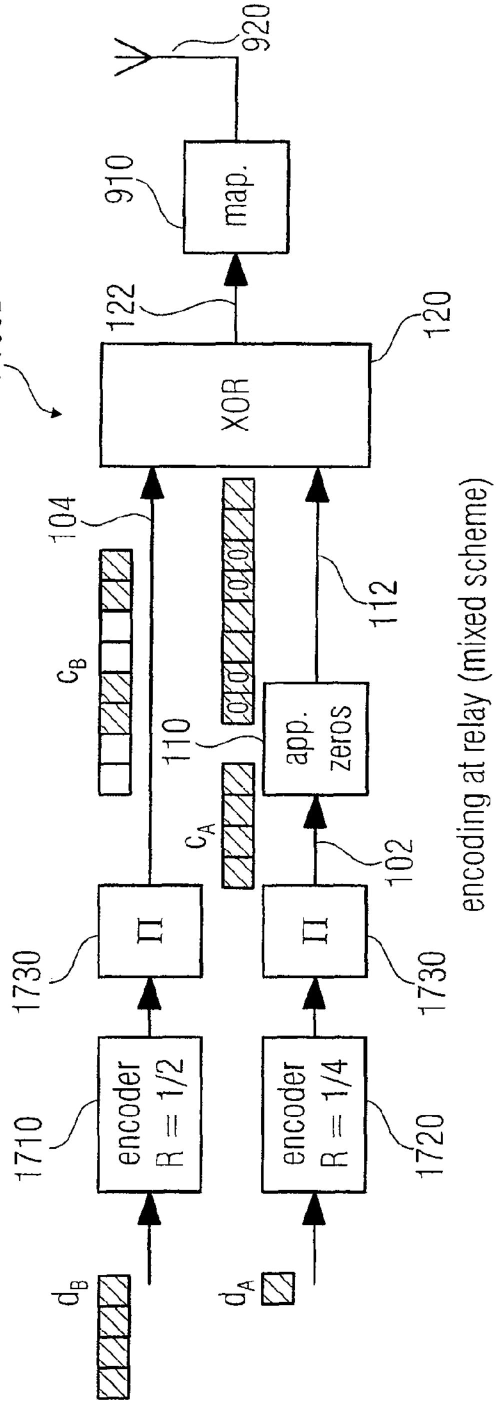
Figure 38B:
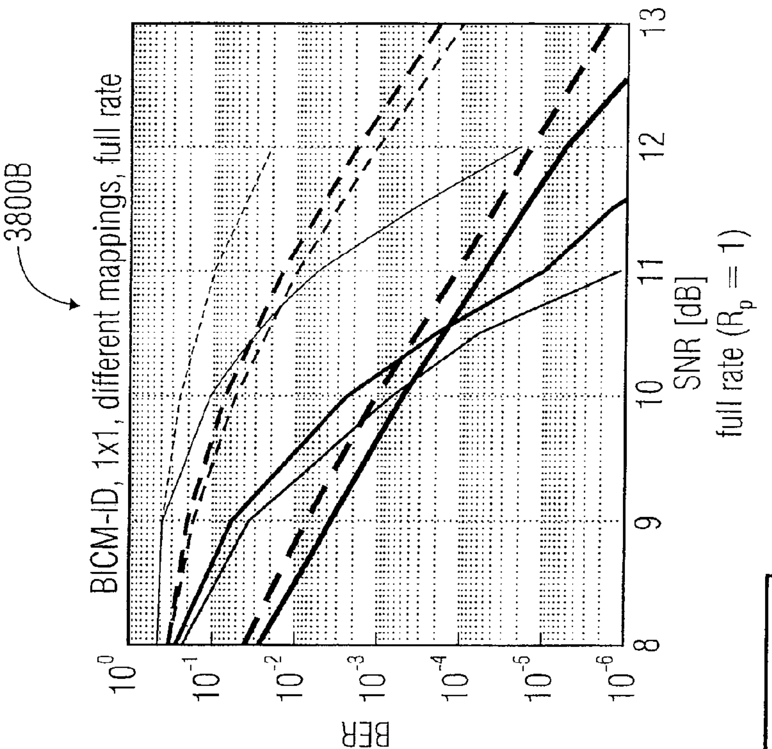
Figure 38A:
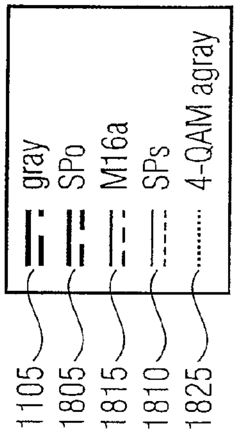
Figure 38A:
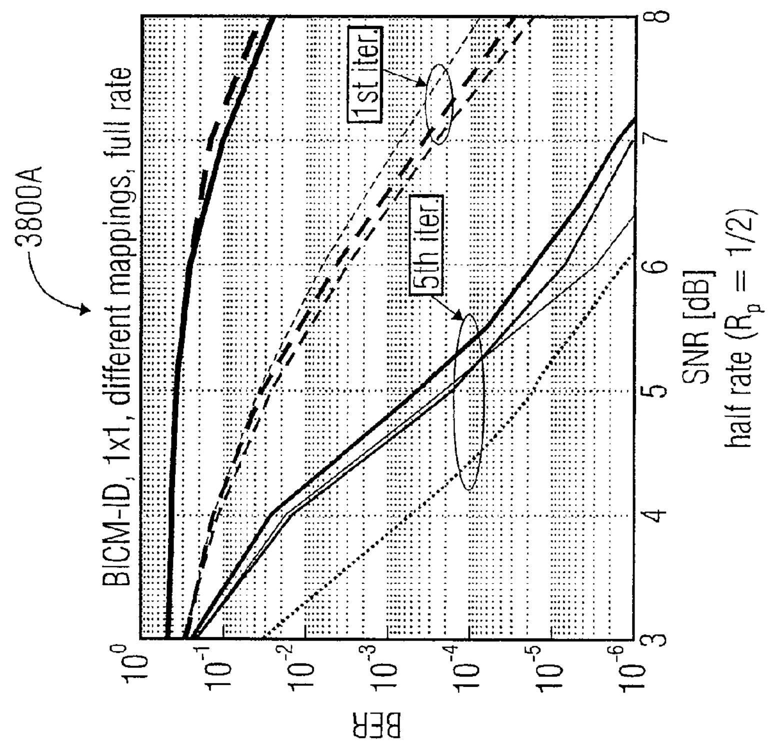
Figure 38C:
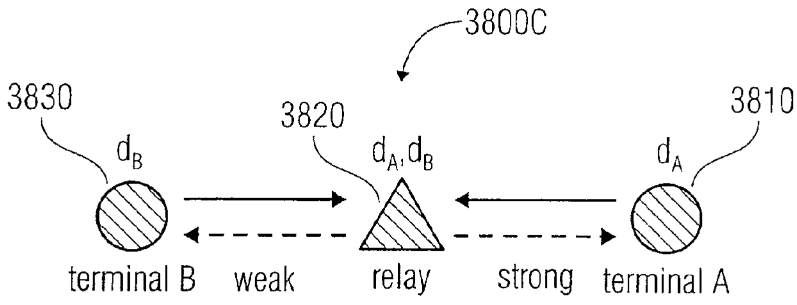
Figure 39A:
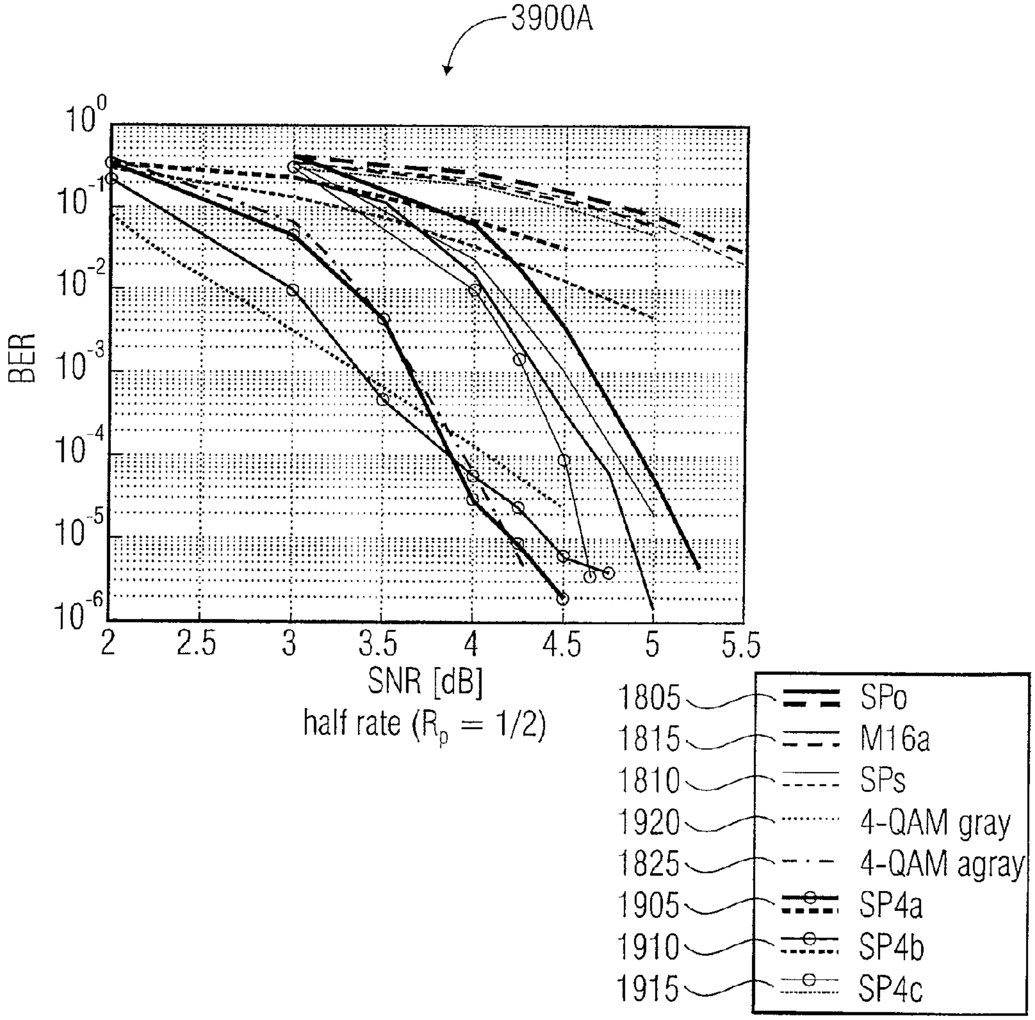
Figure 39B:
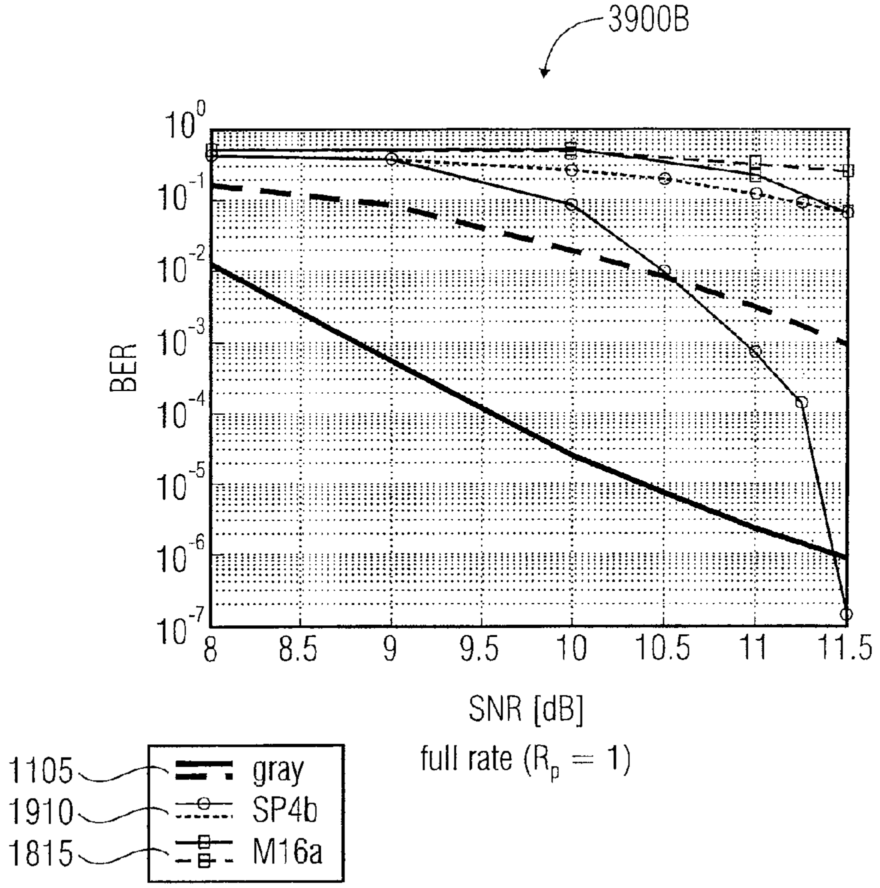
Figure 39C:
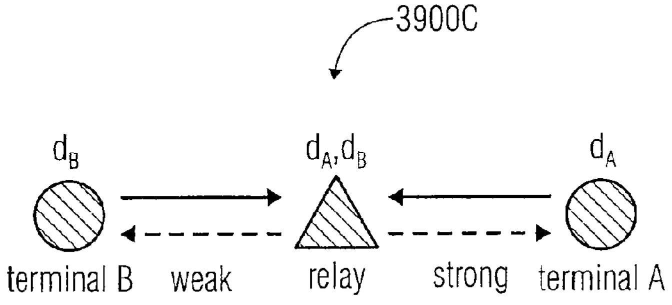
Figure 40A:
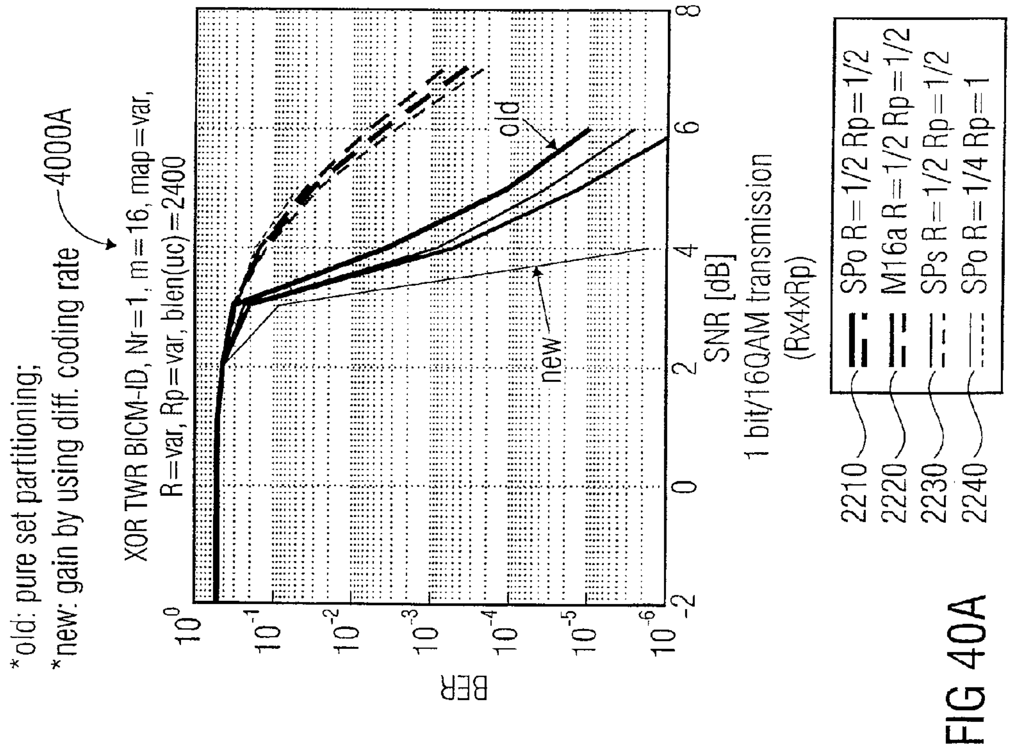
Figure 40B:
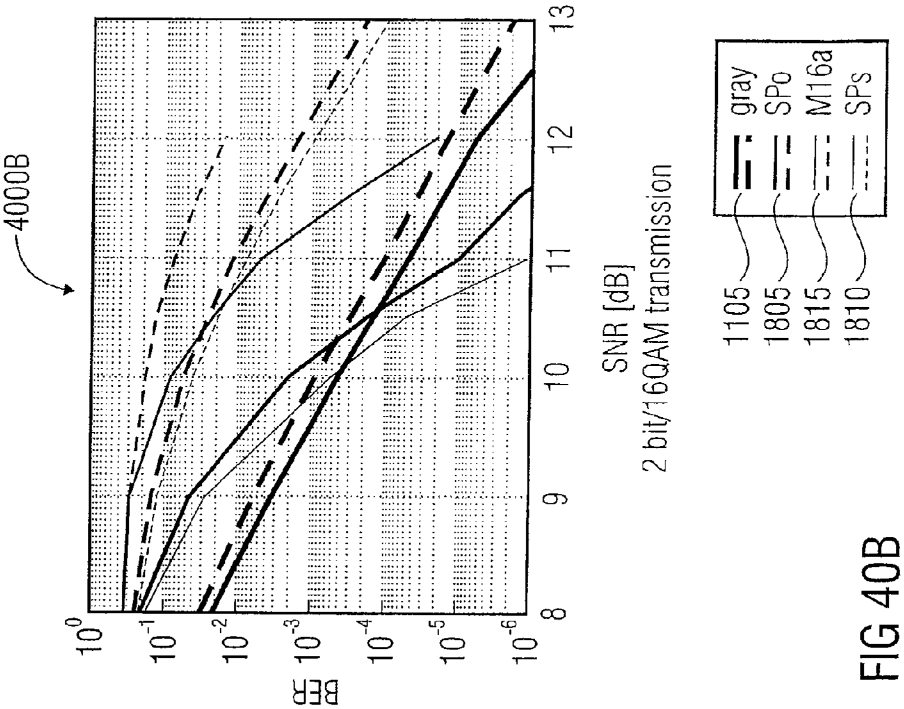
Figure 40C:
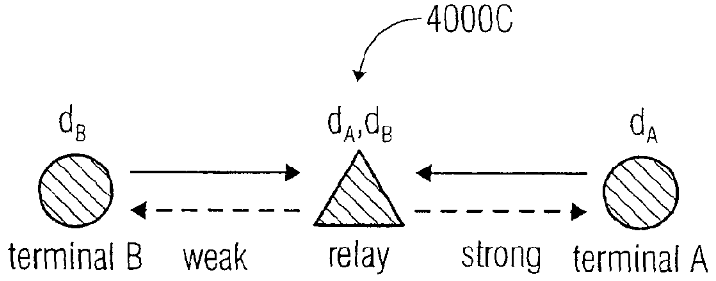
Figure 41A:
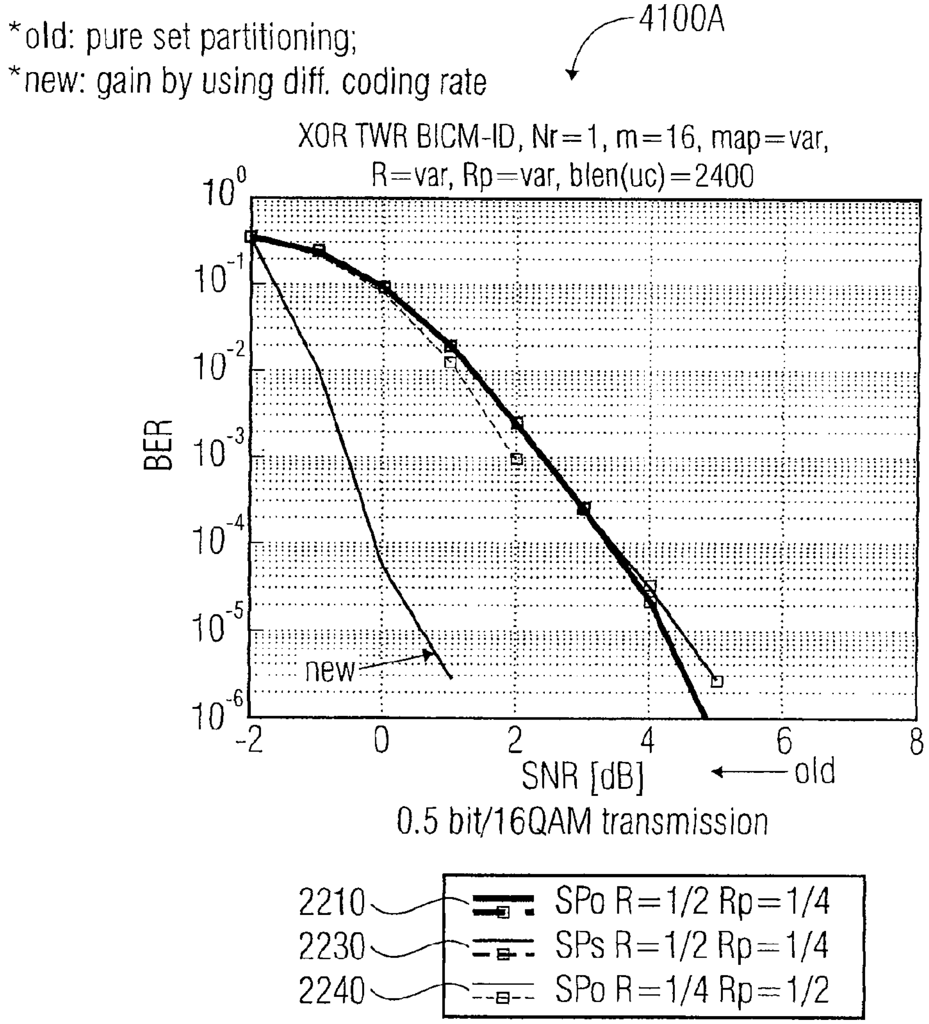
Figure 41B:
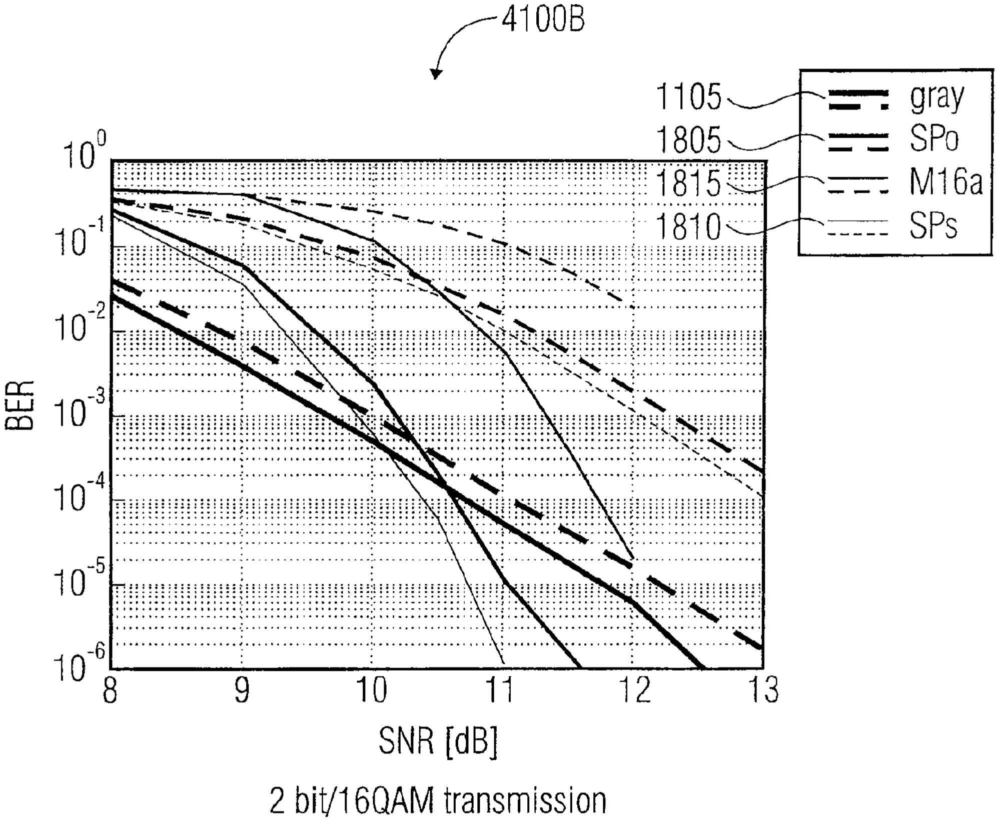
Figure 41C:
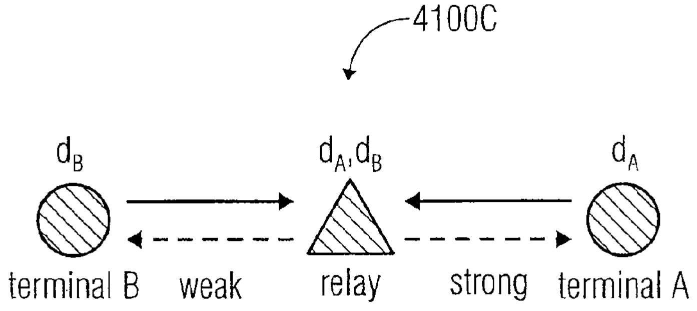
Figure 42:
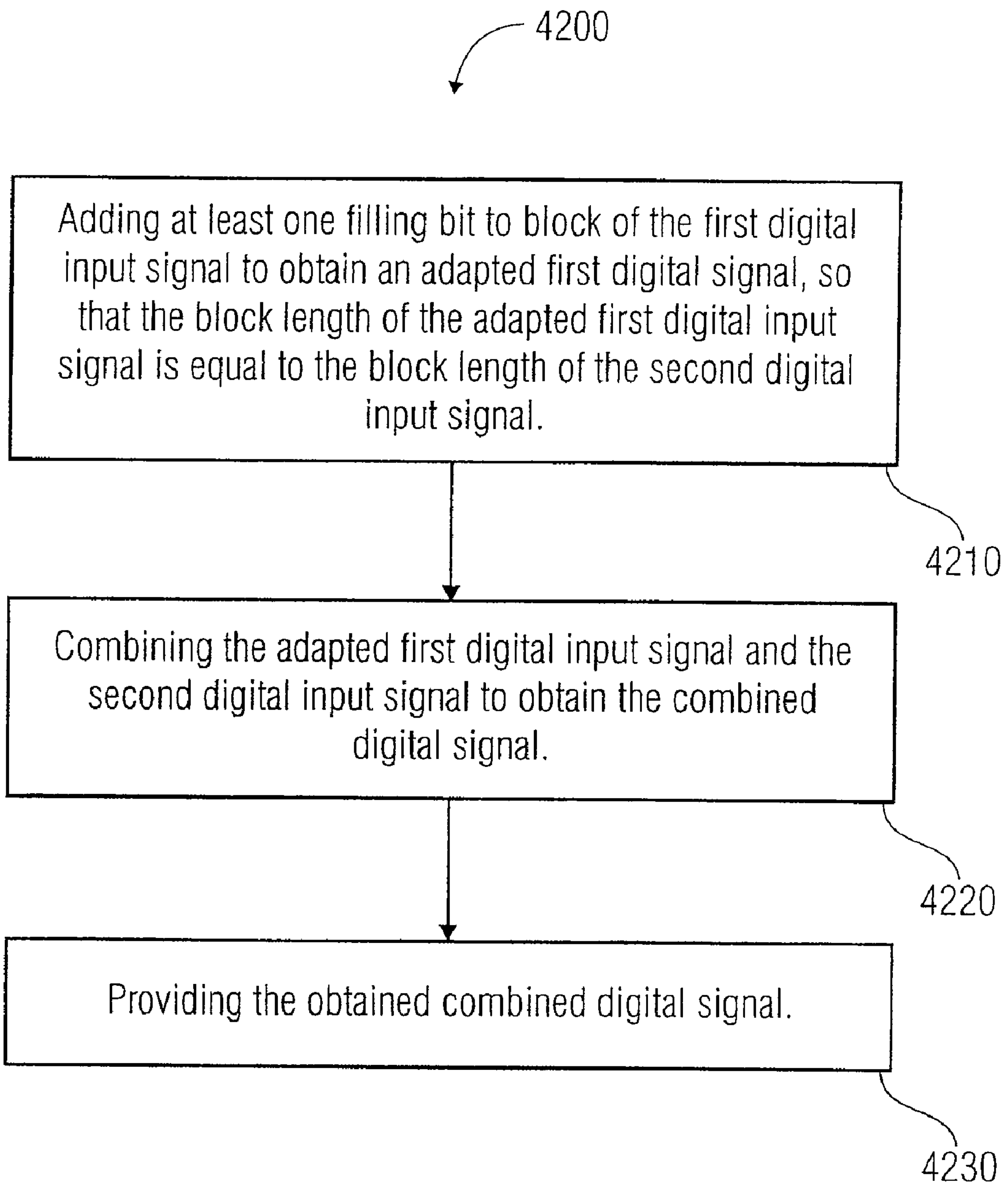
Figure 43:
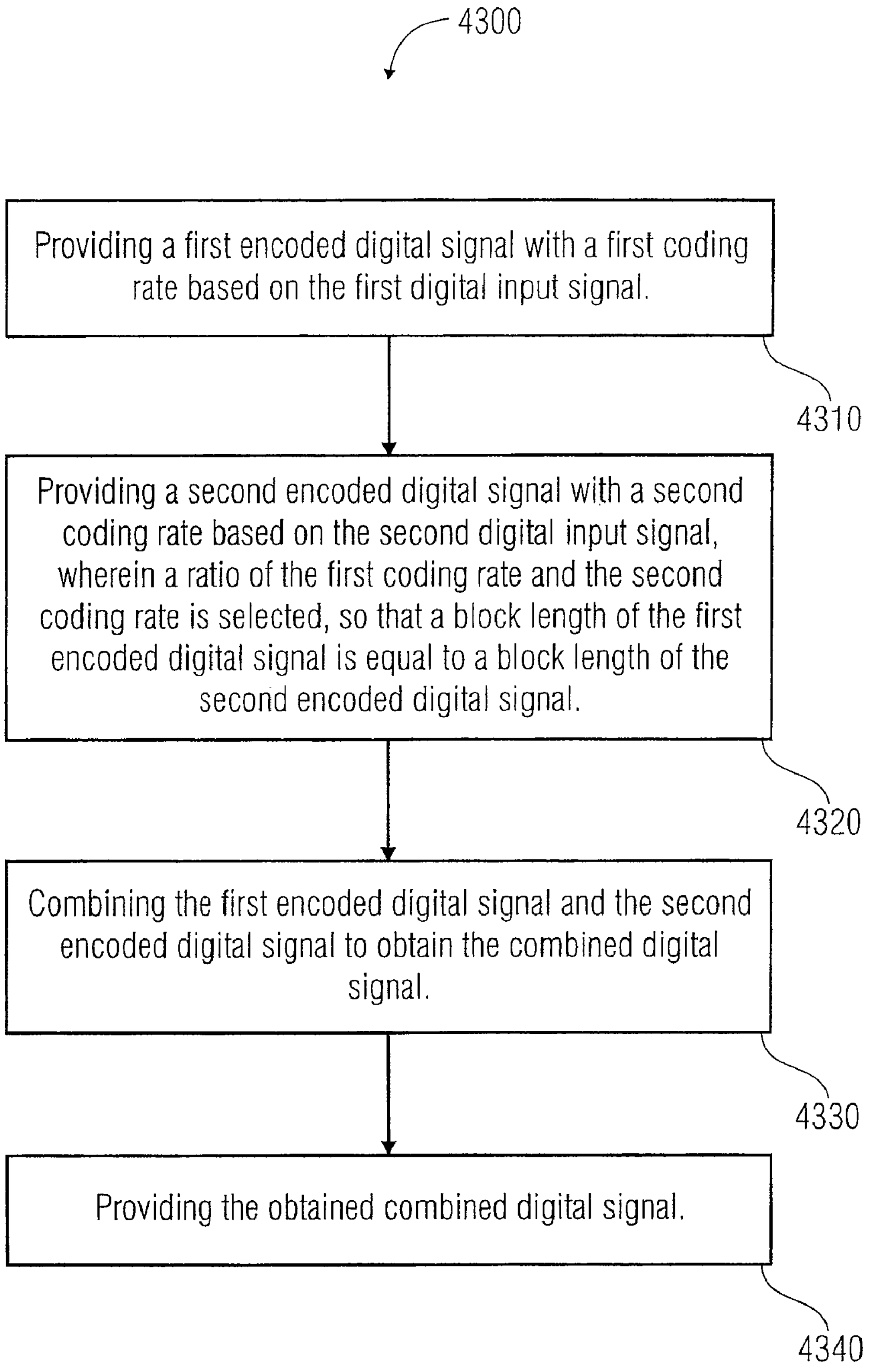
Figure 44A:
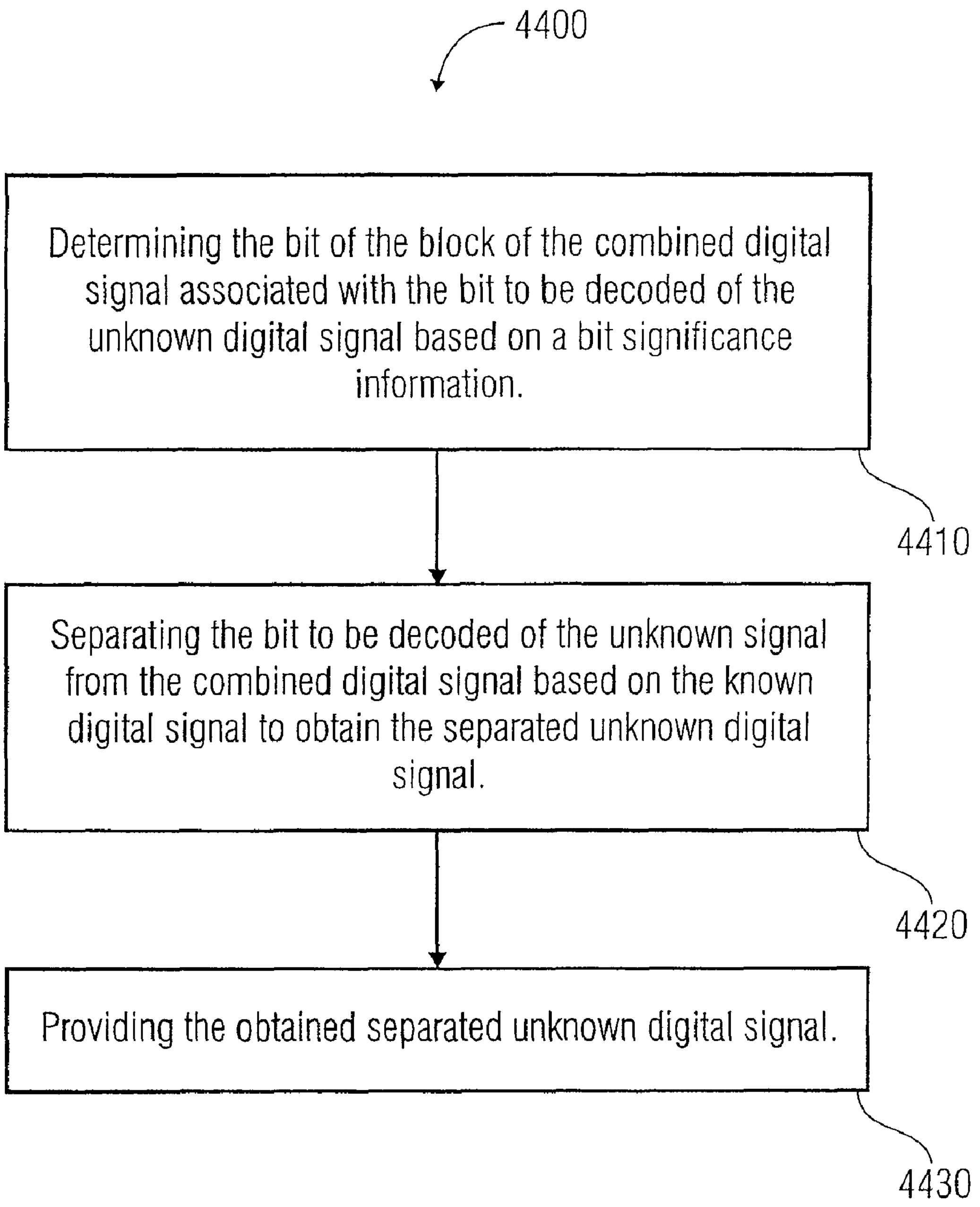
Figure 44B:
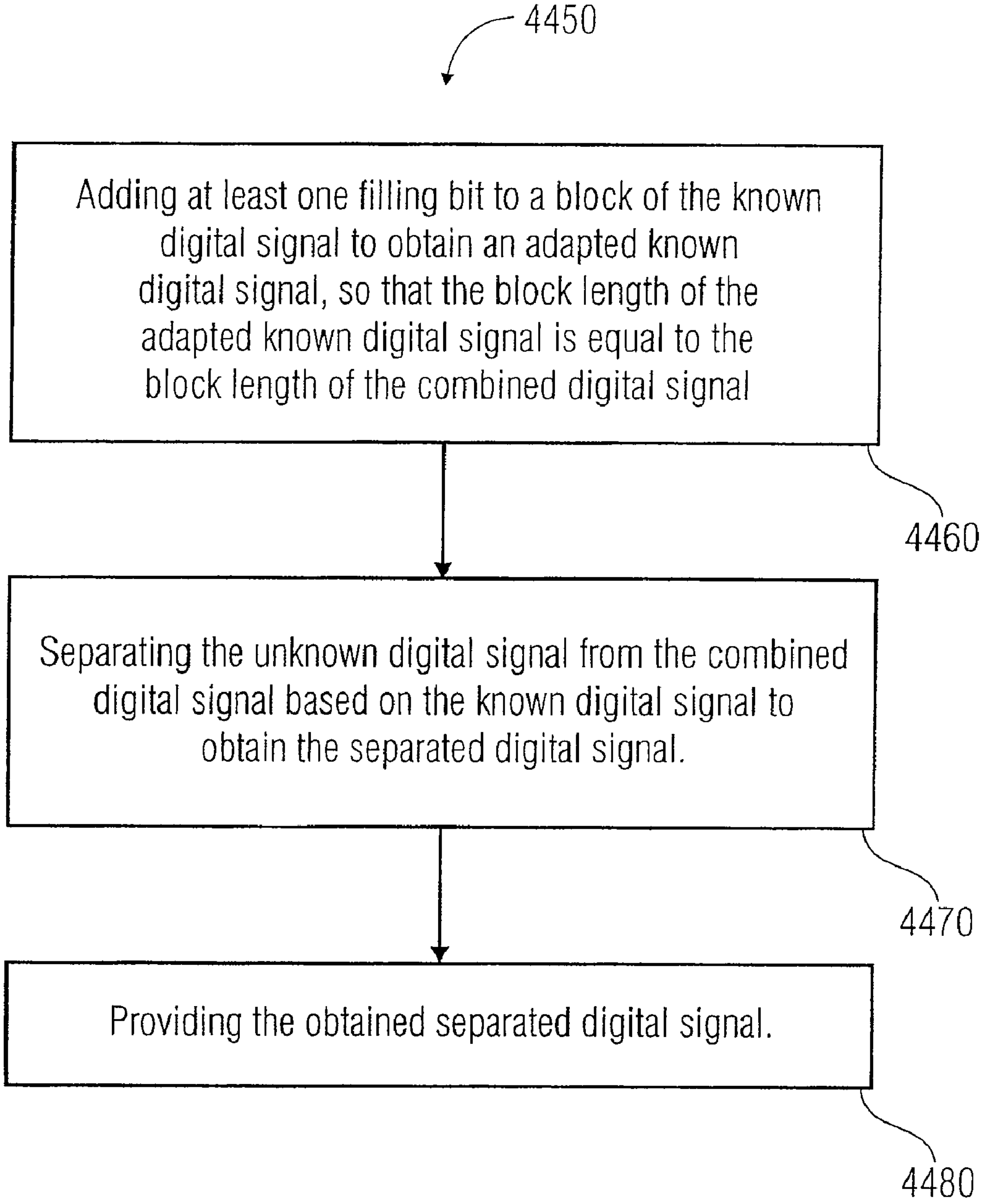

FIG. 9*a*, 9*b*, 9*c* is a schematic illustration of a system model of communication with asymmetric data rates;

FIG. 10*a*, 10*b* is an illustration of a possible set partitioning constellation for 16 QAM (quadrature amplitude modulation);

FIG. 11*a*, 11*b* is a "bit error rate" (BER) versus "signal noise ratio" (SNR) diagram of a two-way-relaying uncoded single input single output (SISO) system;

FIG. 12*a*, 12*b* is a "bit error rate" versus "signal noise ratio" diagram of a two-way-relaying uncoded multiple input multiple output (MIMO) system;

FIG. 13*a*, 13*b* is a block diagram of a bit interleaved coded modulation (BICM) transmitter and receiver;

FIG. 14*a*, 14*b* is a "bit error rate" versus "signal noise ratio" diagram of two-way-relaying uncoded SISO system;

FIG. 15*a*, 15*b* is a "bit error rate" versus "signal noise ratio" diagram of a two-way-relaying uncoded MIMO system;

FIG. 16*a*, 16*b* is a block diagram of bit interleaved coded modulation transmitter and a bit interleaved coded modulation with iterative decoding (BICM-ID) receiver with soft feedback;

FIG. 17*a*, 17*b*, 17*c* is a schematic illustration of a system model of communication with asymmetric data rates;

FIG. 18*a*, 18*b* is a "bit error rate" versus "signal noise ratio" diagram of different mappings in a SISO two-way relaying system using bit interleaved coded modulation with iterative decoding;

FIG. 19*a*, 19*b* is a "bit error rate" versus "signal noise ratio" diagram for different mappings in a MIMO two-way relaying system using bit interleaved coded modulation with iterative decoding;

FIG. 20*a*, 20*b*, 20*c* is a schematic illustration of a system model of communication with asymmetric data rates using different coding rates at a relay;

FIG. 21*a*, 21*b* is a block diagram of an apparatus for providing a combined digital signal;

FIG. 22*a*, 22*b* is a "bit error rate" versus "signal noise ratio" diagram of different methods for a single input single output (SISO) system;

FIG. 23*a*, 23*b* is a "bit error rate" versus "signal noise ratio" diagram of different methods for a multiple input multiple output (MIMO) system;

FIG. 24 is a schematic illustration of a mapping code with multi-resolution;

FIG. 25*a*, 25*b* is a schematic illustration of a natural and a gray mapping;

FIG. 26*a*, 26*b* is a schematic illustration of an orthogonal set partitioning mapping (SPo);

FIG. 27*a*, 27*b* is a schematic illustration of a skewed set partitioning mapping (SPs);

FIG. 28*a*, 28*b* is a schematic illustration of mapping schemes shown in "J. H. F. Schreckenbach, N. Gortz and G. Bauch, "Optimized symbol mappings for bit-interleaved coded modulation with iterative decoding," in *Proc. IEEE Global Comm. Conf.* (*GLOBECOM*), San Francisco, Calif., Dec. 1-5, 2003";

FIG. 29 is a schematic illustration of a wireless communication system;

FIG. 30*a*, 30*b* is a schematic illustration of a wireless communication system and an "average rate" versus "signal noise ratio" diagram;

FIG. 31 is a schematic illustration of a wireless communication system;

FIG. 32*a*, 32*b* is a schematic illustration of a wireless communication system and a schematic illustration of the capacity on the weak and the strong link;

FIG. 33*a*, 33*b*, 33*c* is a schematic illustration of a system model of communication with asymmetric data rates;

FIG. 34*a*, 34*b*, 34*c* is a schematic illustration of an asymmetric XOR coding and a schematic illustration of a set partitioning constellation;

FIG. 35 is a schematic illustration of an asymmetric XOR coding and a schematic illustration of an hierarchical modulation constellation;

FIG. 36*a*, 36*b*, 36*c* is a schematic illustration of a system model of communication with asymmetric data rates using different coding rates at the relay;

FIG. 37*a*, 37*b* is a block diagram of an apparatus for providing a combined digital signal;

FIG. 38*a*, 38*b*, 38*c* is a "bit error rate" versus "signal noise ratio" diagram of a single input single output (SISO) system and a schematic illustration of an SISO system;

FIG. 39*a*, 39*b*, 39*c* is a "bit error rate" versus "signal noise ratio" diagram of a multiple input multiple output (MIMO) system and a schematic illustration of a multiple input multiple output system;

FIG. 40*a*, 40*b*, 40*c* is a "bit error rate" versus "signal noise ratio" diagram of a single input single output system and a schematic illustration of a single input single output system;

FIG. 41*a*, 41*b*, 41*c* is a "bit error rate" versus "signal noise ratio" diagram of a single input single output system and a schematic illustration of a single input single output system;

FIG. 42 is a flow chart of a method for providing a combined digital signal;

FIG. 43 is a flow chart of a method for providing a combined digital signal;

FIG. 44*a*, 44*b* is a flow chart of a method for providing a separated digital signal;

FIG. 45 is a table of the mapping for SP4a;

FIG. 46 is a table of the mapping for SP4b: and

FIG. 47 is a table of the mapping for SP4c.

Figure 1:
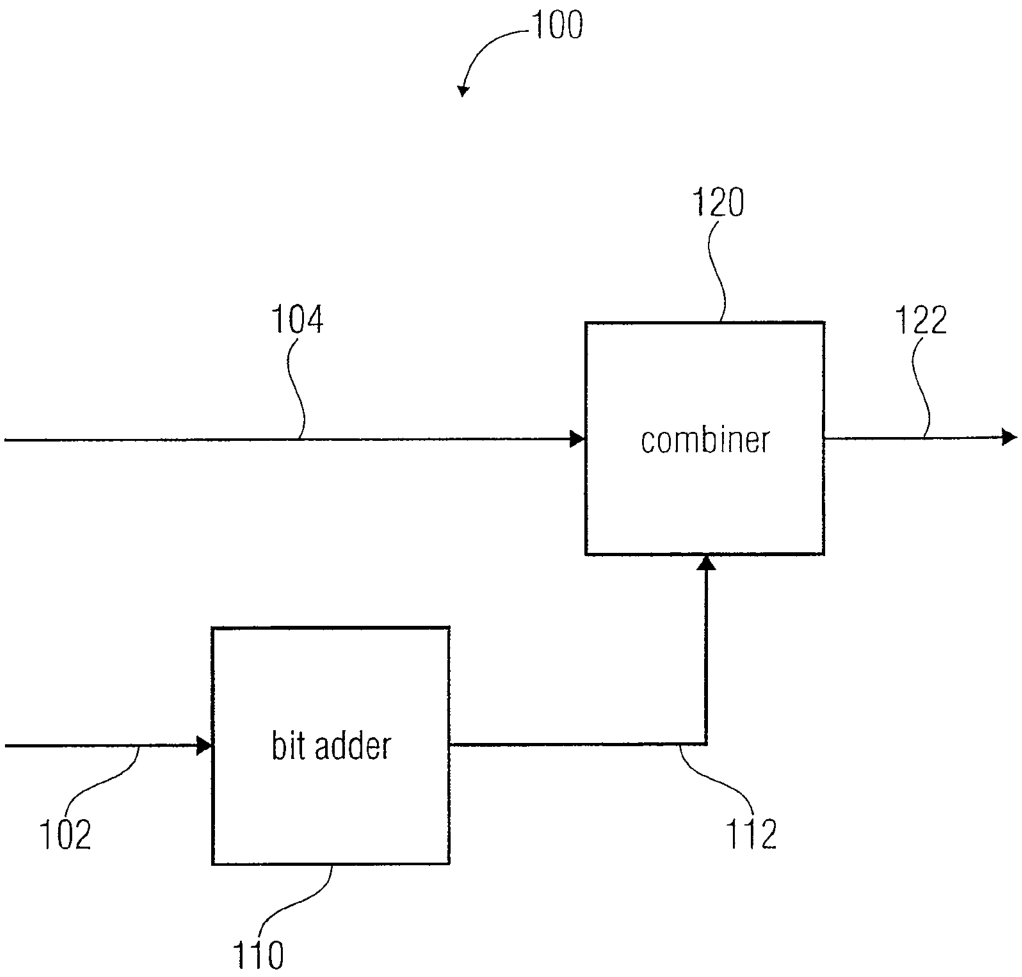
Figure 2B:
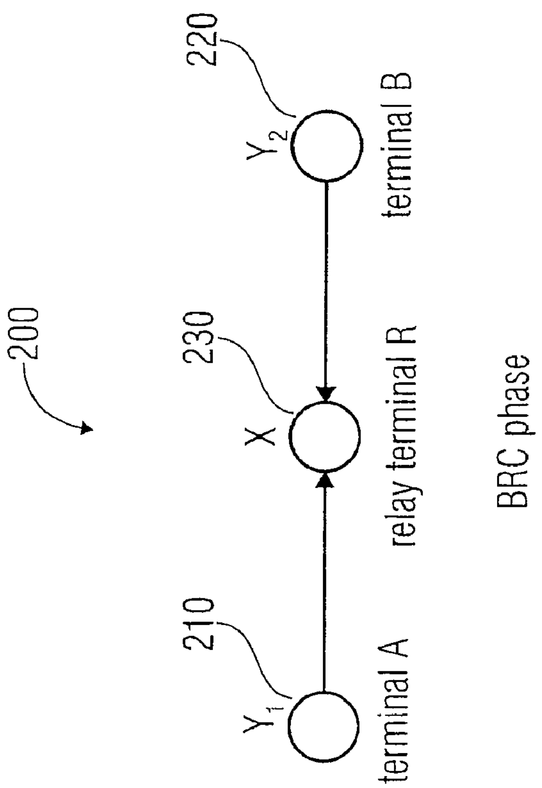
Figure 2A:
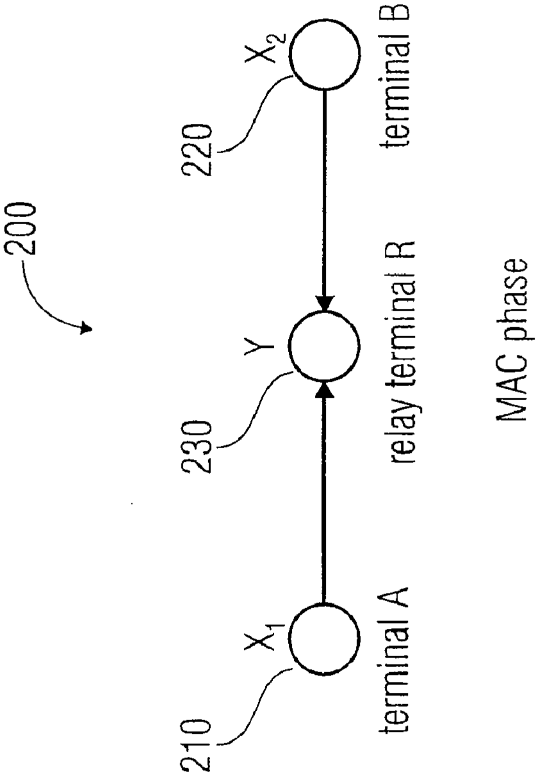
Figure 3:
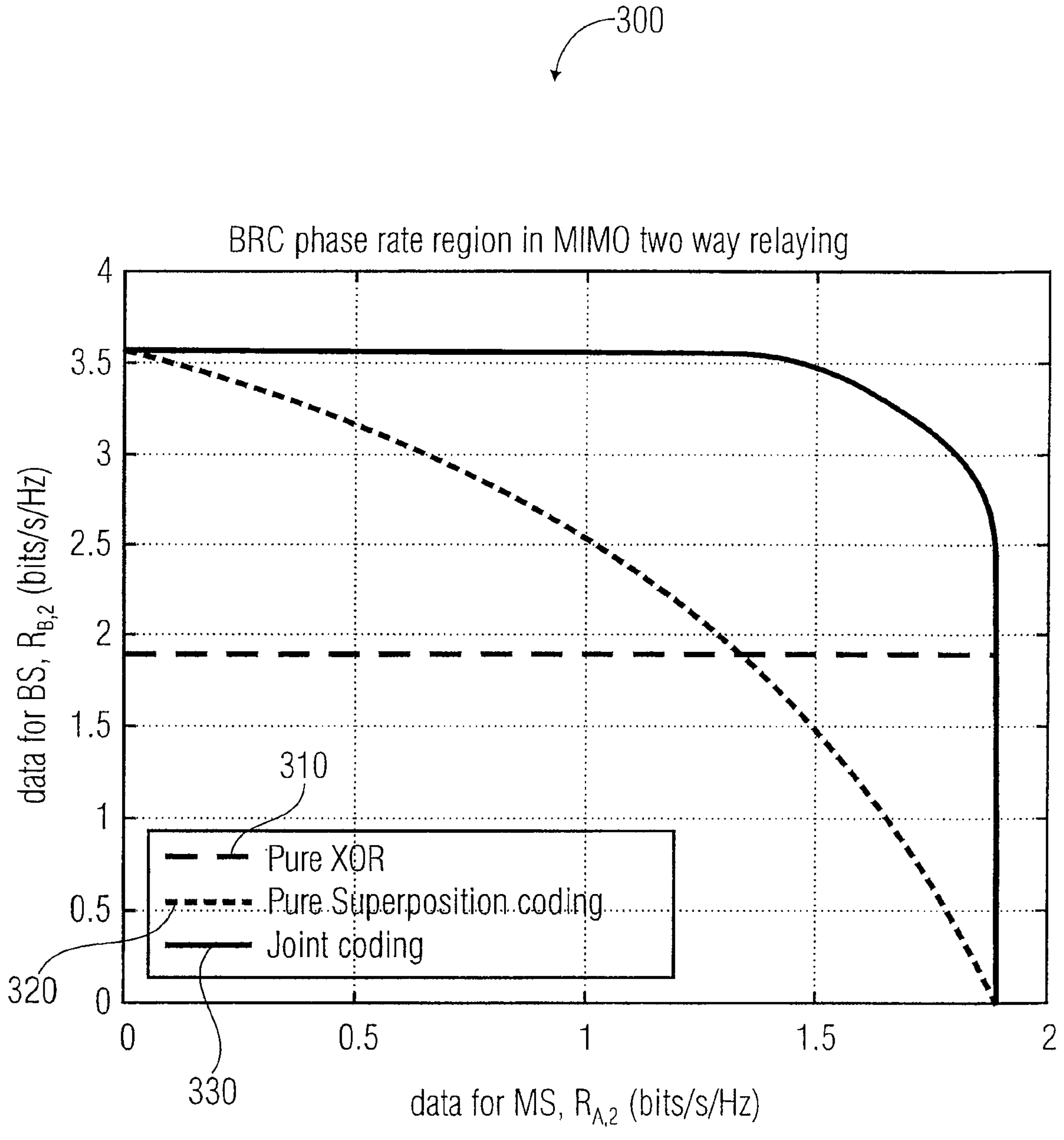
Figure 4A:
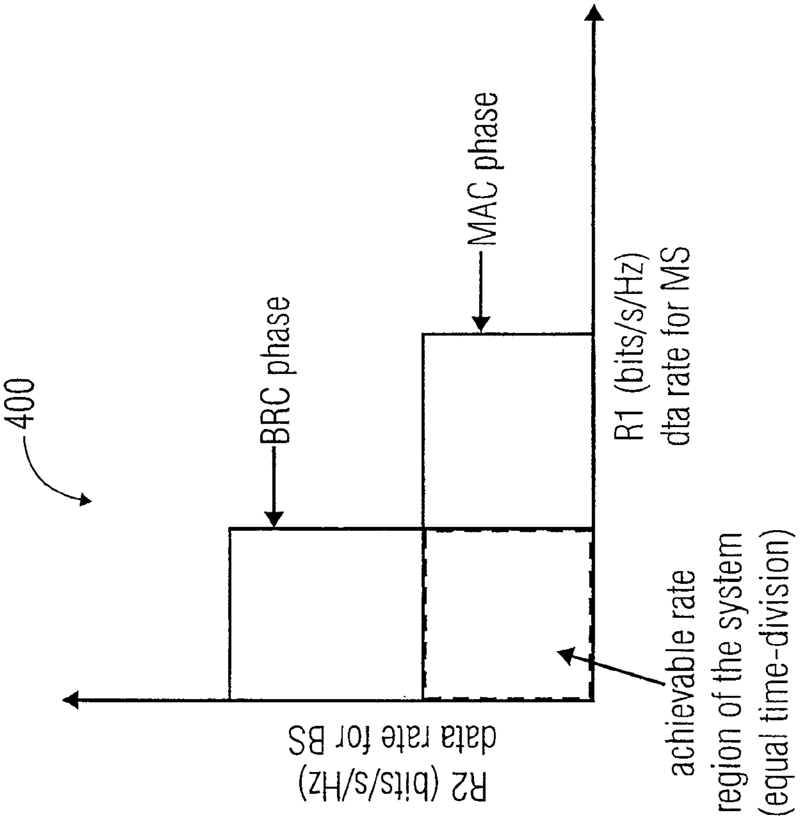
Figure 4B:
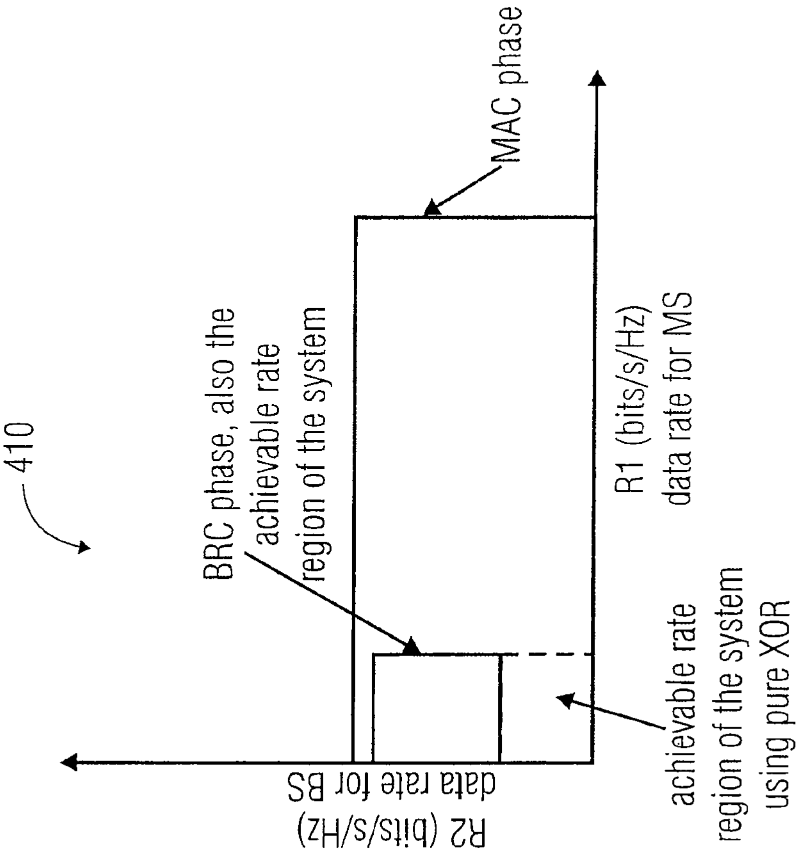

FIG. 1 shows a block diagram of an apparatus 100 for providing a combined digital signal 122 according to an embodiment of the invention. The combined digital signal 122 contains information of a first digital input signal 102 and a second digital input signal 104, wherein a block length of the first digital input signal 102 is shorter than a block length of the second digital input signal 104. The apparatus 100 comprises a bit adder 110 and a combiner 120.

The bit adder 110 is connected to the combiner 120 and is configured to add at least one filling bit to a block of the first digital input signal 102 to obtain an adapted first digital input signal 112, so that the block length of the adapted first digital input signal 112 is equal to the block length of the second digital input signal 104.

The combiner 120 is configured to combine the adapted first digital input signal 112 and the second digital input signal 104 to obtain and provide the combined digital signal 122.

The bit adder 110 adds as many filling bits as necessary to get equal block length for the two digital input signals. A block may be a bit sequence of a digital signal intended for a common processing. The block length may also be called data bit length. The bit adder 110 may add a filling bit to a block of the first digital input signal at the beginning, at the end or somewhere in the middle of the bit sequence of the block. Adding a filling bit relates to adding a bit at a certain position of the block, for example, the end, the beginning or a certain position somewhere in the middle of the block, wherein the added bit comprises a certain value.

For example, all filling bits may be added at the beginning of a bit sequence of a block (the most significant bits) and only bits with a value of zero may be added. Alternatively, also adding only bits with a value of one or a combination of zeros and ones at different positions of the bit sequence of a block may be possible.

The filling bits may be added to each block of the first digital input signal at the same position of the bit sequence of the block and with the same value. For example, if a block of the second digital input signal is two bits longer than a block of the first digital input signal, two filling bits with value zero may be added at the beginning of the bit sequence of the block of the first digital input signal. Although the position and value of a filling bit is usually fixed and the same for all blocks of the first digital input signal, the position and/or the value of the added filling bits may be changed, for example, during an intended reconfiguration.

The combiner 120 may combine the adapted first digital input signal 112 and the second digital input signal 104 based on an XOR function. Since the block length of both signals 112, 104 are equal, the combiner 120 is able to combine the signals bit by bit. Therefore, the data rate does not depend on the data rate of the signal with the shorter block length anymore. In this way, the achievable data rate may be increased. In other words, the data rate does not depend on the weaker link.

In other words, the receiver of the weaker link has some a priori information about the combined signal. Based on the a priori information, the receiver of the weaker link only needs to decode from a subset of the signal constellations. Subject to the same bit-error rate constraint, different data rates can be transmitted to receivers, in this asymmetric channel condition. The described apparatus 100 for providing a combined digital signal 122 may be a part of a transmitter of a relay station of a wireless communication system.

Some embodiments according to the invention relate to an apparatus for providing a modulated signal, which may be a combination of an apparatus for providing a combined digital signal and a mapping means. The mapping means is configured to generate a complex symbol or a block of the combined digital signal 122 based on a selected mapping constellation. The mapping constellation may be selected based on an Euclidean distance between bit sequences of the mapping constellation comprising the same value of a bit of the bit sequence at a bit position equal to a position of a filling bit.

For example, if a bit sequence has four bits and the first both bits (most significant bits) are filling bits a mapping constellation may be selected with a large Euclidean distance between bit sequences with the same first two bits.

Figure 5:
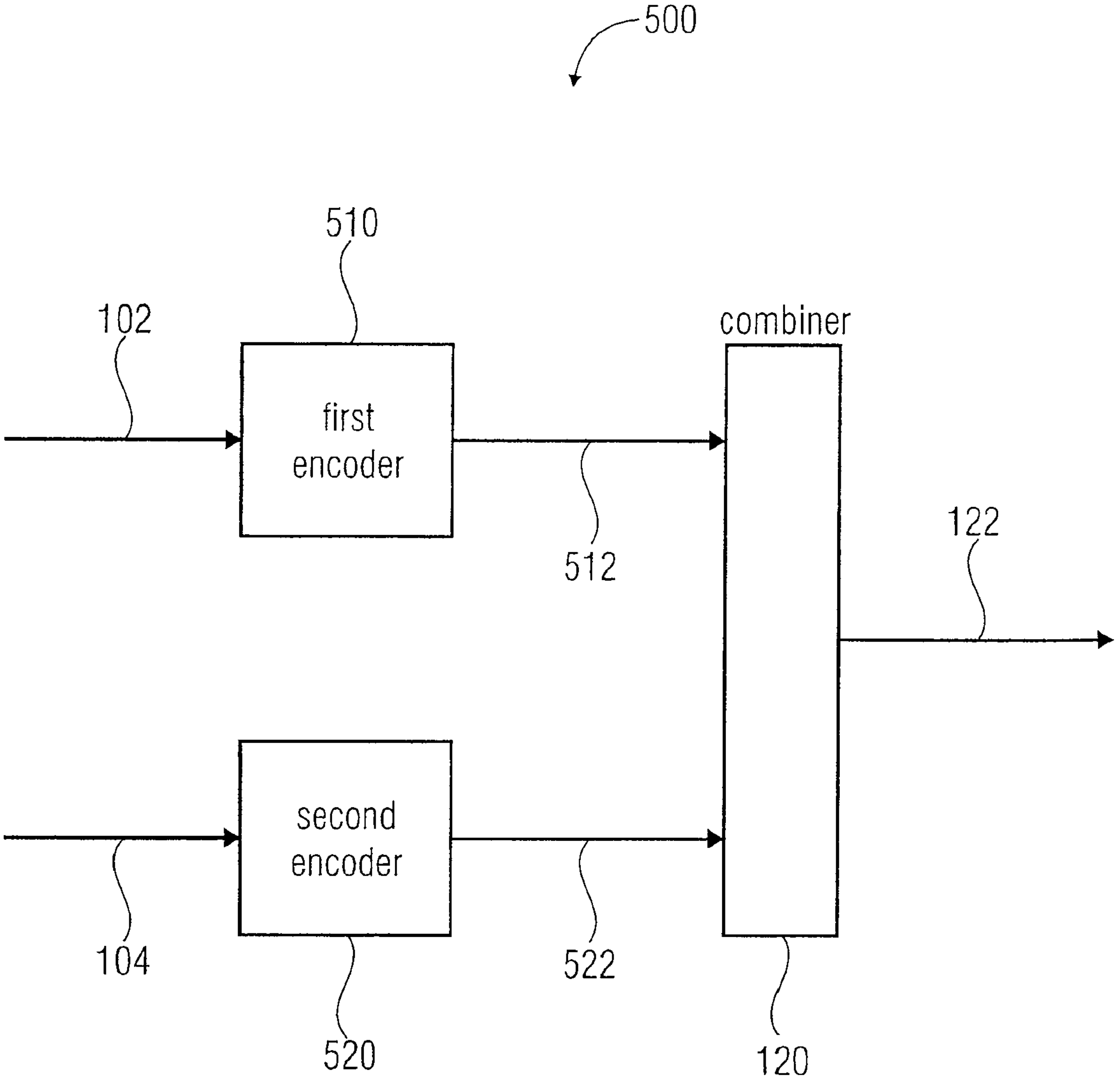

FIG. 5 shows a block diagram of an apparatus 500 for providing a combined digital signal 122 according to an embodiment of the invention. The combined digital signal 122 contains information of the first digital input signal 102 and a second digital input signal 104, wherein a block length of the first digital input signal 102 is shorter than a block length of the second digital input signal 104. The apparatus 500 comprises a first encoder 510, a second encoder 520 and a combiner 120.

The first encoder 510 is connected to the combiner 120 and comprises a first coding rate. The first encoder 510 is configured to provide a first encoded digital signal 512 based on the first digital input signal 102.

The second encoder 520 is also connected to the combiner 120 and comprises a second coding rate. The second encoder 520 is configured to provide a second encoded digital signal 522 based on the second digital input signal 104. A ratio of the first coding rate and the second coding rate is selected, so that a block length of the first encoded digital signal 512 is equal to a block length of the second encoded digital signal 522.

The combiner 120 is configured to combine the first encoded digital signal 512 and the second encoded digital signal 522 to obtain and provide the combined digital signal 122.

The apparatus 500 may be an alternative to the apparatus described in FIG. 1, because in both cases input signals with unequal block lengths are adapted in a way, so that the block length of the input signals are equal. In this way, the data rate does once again not depend on the data rate of the input signal with the shorter block length anymore.

For example, if the block length of the first digital input signal 102 is equal to 2, and the block length of the second digital input signal 104 is equal to 4, a first encoder 510 with a coding rate of 1:4 and a second encoder 520 with a coding rate of 1:2 may be used to obtain signals 512, 522 with equal block lengths of 8 bit.

Figure 6A:
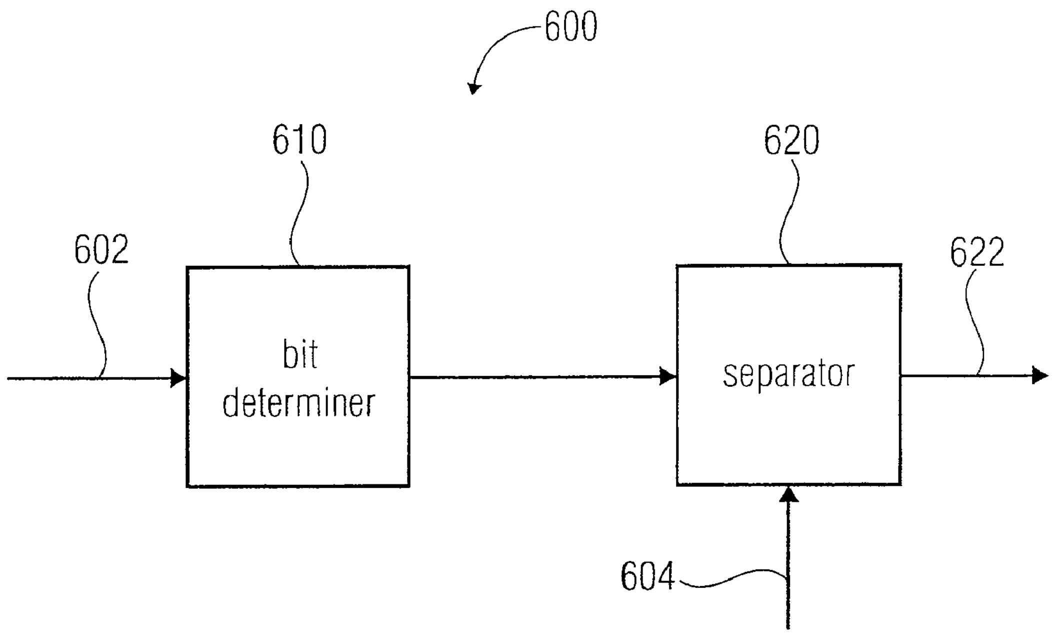

FIG. 6*a* shows a block diagram of an apparatus 600 for providing a separated digital signal 622 based on a combined digital signal 602 according to an embodiment of the invention. The combined digital signal 602 contains information of a known digital signal 604 and an unknown digital signal, wherein a block of the combined digital signal 602 comprises a bit associated with a bit to be decoded of the unknown digital signal and a bit associated with a filling bit of the unknown digital signal. The apparatus 600 comprises a bit determiner 610 and a separator 620.

The bit determiner 610 is configured to determine the bit of the block of the combined digital signal 602 associated with the bit to be decoded of the unknown digital signal based on a bit significance information.

The separator 620 is configured to separate the bit to be decoded of the unknown digital signal from the combined digital signal 602 based on the known digital signal 604 to obtain and provide the separated digital signal 622.

The bit significance information may be a known information stored and provided by a memory unit. The memory unit may be an optional part of the apparatus 600. Alternatively, the bit significance information may be contained in the unknown digital signal. In this way, the bit significance information can be changed if desired.

For example, the bit significance information tells the bit determiner 610 at which position of a bit sequence of a block of the combined digital signal 602 a bit to be decoded and/or a filling bit is arranged. The bit significance information may also tell the bit determiner 610 the value of the filling bit. This information may be used to reduce the bit error rate.

The described apparatus 600 may be a part of a receiver of a terminal, for example a mobile station, of a wireless communication system.

Figure 6B:
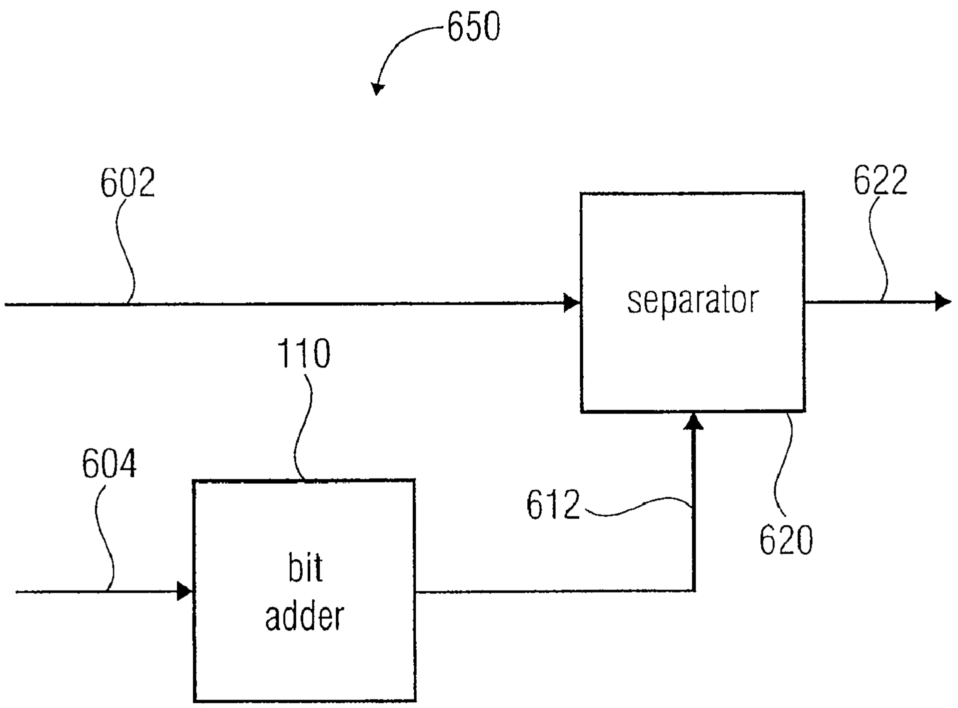

FIG. 6*b* shows a block diagram of an apparatus 650 for providing a separated digital signal 622 based on a combined digital signal 602 according to an embodiment of the invention. The combined digital signal 602 contains information of a known digital signal 604 and an unknown digital signal, wherein a block length of the known digital signal 604 is shorter than a block length of the combined digital signal 602. The apparatus 650 comprises a bit adder 110 and a separator 620.

The bit adder 110 is configured to add at least one filling bit to a block of the known digital signal 604 to obtain an adapted known digital signal 612, so that the block length of the adapted known digital signal 612 is equal to the block length of the combined digital signal.

The separator 620 is configured to separate the unknown digital signal from the combined digital signal 602 based on the known digital signal 604 to obtain and provide the separated digital signal 622.

The described apparatus 650 may be a part of a receiver of a terminal, for example a base station, of a wireless communication system.

Figure 7:
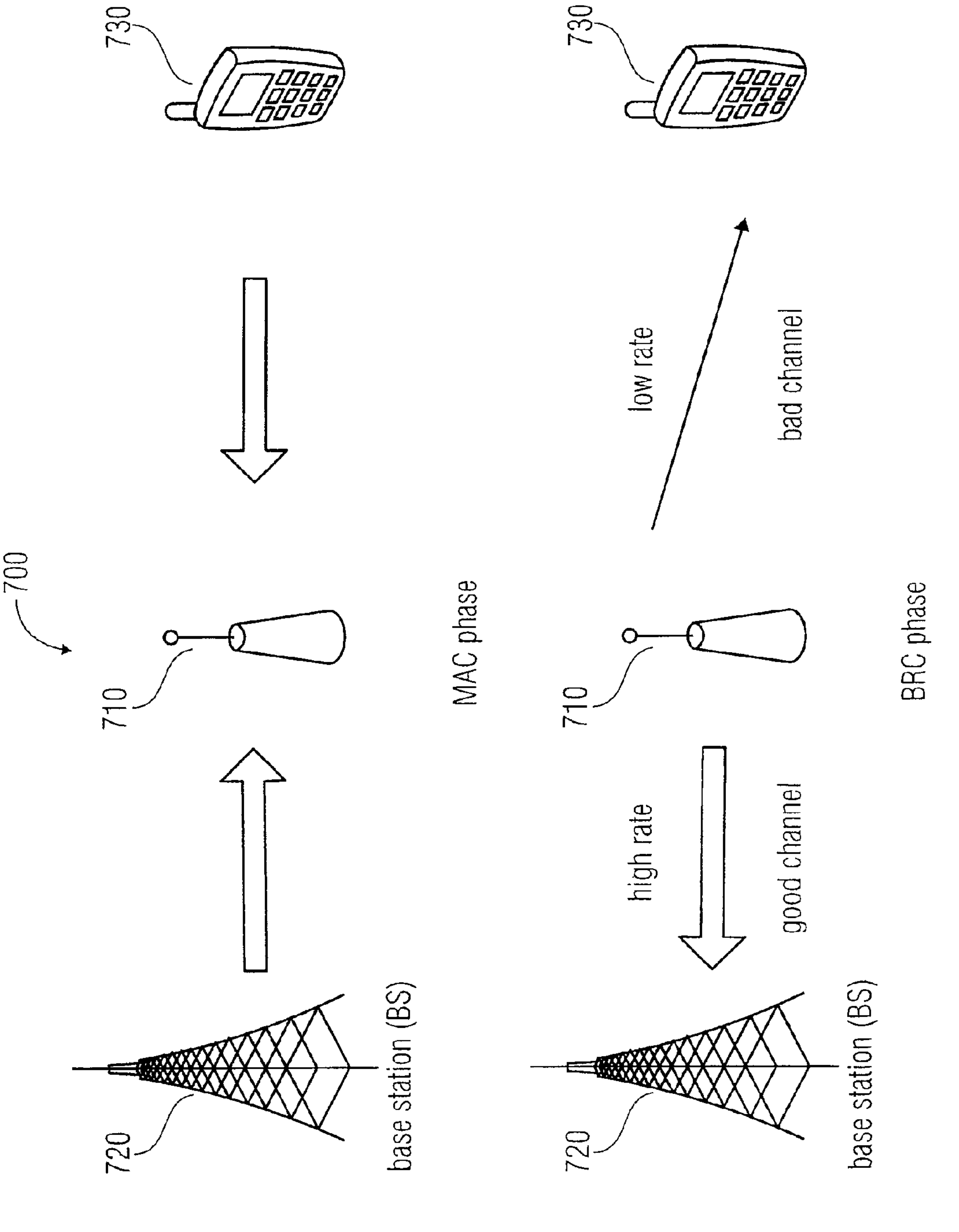
FIG. 7 is a schematic illustration of a two-way relay system with asymmetric data rate transmission in BRC phase.

Some embodiments according to the invention relate to a system model, wherein a cellular two-way relaying system as shown in FIG. 7 is considered. It is assumed that the relay 710 perfectly decodes what it receives in the MAC phase. In the BRC pulse, the RS 710 has good channel to the BS 720 but bad channel to the MS 730. According to "R. F. Wyrembelski, T. J. Oechtering, I. Bjelakovic, C. Schnurr, and H. Boche, "Capacity of Gaussian MIMO bidirectional broadcast channels," in *IEEE Int. Symposium on Inf. Theory*, Toronto, Canada, July 2008, pp. 584-588", it can be transmitted with high data rate to the BS 720 and low data rate to the MS 730 at the same time. The described concept provides a possibility to transmit data with different rates simultaneously to BS 720 and MS 730. In accordance with the assumptions in "R. F. Wyrembelski, T. J. Oechtering, I. Bjelakovic, C. Schnurr, and H. Boche, "Capacity of Gaussian MIMO bidirectional broadcast channels," in *IEEE Int. Symposium on Inf. Theory*, Toronto, Canada, July 2008, pp. 584-588", the constraints of the MAC phase are left aside, i.e., it is assumed that the BS has perfect knowledge about the data to be transmitted to MS and vice versa. This means the relay has more data from the MS than the data from the BS before the BRC phase starts. This can be motivated by e.g., the relay has a buffer and accumulated the data decoded from the MS. Another way to motivate this is that in a OFDMA (orthogonal frequency division multiple access) system, the MS use more subcarriers to transmit to the relay while the BS use less subcarriers to transmit to the relay in the MAC phase.

In the following, the example that 4 bits/symbol data are transmitted from MS on each RS antenna to the BS, and transmit 2 bits/symbol data from BS on each RS antenna to the MS is considered. The transmission to the BS may be called as "full rate" and the transmission to the MS as "half rate" since unknown data is transmitted with lower rate to the MS. The relay appends two "0" bits to the two bits to be transmitted to the MS, and XOR them with the four bits to be transmitted to the BS. Since the MS knows part of the data bits in each symbol a priori, the MS may just need to decode a subset of in the transmitted signal constellation. Subject to a certain BER requirement, the signal-to-noise ratio (SNR) required to achieved the BER at MS may be much lower than decoding the full set of the transmitted signal constellation.

Although the following examples show 4 bits/symbol for the stronger link or the good channel and 2 bits/symbol for the weaker link or the bad channel, the described concept works also with every other combination. For example, the strong link may use 8 bits/symbol and the weaker link may use 1.2 or 4 bits/symbol.

Figure 8:
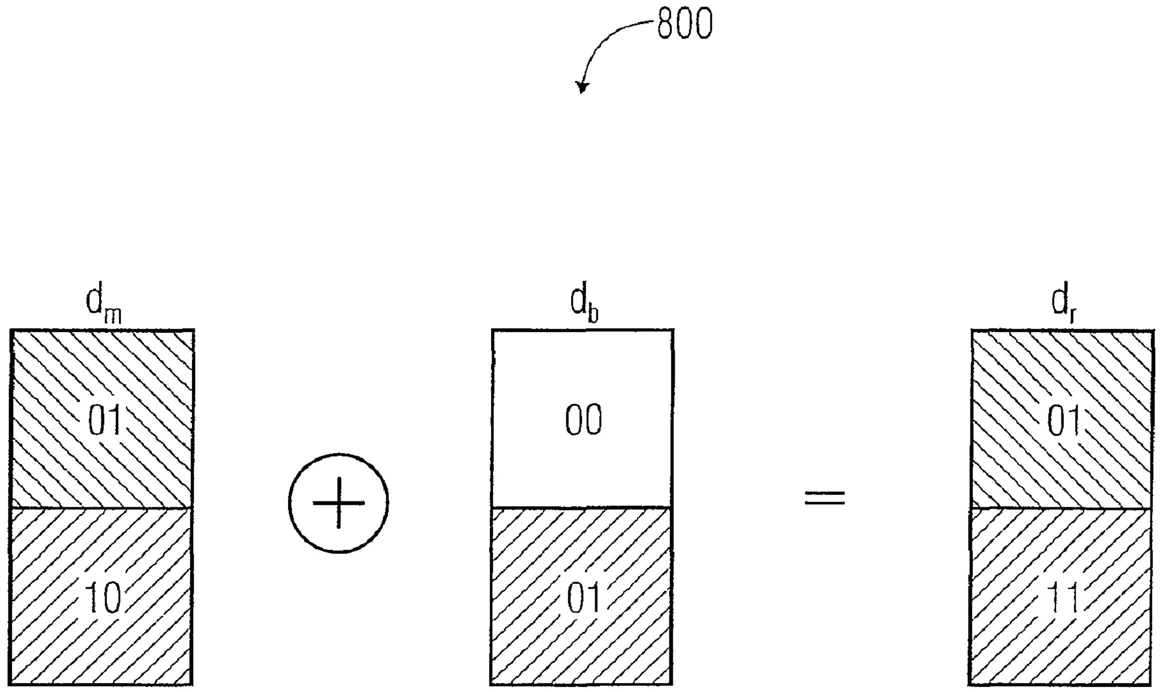
FIG. 8 is a schematic illustration of an asymmetric XOR coding.

A motivating example 800 is shown in FIG. 8. The RS is going to transmit $d_m$=0110 to BS. At the same time, the RS transmits $d_b$=01 to MS $d_m$ and $d_b$ are respectively known to the MS and BS, since they were delivered to the relay in the MAC phase. The relay first appends two zeros before $d_b$, XOR it with $d_b$=0110 and gets $d_r$=0111. The BS does not know $d_r$ priori due to the XOR operation. However, the MS knows the first two bits of $d_r$ because only zeros are appended at the beginning of $d_b$ and the first two bits of $d_r$ is the same as $d_m$, i.e., 01. So the MS just need to decode the subset of constellations starting from 01.

To minimize or even eliminate this loss in spectral efficiency it may be made use of a special symbol mappings, for example, also used in trellis coded modulation (TCM) (see e.g. "G. Ungerboeck, "Channel coding with multilevel/phase signals," *IEEE Trans. Inform. Theory*, vol. 28, no. 1, pp. 55-67, January 1982"). The special property of these mapping is that the symbols starting with the same bits (e.g. 01xx) are far apart (see e.g. FIG. 10*a*). The new constellation that the MS has to decode in this example is a shifted 4-QAM for the mapping in FIG. 10*a*. This is a minor disadvantage compared to (unshifted) 4-QAM modulation which is ideally used for 2 coded bits per symbol.

While the MS demodulates in a subset, the BS still has to do conventional demodulation in the whole 16-QAM symbol space because 4 bits per symbol are received, i.e. none of the bits are a priori known. The same idea can also be used for other constellations for example 8-PSK. With known first bit and proper mapping 4-PSK is obtained. It may be concluded that for QAM only minor efficiency loss due to the shift occurs, while 8-PSK has no loss compared to a 4-PSK modulation.

FIG. 9 shows a schematic illustration of a system model of communication with asymmetric data rates using XOR combining and a 16-QAM constellation according to an embodiment of the invention. The bits which define the subset are hatched. The numbers in the brackets denote the bits of the symbol.

FIG. 9*a* shows a block diagram of a relay station encoder 900*a*. The depicted principle is comparable to the before described apparatus for providing a modulated signal. The encoder 900*a* comprises a bit adder 110 (App. Zeros), a combiner 120 (XOR) and a mapping means 910 (Map.). Additionally an antenna 920 is shown for transmitting the modulated signal.

In this example the bit adder 110 adds two zeros to the input signal 102 and the combiner works based on an XOR function.

The mapping means 910 is connected to the combiner 120 and provides the modulated signal based on the combined digital signal 122.

The antenna 920 is connected to the mapping means 910.

FIG. 9*b* shows a block diagram of a mobile station decoder 900*b* (weak link). The depicted principle is comparable to the before described apparatus for providing a separated digital signal. The decoder 900*b* comprises a separator 620 and a demapping means 930, wherein in this example the demapping means 930 (Demap.) comprises the bit determiner. Additionally an antenna 920 connected to the demapping means 930 for receiving a transmission signal containing the information of the combined digital signal is shown.

The demapping means 930 is connected to the separator 620 and may use a information of the known digital signal 902 to reduce the bit error rate of the decoding process.

In this example the separator 620 obtains the separated digital signal 622 based on an XOR combining of the combined digital signal and the known digital signal 902.

In the case of the mobile station the known digital signal 902 corresponds to the before mentioned second digital input signal and the unknown digital signal corresponds to the before mentioned first digital input signal.

FIG. 9*c* shows a block diagram of a base station decoder 900*c*. The decoder 900*c* comprises a bit adder 110, a separator 620 and a demapping means 940. Additionally an antenna 920 connected to the demapping means 940 for receiving a transmission signal containing the information of the combined digital signal is shown.

The bit adder 110 is connected to the separator 620 and configured to add the same filling bits to the known digital signal 902 as the bit adder of the relay station adds to the first digital input signal.

Therefore the separator 620 can separate the unknown digital signal from the combined digital signal, for example based on an XOR function, bit by bit to obtain the separated digital signal 622.

The demapping means 940 is connected to the separator 620 and provides the combined digital signal based on the received signal.

In the case of the base station the unknown digital signal corresponds to the before mentioned second digital input signal and the known digital signal 902 corresponds to the before mentioned first digital input signal.

Some embodiments according to the invention relate to set partitioning for 16-QAM. A mapping function $f_{map}$ may be denoted as an operation on bits $b_1, b_2, \ldots, b_m$ that generates a complex symbol s, i.e.

$$[b_1, b_2, \ldots, b_m] \xrightarrow{f_{map}} s. \tag{4.3}$$

A mapping satisfying the previously described properties for a 16-QAM constellation is depicted in FIG. 10*a*. The resulting sublattices for fixed first two bits are itself a shifted 4-QAM constellation. This labeling is denoted orthogonal set partitioning (SPo) mapping 1000*a*. An even better mapping in terms of number of nearest neighbors of the sublattices is the skewed SP (SPs) mapping 1000*b* shown in FIG. 10*b*. For the two depicted mappings the subsets have an anti-gray mapping. For those constellations with the subset being a gray mapping, they are denoted as SPo(set=gray) and SPs (set=gray), respectively.

In other words, FIGS. 10*a* and 10*b* show a set partitioning (SP) constellation for 16-QAM, wherein FIG. 10*a* is a rectangular set partitioning (SPo) and FIG. 10*b* is a skewed set partitioning (SPs) with the subset being anti-gray.

The performance of a system with asymmetric data rates is evaluated, for example, for the SISO case first, and later for the MIMO case with M=N=R=2. An uncoded Raleigh fading system is used.

For the system model, the received discrete-time baseband signal $Y_t$ at time t can be written as $$y_t = H_t s_t + n_t. \tag{4.4}$$

where the MIMO channel H is complex Gaussian and variance one in each component. The vector $s_t$ is the modulated symbol vector for timeslot t and $n_t$ the Gaussian noise vector with variance $\sigma_n^2$. The transmit signal symbol at RS has the average power $P = s_t^H s_t$. In the following a perfect channel state information (CSI) is assumed, so that H is perfectly known at the receiver. The SNR is defined as $P/\sigma_n^2$.

For the SISO case, for example, a simulation is used to assess the performance of different mappings for an XOR re-encoded asymmetric communication. A comparison is made between natural, gray, SPo and SPs mapping. Each station is equipped with a single antenna. RS transmits with full rate (e.g., 4 unknown bits/symbol) to the BS, and transmits with half rate (e.g., 2 unknown bits/symbol) to the MS. The uncoded performance for the direction with half data rate (RS→MS) 1100*a* is depicted in FIG. 11(*a*). It can be noted that the SP mapped schemes 1110, 1115, 1120, 1125 have a considerably better performance due to the increased intersymbol Euclidean distance. If the subsets are arranged in a gray mapping 1105 (i.e. set=gray) the performance is better.

Among the SP mappings SPs 1115, 1125 slightly outperformed SPo 1110, 1120 due to the smaller number of nearest neighbors. Also the 4-QAM gray constellation 1130 is evaluated. It performs better compared to SP. This is because the constellation is not shifted thus allowing for higher intersymbol distance while having the same average energy. The difference is about 1 dB.

In FIG. 11*b* the other direction, i.e. full rate transmission RS→BS, is depicted. Here, the difference does not lie in the symbol error rate, which is constant for all mappings, but purely in the different arrangement of the bits. Gray codes 1105 are obviously optimized for a minimal BER because neighboring symbols have a small hamming distance. All other mappings perform suboptimal. SPo 1110, 1120 and SPs 1115, 1125 performed almost equally. Subject to the same BER requirement (e.g., $10^{-2}$), MS can decode at much lower SNR than BS when SPo and/or SPs schemes are used.

In other words FIG. 11*a* and 11*b* shows a two-way relaying uncoded 1×1×1 system for RS→MS (half rate) and RS→BS (full rate) transmission using gray modulation.

In the previous simulation a SISO channel was considered. For one transit antenna, the symbol is a complex number, or a point in a 2-dimensional real vector space. Here, the results are extended to a MIMO channel. A symbol is given by n complex numbers, or a point in a 2n-dimensional real vector space. For the MIMO case a mapping function can be expressed as $$[b_1, b_2, \ldots, b_q] \longrightarrow \begin{pmatrix} s_1 \\ s_2 \\ \ldots \\ s_n \end{pmatrix}. \tag{4.5}$$

This means there is much more flexibility in mapping the symbols because there are more dimensions available. However, also SISO mapping schemes can be taken and transformed to the MIMO case by independently modulate each component, i.e.

$$\begin{pmatrix} [b_1, b_2, \ldots, b_m] & \xrightarrow{f_{map}} & s_1 \\ [b_{m+1}, b_{m+2}, \ldots, b_{m+m}] & \xrightarrow{f_{map}} & s_2 \\ & \ldots & \\ [b_{m(n-1)+1}, b_{m(n-1)+2}, \ldots, b_{mn}] & \xrightarrow{f_{map}} & s_n \end{pmatrix}. \tag{4.6}$$

This symbol-wise mapping scheme is denoted as $[f_{map}, \ldots, f_{map}]$. However, this approach is restrict in the design and is not able to use all degrees of freedom. It has to be noted that multidimensional mappings can also be used in the SISO case. The technique is to use several timeslots for one multidimensional symbol. See for example "N. Tran and H. Nguyen, "Multi-dimensional mappings of M-ary constellations for BICM-ID systems," in *Canadian Conference on Electrical and Computer Engineering*" for multidimensional mappings. A similar concept is modulation doping which uses different mappings for different timeslots (e.g. in "L. Szczecinski, H. Chafnaji, and C. Hermosilla, "Modulation doping for iterative demapping of bit-interleaved coded modulation," *IEEE Commun. Lett.*, vol. 9, no. 12, pp. 1031-1033, 2005."). In this example symbolwise mapping according to formula 4.6 is used. The results from a simulation 1200*a*, 1200*b* with spatial multiplexing and two antennas at each station can be seen in FIG. 12*a* and FIG. 12*b*. The qualitative results are the same as for SISO. FIG. 12 shows a two-way relaying uncoded 2x2x2 system for RS→MS (half rate) and RS→BS (full rate) transmission.

SP mapping is effective for asymmetric communication with XOR coding. Assuming the receiver of the weak link has some a priori knowledge about the XOR-ed bits to be transmitted, 4 bits per symbol can be transmitted to the strong link (full rate), and 2 bits per symbol to the weak link (half rate). It has been shown that 16-QAM modulation with SP yields a considerably better performance than conventional gray coding for half rate data. In the direction sending with full rate however, gray coding is still optimal leaving SP mappings with a marginal disadvantage. Overall, the discussed scheme is an interesting and easy-to-implement approach which might prove itself useful in two-way relaying with asymmetric data rates.

Figure 13:
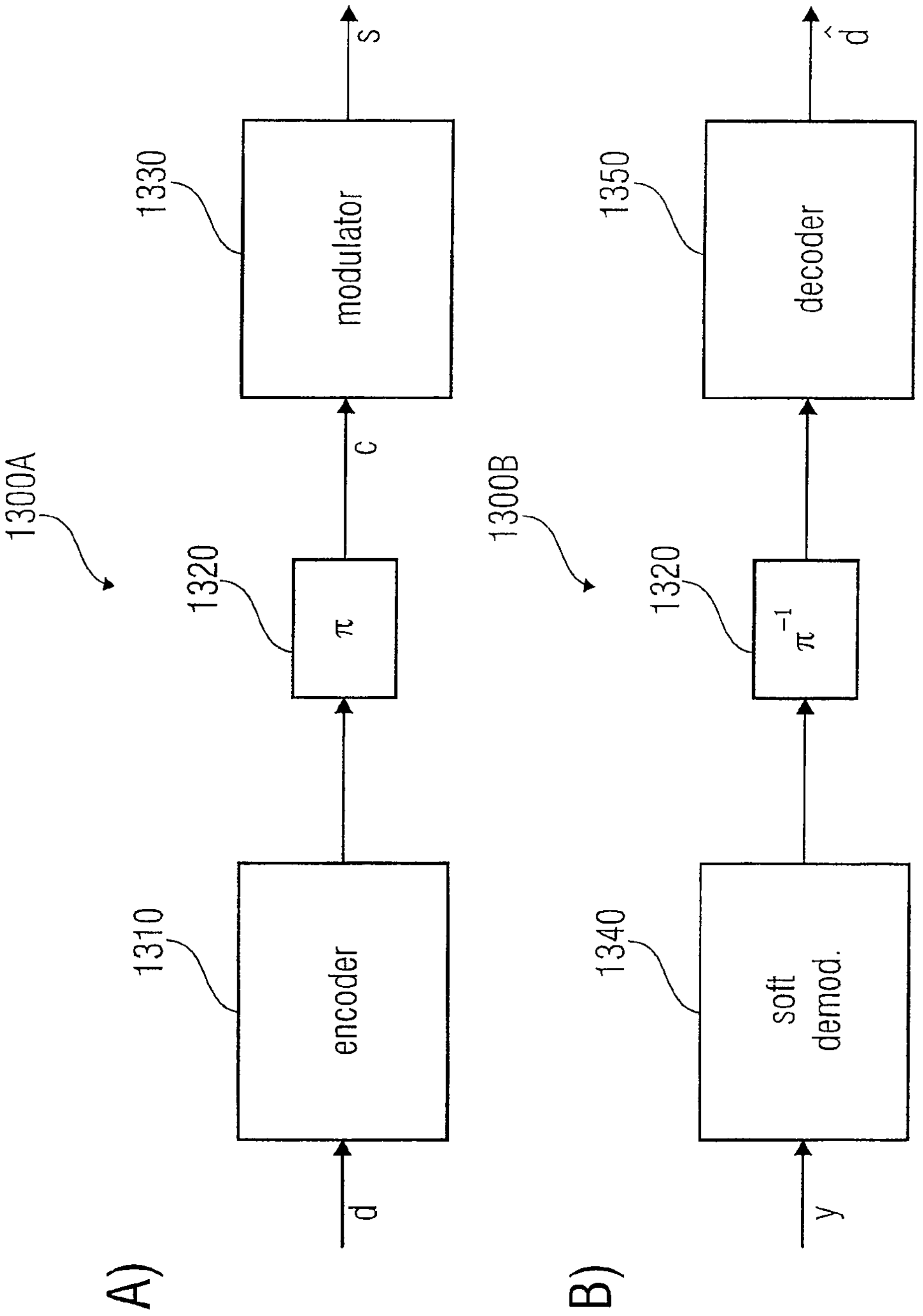

Some embodiments according to the invention relate to a bit interleaved coded modulation. In the embodiments described before an uncoded system has been used. It also may be possible to employ a bit interleaved coded modulation (BICM). Conventional BICM 1300*a*, 1300*b* can be modeled as a serial concatenation of a convolutional encoder 1310, random bit interleaver 1320 (π, π⁻1) and a memoryless modulator 1330 as shown in FIG. 13. The bit interleaver 1320 has the purpose of breaking the sequential fading correlation and increase diversity order to the minimum Hamming distance of a code. A frequency nonselective Rayleigh fading channel with coherent detection is used as described before. Furthermore, the channel is assumed to be fading sufficiently fast, so that the coherence time is much smaller than a coding block. The soft demodulator 1340 calculates the LLR values, which are processed by a soft decoder 1350.

In the metric view for a SISO system data is encoded by a convolutional code and decoded with soft decoder. From "G. Caire, G. Taricco, and E. Biglieri, "Bit-interleaved coded modulation," *IEEE Trans. Inform. Theory*, vol. 44, no. 3, pp. 927-945, May 1998" the bit error probability (BER) for BICM with gray mapping can be written as $$\log_{10} P_b \cong -d(C)\left[(Rd_h^2)_{dB} + \left(\frac{E_b}{\sigma_n^2}\right)_{dB}\right] \Big/ 10 + const. \tag{4.7}$$

d(C) denotes the minimum binary Hamming distance of code C, which just depends on the used code. R is the coding rate and $d_h^2$, is the harmonic mean of the squared Euclidean distance, which will be defined later. $E_b$ is the energy used for one data bit. Thus, at high values of $$\frac{E_b}{\sigma_n^2},$$

the BER curve on a logarithmic scale approaches a straight line with slope proportional to −d(C), translated horizontally by the offset $Rd_h^2$. In the set-up, all these parameters except $d_h^2$ (and the SNR) are left constant. Therefore the concentration is on the metric $d_h^2$. For mappings other than gray mapping only bounds of the asymptotic behavior exists (see e.g. "G. Caire, G. Taricco, and E. Biglieri, "Bit-interleaved coded modulation," *IEEE Trans. Inform. Theory*, vol. 44, no. 3, pp. 927-945, May 1998"). Apart from $d_h^2$ the value of $N_{min}$ also plays a role for the performance. Both metrics are introduced next.

To be able to track the performance of mapping schemes analytically, the metric $d_h^2$ is introduced (see for example "G. Caire, G. Taricco, and E. Biglieri, "Bit-interleaved coded modulation," *IEEE Trans. Inform. Theory*, vol. 44, no. 3, pp. 927-945, May 1998."). $d_h^2$ may be defined as $$d_h^2 = \left( \frac{1}{m2^m} \sum_{i=1}^{m} \sum_{b=0}^{1} \sum_{x \in X_b^i} \frac{1}{\|x - \hat{z}\|^2} \right)^{-1}, \tag{4.8}$$

where m is the number of bits in a constellation (i.e. $m=\log_2 M$ for M-QAM). $X_b^i$ b is the subset of the M-ary constellation X whose label has the binary value b at the ith bit position. $\hat{z}(x)(x)$ is set to be the $\hat{z}(x)=\min_{\tilde{z}\in x_b}\|x-\tilde{z}\|^2$. This way, $d_h^2$ defines the harmonic mean of the minimum squared Euclidean distance. A further metric that is significant for the performance is the average number of symbols at distance $d_{min}$, where $d_{min}$ is the minimum distance of any two constellation points. The metric is denoted $N_{min}$ and is formally defined as $$N_{min} = \frac{1}{m2^m} \sum_{i=1}^{m} \sum_{b=0}^{1} \sum_{x \in X_b^i} N(1, x), \tag{4.9}$$

where N(1, x) is the number of neighbors of $z\in X_b^i$ at distance $d_{min}$ from x. Generally, the performance is better the higher $d_h^2$ and the lower $N_{min}$ (see e.g. "G. Caire, G. Taricco, and E. Biglieri, "Bit-interleaved coded modulation," *IEEE Trans. Inform. Theory*, vol. 44, no. 3, pp. 927-945, May 1998"), but no closed formula exists. The metrics can also be adopted to the case of asymmetric communication as in the presented scheme. In that case, some bits are a priori known which means only the subsets may be considered. If the first $m_1$ symbols are known the metric may be defined as $$d_h^2(R = (m - m_1)/m) = \left( \frac{1}{(m - m_1)2^{m-m_1}} \sum_{i=m_1+1}^{m} \sum_{b=0}^{1} \sum_{x \in X_b^i} \frac{1}{\|x - \hat{z}\|^2} \right)^{-1}, \tag{4.10}$$

which is the counterpart to $d_h^2$ for lower rate case (e.g., for half rate case). The data rate is a fraction $(m-m_1)/m$ of the full data rate. In formula 4.10, the following expression for $\hat{z}$ is used $$\hat{z} = \min_{\tilde{z} \in X(d_1 = x_1, \ldots, d_{m_1} = x_{m_1}, \ldots d_i = \bar{b})} \|x - \tilde{z}\|^2, \tag{4.11}$$

where $X(d_1=b_1, d_2=b_2, \ldots, d_{m1}=b_{m1})$ denotes the subset of X whose label has the binary value $b_k$ at the kth bit position for $k=1 \ldots m_1$. $x_i$ denotes the ith bit of symbol x. Likewise, $N_{min}$ can be calculated for lower rate case and is denoted as $N_{min}$ (R=m/n). In Table 4.1 the expressions are evaluated for different mappings.

TABLE 4.1

Harmonic mean of Euclidean distance

| Labeling | $d_h^2$ | $N_{min}$ | $d_h^2$(R = ½) | $N_{min}$(R = ½) |
|---|---|---|---|---|
| Gray | 0.492 | 0.75 | 0.492 | 0.75 |
| Natural | 0.492 | 1 | 0.492 | 1 |
| SPO | 0.466 | 1.5 | 1.600 | 1.5 |
| SPS | 0.466 | 1.375 | 1.600 | 1 |
| Mod SP | 0.420 | 1.625 | 1.600 | 1.5 |
| 4-QAM agray[a] | — | — | 2 | 1.5 |
| 4-QAM gray | — | — | 2 | 1 |

According to index [a] in table 4.1, the metrics for 4-QAM have been place in the half rate (R=½) column. This is because the 4-QAM contains 2 bits per symbol, which is the same as half rate 16-QAM.

For the MIMO case, the same metrics extended to the multiple dimensions as it is also done in "S. Baro, "Turbo detection for MIMO systems: bit labeling and pre-coding," *Europ. Trans. Telecommun., vol.* 15, no. 4, pp. 343-350, 2004" can be used. The formulas for $d_h^2$ (R=r) and $N_{min}$ (R=r) are adopted by inserting the corresponding symbol vectors instead of symbols. First, a multidimensional constellation generated by symbol-wise mapping is considered. A vector space with n complex dimensions can be considered as vector space with 2n real dimensions. If the same mappings is applied in each dimension, the metric $d_h^2$ may not change compared to the SISO case. $d_h^2$ does not change if the dimension of a constellation is extended as in formula 4.6 (see also "N. Muhammad and J. Speidel, "Design of multidimensional mappings for iterative MIMO detection with minimized bit error floor," Munich, Germany, April 2006." Theorem 2). The same also holds true for $d_h^2$ (R=r) of a subset. If different mappings in each dimension are combined, the new $d_h^2$ is the harmonic mean of the individual $d_h^2$'s per dimension. There might however exist better mappings in higher dimensions than these generated by applying per stream modulation. Some research on multidimensional mappings for trellis-coded modulation TCM systems can be found in e.g. "G. Pottie and D. Taylor, "Multilevel codes based on partitioning," *IEEE Trans. Inform. Theory*, vol. 35, no. 1, pp. 87-98, January 1989;" and "S. Pietrobon and D. Costello, "Trellis coding with multidimensional QAM signal sets," *IEEE Trans. Inform. Theory*, vol. 39, no. 2, pp. 325-336, March 1993". But, for the problem of finding a mapping with suitable subset, i.e. optimizing $d_h$(R=½) and minimize $M_{min}$ (R=½), there are no results known. By hand, three mappings for a 16-QAM constellation in 2 dimensions that can further improve $d_h^2$(R=½) are shown in FIG. 45-47. In principle, they are a possible multi-dimensional extension to the SPs mapping. All these three mappings have the same subsets when the first 4 bits are fixed. Thus, for each symbol the first 4 bits are the same for each mappings. The subsets are chosen, such that the intersymbol distance is large. The last 4 bits are arranged randomly, gray and anti-gray for SP4a, SP4b and SP4c respectively. It can be seen from Table 4.2, that the SP4b mapping can further improve $d_h$(R=½) to 2, which has not been possible in one dimension. But this improvement comes at the cost of increasing $N_{min}$.

TABLE 4.2

Harmonic mean of Euclidean distance in 2 dimensions

| Labeling | $d_h^2$ | $N_{min}$ | $d_h^2$(R = ½) | $N_{min}$(R = ½) |
|---|---|---|---|---|
| [Gray, Gray] | 0.492 | 0.75 | 0.492 | 0.75 |
| [SPO, SPO] | 0.466 | 1.5 | 1.600 | 1.5 |
| [SPS, SPS] | 0.466 | 1.375 | 1.600 | 1 |
| [4-QAM agray, 4-QAM | — | — | 2 | 1.5 |

TABLE 4.2-continued

| Harmonic mean of Euclidean distance in 2 dimensions | | | | |
|---|---|---|---|---|
| Labeling | $d_h^2$ | $N_{min}$ | $d_h^2(R = ½)$ | $N_{min}(R = ½)$ |
| agray] | | | | |
| [4-QAM gray, 4-QAM agray] | — | — | 2 | 1 |
| SP4a | 0.441 | 2.031 | 1.944 | 0.625 |
| SP4b | 0.492 | 1.781 | 2.034 | 0.484 |
| SP4c | 0.466 | 1.906 | 1.796 | 0.891 |

A BICM system with asymmetric data rates according to the presented scheme is simulated. A convolution code with rate ½ according to the UMTS specification "ETSI, "Universal mobile telecommunications system (UMTS); multiplexing and channel coding (TDD)," Tech. Rep. 3GPP TS 25.222 version 4.2.0, December 2001" is used. The constraint length is 9 with code generator polynomials of 561 and 753 (in octal numbers). A block length of K=512 bits is used, which is a possible value for UMTS where 40<K<5114 ("ETSI, "Universal mobile telecommunications system (UMTS); multiplexing and channel coding (TDD)," Tech. Rep. 3GPP TS 25.222 version 4.2.0, December 2001"). The random interleaver also has a length of 512 bits.

TABLE 4.3

| Convolutional Encoder and Decoder Parameters | |
|---|---|
| rate | ½ |
| constraint length | 9 bits |
| generator polynomial | (561, 753) |
| decoder type | soft-input-soft-output decoder |
| interleaver type | random |
| interleaver length | 512 |

The results for a SISO system are plotted in FIG. 14. It shows a two-way relaying uncoded 1×1×1 system for RS→MS (half rate) and RS→BS (full rate) transmission. "16QAM R=¼" means that a R=¼ convolutional encoder is used to encode $d_b$ without appending zeros and XOR it with $d_m$. From the metric values in Table 4.1 it can be related to the curves in the simulation. Generally, the mappings for which $d_h^2$ is high and $N_{min}$ low do perform better. First full rate communication 1400*b* may be considered. Gray mapping 1105 has the highest $d_h^2$ and lowest $N_{min}$ and thus the best performance. The difference between SPo 1110, 1120 and SPs 1115, 1125 is that SPs 1115, 1125 has lower $N_{min}$ which is also reflected in the performance.

For half rate communication 1400*a*, the SP schemes have a much higher $d_h^2$ (R=½) than for full rate (0.466→1.6, 5 dB gain from rate reduction), while gray 1105 and natural 1405 have no gain. SPo 1110, 1120 and SPs 1115, 1125 differ in Nmin, where SPo 1110, 1120 performs better, as evident from FIG. 14*a* SP is clearly outperforming gray and natural mapping for half rate. SP labeling with gray subsets is 1 dB worse than 4-QAM 1130 with gray. This corresponds to the difference of $d_h^2$ (R=½). For SP with anti-gray subsets the difference to 4-QAM gray is about 2 dB. Furthermore, 16-QAM modulation 1410 with a convolutional code with rate ¼ has a slightly better performance. The convolutional code from "R. Johannesson and P. Stahl, "New rate ½, ⅓, and ¼ binary convolutional encoders with an optimum distance profile," *IEEE Trans. Inform. Theory*, vol. 45, no. 5, pp. 1653-1658, July 1999" has the same constraint length (K=9) as the rate ½ code.

The results for MIMO case in FIG. 15 are similar. It shows a two-way relaying uncoded 2×2×2 system for RS→MS 1500*a* (half rate, FIG. 15*a*) and RS→BS 1500*b* (full rate, FIG. 15*b*) transmission.

Some embodiments according to the invention relate to a bit interleaved coded modulation with iterative decoding. As shown before SP modulation performs great in one direction (half-rate). However, the price paid is a degradation in the other direction (full rate). Here, it is shown that even for the full rate link, SP mapping can achieve equal or better performance than gray modulation. The idea is to iteratively improve the demapping which works particularly well with SP. The scheme is called bit-interleaved coded modulation with iterative decoding (BICM-ID).

Bit interleaved coded modulation (BICM) (see for example "G. Caire, G. Taricco, and E. Biglieri, "Bit-interleaved coded modulation," *IEEE Trans. Inform. Theory*, vol. 44, no. 3, pp. 927-945, May 1998") has been introduced to increase diversity in a time-varying channel. An iterative decoding method for BICM systems has been introduced in "A. Chindapol and J. Ritcey, "Design, analysis, and performance evaluation for BICM-ID with square QAM constellations in rayleigh fading channels," *IEEE J. Select. Areas Commun.*, vol. 19, no. 5, pp. 944-957, May 2001.", in "A. C. X. Li and J. A. Ritcey, "Bit-interleaved coded modulation with iterative decoding and 8 PSK signaling," *IEEE Trans. Commun.*, vol. 50, no. 8, pp. 1250-1257, August 2002." and in "X. Li and J. Ritcey, "Trellis-coded modulation with bit interleaving and iterative decoding,"*IEEE J. Select. Areas Commun.*, vol. 17, no. 4, pp. 715-724, April 1999", which is called BICM-ID. The scheme suggests special constellation mappings other than gray mapping. In an iterative fashion the decoder generates better estimates of the data. The scheme is preferably used together with soft decoding. SP mapping as introduced above can prove useful in a BICM-ID system. The SP modulation introduces a large Euclidean distance after feedback, which results in an improved performance with iterative decoding. The performance of BICM-ID with SP modulation for two-way relaying is examined below.

Figure 16:
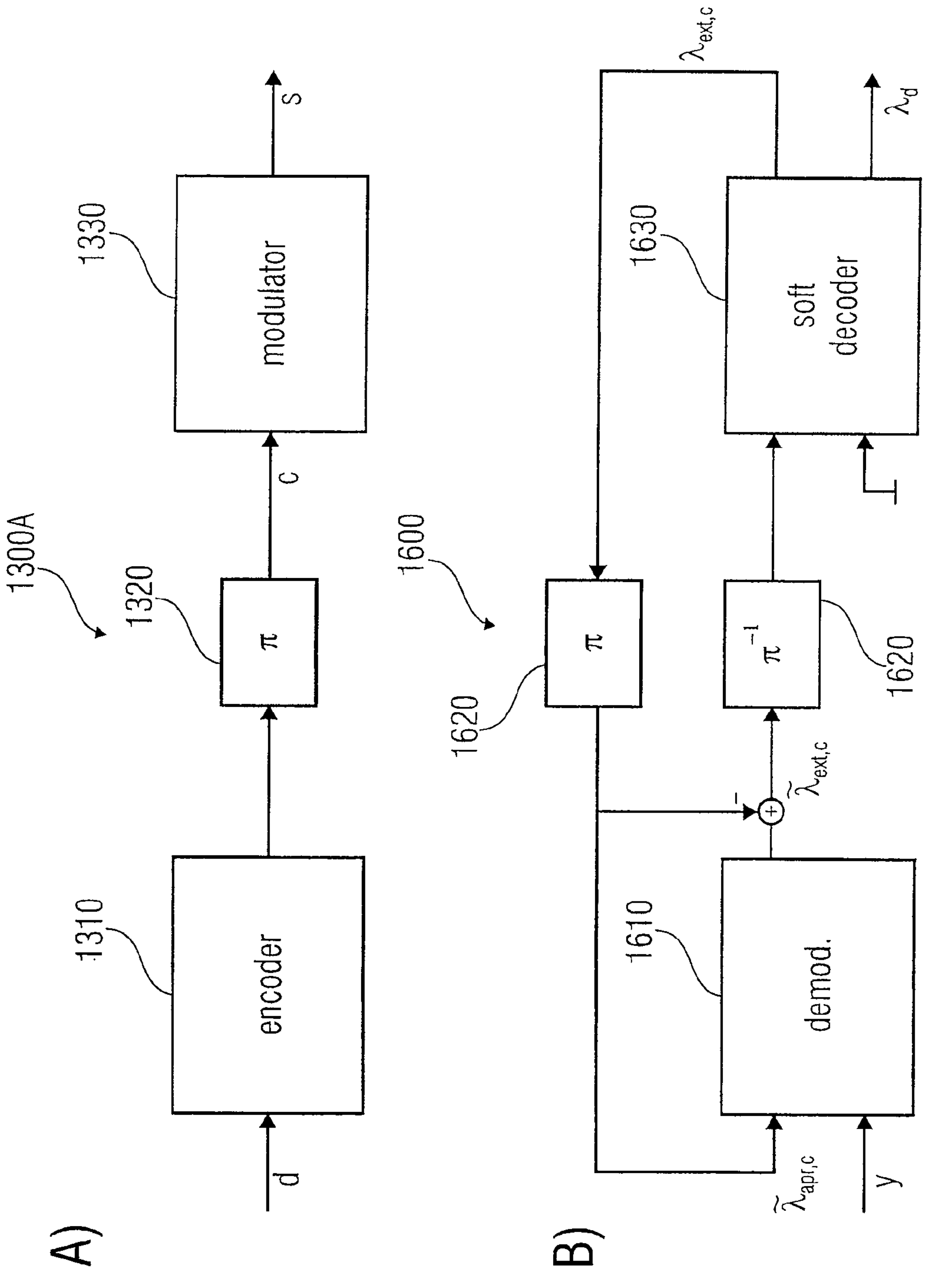

Bit interleaved coded modulation with iterative decoding (BICM-ID) feeds back information from the decoder to be used at the demodulator. With ideal interleaving, coded bits forming a channel symbol are independent; therefore, the feedback from strong data sections (with less influence of channel noise) can remove the ambiguity in the high-order demodulation and enhance the decoding of weak data sections (those subject to undesirable noise patterns). With the perfect knowledge of the other bits, which are provided by the decoding feedback, 16-QAM modulation is effectively reduced to binary modulation for each bit position. Hence, the intersymbol distance for the binary modulation can be significantly increased. The intersymbol distance with feedback greatly depends on the mapping which is used. The system has to be designed to reduce the effect of feedback errors and to control error propagation. This is achieved by soft decision feedback and well-designed interleavers. A block diagram of the overall system is depicted in FIG. 16 The transmitter side 1300*a* shown in FIG. 16*a* consists of a serial concatenation of an encoder 1310, interleaver 1320 and a modulator 1330. The receiver side 1600 shown in FIG. 16*b* has a demodulator 1610, interleavers 1620 ($\pi$, $\pi^{-1}$) and a soft decoder 1630 which are connected to allow for iterative decoding.

Conventional demodulators do not have a priori information available and are using the maximum likelihood (ML) estimation. In the system design, a priori information is fed back so that maximum a posteriori (MAP) estimation can be employed. In the first iteration still ML is used because no a priori information is available. Only the a priori probabilities of the other bits (j≠1) on the same channel symbol $s_t$ are needed when recalculating the bit metrics. The receiver then uses (4.15) to regenerate the bit metrics and iterates demodulation and decoding. After the last iteration, the final decoded outputs are the hard decisions based on the bit metrics $\lambda_d$ of the data at the output of the soft decoder. Note, that the output of the soft decoder is equal to the extrinsic information because no a priori information of the data is used.

Also a metric that incorporates feedback can be defined. The idea is to assume perfect feedback for all bits other than the one to estimate. This leaves only one other candidate symbol. Therefore, the following definition for in Equation 4.8 is obtained:

$$\hat{z}=\chi(d_1=x_1, \ldots, d_i=\bar{b}, \ldots, d_M=x_M)\|^2. \quad (4.16)$$

The quantity $\|\hat{z}-x|$ becomes the distance between symbol x and the symbol with equal bit label except for the ith bit. The new metrics with feedback are denoted with a tilde, i.e. $\tilde{d}_h$. The asymptotic bit error probability (BER) can be written as (see for example "G. Caire, G. Taricco, and E. Biglieri, "Bit-interleaved coded modulation," *IEEE Trans. Inform. Theory*, vol. 44, no. 3, pp. 927-945, May 1998.", "N. Tran and H. Nguyen, "Design and performance of BICM-ID systems with hypercube constellations," *IEEE Trans. Wirel. Comm*., vol. 5, no. 5, pp. 1169-1179, May 2006." and ""Signal mappings of 8-ary constellations for BICM-ID systems over a rayleigh fading channel," in Proc. IEEE Canadian Conf. on Elec. And Comp. Engineering, Niagra Falls, Canada, May 2004"):

$$\log_{10} P_b \cong -d(C)\left[\left(R\tilde{d}_h^2\right)_{dB} + \left(\frac{E_b}{\sigma_n^2}\right)_{dB}\right] \Big/ 10 + const. \quad (4.17)$$

d(C) denotes the minimum binary Hamming distance of code C and R is the coding rate. At low SNR, the performance of the first iteration characterized by $d_h^2$ and $N_{min}$ is still significant. At high SNR the performance is completely defined by $\tilde{d}_h$. The values of $\tilde{d}_h$ are evaluated and plotted in Table 4.4 along with results from the previous sections.

TABLE 4.4

Harmonic mean of Euclidean distance with feedback

| Labeling | $d_h^2$ | $d_h^2$(R = ½) | $\tilde{d}_h^2$ | $\tilde{d}_h^2$(R = ½) |
|---|---|---|---|---|
| Gray | 0.492 | 0.492 | 0.514 | 0.514 |
| Natural | 0.492 | 0.492 | 0.640 | 0.640 |
| SPO | 0.466 | 1.600 | 0.853 | 2.133 |
| SPS | 0.466 | 1.600 | 0.870 | 2.364 |
| Mod SP | 0.420 | 1.600 | 2.278 | 2.133 |
| 4-QAM agray | — | 2 | — | 2.667 |
| 4-QAM gray | — | 2 | — | 2 |

For full data rate, it can be noted that SP schemes have a big gain when feedback is present (0.466→0.870, 2.71 dB) while natural and gray have a small gain (0.492→0.514, 0.19 dB). It is again evident that natural and gray coding is not suited for half data rate communication. Also with feedback, there is no gain compared to full rate. SP schemes have a feedback gain for half rate communication (1.600→2.364 1.69 dB) which is not as big as for full rate, though. In "A. Chindapol and J. Ritcey, "Design, analysis, and performance evaluation for BICM-ID with square QAM constellations in rayleigh fading channels," *IEEE J. Select. Areas Commun., vol.* 19, no. 5, pp. 944-957, May 2001", the authors proposed a modified SP scheme which achieves the highest feedback gain for full rate case among all the mapping schemes considered. However, this modified SP has a low $d_h^2$. Thus this modified SP scheme is not further considered in this report.

For the MIMO case not many results exists to characterize the performance for BICMID. In "N. Muhammad and J. Speidel, "Design of multidimensional mappings for iterative MIMO detection with minimized bit error floor," Munich, Germany, April 2006" $\tilde{d}_h^2$ (adopted for multiple dimensions) is maximized, which is also used here. The metrics are evaluated for 2 dimensions and printed in Table 4.5. Note that for SP4b $\tilde{d}_h^2$ is greater than 2, which is even higher than in 4-QAM.

TABLE 4.5

Harmonic mean of Euclidean distance with feedback in two dimensions

| Labeling | $d_h^2$ | $d_h^2$(R = ½) | $\tilde{d}_h^2$ | $\tilde{d}_h^2$(R = ½) |
|---|---|---|---|---|
| SP4a | 0.111 | 1.919 | 1.526 | 2.368 |
| SP4b | 0.492 | 2.033 | 0.98 | 2.43 |
| SP4c | 0.466 | 1.796 | 1.048 | 2.807 |
| [4-QAM agray, 4-QAM agray] | — | 2 | — | 2.667 |

For the simulation a SISO channel is used at first, a MIMO channel with two antenna at transmitter and receivers will be used later. The same set-up as mentioned before is (Table 4.3) used but additionally iterative decoding is employed. The block diagram with iterative decoding is given in FIG. 17, which shows a system model of communication with asymmetric data rates using XOR with BICM-ID and 16-QAM constellation. The bits which define the subset are hatched.

FIG. 17*a* shows a block diagram of a relay station encoder 1700*a* according to an embodiment of the invention. The encoder 1700*a* corresponds in principle to the encoder depicted in FIG. 9*a*, but comprises additionally a first encoder 1720 connected to an interleaver 1730 (π) for providing encoded first digital input signal 102 to the bit adder 110 and a second encoder 1710 connected to an interleaver 1730 for providing an encoded second digital input signal 104 to the combiner 120.

FIG. 17*b* shows a block diagram of a mobile station decoder 1700*b* according to an embodiment of the invention. The decoder 1700*b* corresponds in principle to the decoder depicted in FIG. 9*b*, but comprises additionally an encoder 1710 connected to an interleaver 1730 (π) for providing an encoded known digital signal 902 to the separator 620 and the demapping means 930 and an interleaver 1730 ($\pi^{-1}$) connected to the decoder 1740 for providing a decoded separated digital signal based on the separated digital signal 622. Further the decoder 1740 is connected to the demapping means 930 through another interleaver 1730 to realize the above described BICM-ID architecture.

FIG. 17*c* shows a block diagram of a base station decoder 1700*c* according to an embodiment of the invention. The decoder 1700*c* corresponds in principle to the decoder depicted in FIG. 9*c*, but comprises additionally an encoder 1720 connected to an interleaver 1730 for providing an encoded known digital signal 902 to the bit adder 110 and an interleaver 1730 connected to a decoder 1750 for providing a decoded separated digital signal based on the separated digital signal 622. Further the decoder 1750 is connected to the demapping means 940 through another interleaver 1730 to realize the above described BICM-ID architecture.

The XOR combining at the receivers (decoder of base station and mobile station) represent the "box plus" sum, i.e. they flip the sign of the soft inputs if the other input is bit "1".

Gray and SPo(set=agray) mapping is being considered. SPo(set=agray) has a better performance than SPo(set=gray) in iterative decoding. Likewise, for 4-QAM anti-gray performs better than gray. Therefore, mappings with anti-gray subsets are considered in the simulations. For higher block length ModSP (see for example "A. Chindapol and J. Ritcey, "Design, analysis, and performance evaluation for BICM-ID with square QAM constellations in rayleigh fading channels," *IEEE J. Select. Areas Commun.*, vol. 19, no. 5, pp. 944-957, May 2001") might however perform better. The mapping found by a search algorithm in "J. H. F. Schreckenbach, N. Gortz and G. Bauch, "Optimized symbol mappings for bit-interleaved coded modulation with iterative decoding," in *Proc. IEEE Global Comm. Conf.* (*GLOBECOM*), San Francisco, Calif., Dec. 1-5, 2003" denoted M16a is also simulated. The other mapping scheme "M16r" proposed in "J. H. F. Schreckenbach, N. Gortz and G. Bauch, "Optimized symbol mappings for bit-interleaved coded modulation with iterative decoding," in *Proc. IEEE Global Comm. Conf.* (*GLOBECOM*), San Francisco, Calif., Dec. 1-5, 2003" does not give satisfying results for half rate and is therefore not considered.

For the SISO case, the results of the simulation can be seen in FIG. 18 for SPo(set=agray) 1805 and gray modulation 1105 respectively. It shows BICM-ID in a 1×1×1 two-way relaying system for RS→MS 1800*a* (half rate, FIG. 18*a*) and RS→BS 1800*b* (full rate, FIG. 18*b*) transmission using different 16-QAM mappings. The first pass (dashed curves) and the $5^{th}$ pass (solid curves) is plotted. For half rate, the $5^{th}$ iteration for 4-QAM gray id shown for comparison. The mappings "M16a" and "M16r" were proposed in "J. H. F. Schreckenbach, N. Gortz and G. Bauch, "Optimized symbol mappings for bit-interleaved coded modulation with iterative decoding," in *Proc. IEEE Global Comm. Conf.* (*GLOBECOM*), San Francisco, Calif., Dec. 1-5, 2003.".

Clearly, iterative decoding brings no big advantage to gray modulated systems 1105. There is a slight improvement for the second iteration, compared to the first, but more iterations have no additional value. Contrary for SP modulation 1805, 1810, here iterative decoding improves the performance by a lot. If the final performance after 5 iterations is compared, it can be concluded that in the high SNR domain equal performance is achieved for full rate 1800*b* for both modulation schemes. For the half-rate data 1800*a* SP mapping 1805, 1810 performs much better than its gray counterpart 1105. The difference to 4-QAM 1825 is still 1 dB as in the previous simulations. At this point, it has to be noted that the presented results might not quite achieve the performance in published papers (e.g. "A. Chindapol and J. Ritcey, "Design, analysis, and performance evaluation for BICM-ID with square QAM constellations in rayleigh fading channels," *IEEE J. Select. Areas Commun.*, vol. 19, no. 5, pp. 944-957, May 2001") because the block with a length of 512 bits was chosen relatively short.

For the MIMO case, the results of a simulation where each terminal is equipped with two antennas are plotted in FIGS. 19*a* and 19*b*. The first figure considers the direction sending with half rate while in the second full rate is employed. FIG. 19 shows BICM-ID in a 2×2×2 two-way relaying system for RS→MS 1900*a* (half rate, FIG. 19*a*) and RS→BS 1900*b* (full rate, FIG. 19*b*) transmission using different 16-QAM mappings. The first pass (dashed curves) and the $5^{th}$ pass (solid curves) is plotted. For half rate, the $5^{th}$ iteration for 4-QAM gray id shown for comparison. The mappings "M16a" and "M16r" were proposed in "J. H. F. Schreckenbach, N. Gortz and G. Bauch, "Optimized symbol mappings for bit-interleaved coded modulation with iterative decoding," in *Proc. IEEE Global Comm. Conf.* (*GLOBECOM*), San Francisco, Calif., Dec. 1-5, 2003.".

For half rate, the symbol-wise mapping schemes SPo 1805 and SPs 1810 come within 1 dB of the performance of 4-QAM 1920, 1825. With multidimensional mappings SP1{a-c} 1905, 1910, 1915 it can get close to 4-QAM performance or even better. Note that this was not possible for 1-dimensional mappings which have a performance that is about 1 dB worse. Which mapping gives the best performance greatly depends on the SNR. If the error floors of the 2-dimensional mappings are compared, $\tilde{d}_h^2$ can be considered. SP4c 1915 has the lowest value, which is reflected in FIG. 19*a*. However, it has also a large $d_h^2$, which means that the performance is good at low SNR values.

The results for full rate data 1900*b* is shown in FIG. 19*b*. Some differences to the SISO case are obvious.

1. Iterative decoding greatly improve the performance even for gray coding 1105
2. Because gray coding 1105 has such a big feedback gain SPo 1805 does no longer perform better than gray
3. SP4b 1910 has about the same performance at a BER of 10e-6 compared to gray 1105

It might surprise that iterative decoding can improve with grey coding, since it was shown that $d_h^2$ and $\tilde{d}_h^2$ are unchanged from the 1 dimensional case. But for MIMO there is another important effect. The MIMO channel is a matrix with complex entries. This means the QAM symbols are no longer in an orthogonal vector space. This is different from the analysis for the calculation of $d_h^2$ where the vector space was assumed to be orthonormal. In fact the imaginary and real components of one complex dimension are still orthogonal but the complex basis vectors do not have to be. In short, the interstream interference in MIMO case makes its performance different from the SISO case. Thus, fading can change the effective Euclidean distances at the receiver. Therefore, gray mapping may still have a high feedback gain. The mapping SP4b is chosen in the simulation because it gave the best performance among the set partitioning mappings. SPo did perform worse than gray mapping. For longer block lengths the set partitioning mappings perform generally better while gray mapping gives has no big improvement.

The new scheme may support asymmetric data rate transmission for an XOR coded two-way-relaying scheme. The scheme is easy to implement with a few adoptions to the classical scheme. Special constellation mappings and iterative decoding may be used. 16-QAM modulation with sending 4 coded bits per symbol in one direction and 2 coded bits per symbol in the other has been considered. Mappings which achieve high-throughput for both directions have been found. For the SISO case SPo mapping has good performance in both directions. The results from SISO cannot be directly transferred to MIMO. Different mappings are optimal in this case. One difference is that gray coding has a large feedback gain for 2 dimensions. It can be seen that the performance for half rate in MIMO case can be further improved and a performance similar to 4-QAM case can be achieved. For MIMO, SP16b revealed a good performance in both directions.

The introduced metrics were a good indicator for the actual performance. Different metrics have been presented. When searching for suitable mapping schemes, these metrics can not be optimized independently. Therefore, a trade-off has to be found.

Some embodiments according to the invention relate to asymmetric data rate transmission using different coding rates.

Some embodiments shown before use convolutional encoders with the same coding rate for both the data to be transmitted to BS and MS at the relay. The coded bit length was made equal by appending zeros. Decoders at both receivers have the same decoding complexity. An alternative is to encode the data to be transmitted to BS and MS with different coding rates as shown in FIG. 20. It shows a system model of communication with asymmetric data rates using different coding rates at the relay and a 16-QAM constellation. The bits which define the subset are hatched.

FIG. 20*a* shows a block diagram of a relay station encoder 2000*a* according to an embodiment of the invention. The encoder 2000*a* corresponds in principle to the encoder depicted in FIG. 17*a* without a bit adder. The functionality of the bit adder (equal the bit lengths of the input signals) is realized by encoders with different coding rates.

Therefore the encoder 2000*a* corresponds in principle to the apparatus for providing a combined digital signal shown in FIG. 5.

FIG. 20*b* shows a block diagram of a mobile station decoder 2000*b* according to an embodiment of the invention. The decoder 2000*b* corresponds in principle to the decoder depicted in FIG. 17*b*, but the coding rate of the encoder 1710 is not equal to the decoding rate of the decoder 1740.

FIG. 20*c* shows a block diagram of a base station decoder 2000*c* according to an embodiment of the invention. The decoder 2000*c* corresponds in principle to the decoder depicted in FIG. 17*c* without a bit adder. The functionality of the bit adder is realized by a coding rate of the encoder 1720 unequal to the decoding rate of the decoder 1750.

In this way, the coded bit length can also be made equal. However, the decoders at the two receivers have different complexities.

In some embodiments according to the invention, the term modulation is understood as a function that takes bits as inputs and generates complex symbols. The possible symbols space is called constellation. The way the constellation points are labeled with the bit values is called symbol mapping or labeling. Different constellations can be employed to achieve a wide range of data rates. But note that modulation is the same in both directions for a specific system realization. This is because the data for both directions is modulated jointly. Considered are for example:

4-QAM (or 4-PSK) with Gray or anti-Gray labeling.

8-PSK with With Gray, SP or mixed labeling.

16-QAM with Gray, SPo, SPs, M16a or M16r labeling. Two dimensional joint labeling methods are SP4a, SP4b and SP4c.

The number of constellation points of one symbol is denoted by m. The mapping schemes for the constellations play a crucial role with iterative decoding.

For rate reduction, for example, two possibilities to achieve asymmetric data rates are investigated.

1. Different Coding Rates: Different convolutional codes with different coding rates (e.g. ½ and ¼) are employed. The coding rate is denoted as $R_c$.
2. Different Padding Rates: The encoded data is zero-padded. Different number of zeros are appended to impose different data rates (e.g. no zero padding in one direction and the same number of data and zeros in the other). The padding rate is the fraction of data bits of the zero padded sequence and is denoted as $R_p$. Thus, if $R_p$=1 no zero-padding is applied.

These rates can be different in either direction (i.e. asymmetric).

The throughput is measured as the number of data bits per timeslot. It is $$TP=N_t \cdot R_c \cdot R_p \cdot \log_2(m)$$

A fair comparison of the performance of different schemes can be made of systems with equal throughput. The shown simulation typically has throughputs of 2, 1.5, 1 and 0.5 (data) bits per transmission(bpt).

FIG. 21 shows encoder at the relay according to an embodiment of the invention. The bits which define the subset are hatched.

FIG. 21*a* shows a pure set partitioning (SP) for asymmetric data rate transmission. The encoder 2100*a* corresponds in principle to the encoder shown in FIG. 17*a.*

FIG. 21*b* shows a mixed scheme for asymmetric data rate transmission. The encoder 2100*b* corresponds in principle to the encoder shown in FIG. 17*a*, but the first and the second encoder comprise different coding rates.

For example the encoder 2100*a* may be a one antenna 16-QAM system with coding rate of ½. From the Relay station (RS) to the base station (BS) the padding rate is 1. This corresponds to no zero padding. From RS to the mobile station (MS) a padding rate of ¼ is applied. This means that for each set of coded bits (4 bits) corresponding to one 16-QAM symbol 3 bits with value zero are appended to 1 coded bit. These 4 bits are then modulated together to one symbol. In the direction from RS to BS a throughput of $$TP_{BS}=N_t \cdot R_c \cdot R_p \cdot \log_2(m)=1 \cdot ½ \cdot 1 \cdot 4==2 \text{ bpt}$$

and in the direction from RS to MS $$TP_{MS}=N_t \cdot R_c \cdot R_p \cdot \log_2(m)=1 \cdot ½ \cdot ¼ \cdot 4=0.5 \text{ bpt}$$

is achieved. Thus, the system has asymmetric data rates with 2 bpt (bits per transmission) in one direction and 0.5 bpt in the other.

Another possibility (as shown in FIG. 21*b*) is to have the same data rates is to fix the padding rate to 1 and change the coding rates to ½ and ¼ respectively, which can be considered as the mixed scheme of asymmetric data rate transmission using different coding rate and the set partitioning scheme proposed in the previous sections.

For example, the harmonic mean of Euclidean distance of different labeling schemes are shown in Tables 4.6, 4.7 and 4.8.

TABLE 4.6

Harmonic mean of Euclidean distance with 16-QAM and different padding rates

| Labeling | $d_h^2(R_p = 1)$ | $d_h^2(R_p = ¾)$ | $d_h^2(R_p = ½)$ | $d_h^2(R_p = ¼)$ |
|---|---|---|---|---|
| gray | 0.514 | 0.470 | 0.514 | 0.400 |
| SPo | 0.853 | 1.371 | 2.133 | 3.200 |
| SPs | 0.870 | 1.431 | 2.364 | 2.889 |
| M16a | 2.715 | 2.661 | 2.560 | 2 |
| 4-QAM agray | — | — | 2.667 | — |

TABLE 4.7

Harmonic mean of Euclidean distance with feedback for full and half rate in two dimensions

| Labeling | $d_h^2(R_p = 1)$ | $d_h^2(R_p = ½)$ | $d_h^2(R_p = 1)$ | $d_h^2(R_p = ½)$ |
|---|---|---|---|---|
| [SPo, SPo] | 0.853 | 1.371 | 2.133 | 3.200 |
| SP4a | 0.441 | 1.949 | 1.526 | 2.368 |
| SP4b | 0.492 | 2.033 | 0.98 | 2.13 |
| SP4c | 0.466 | 1.796 | 1.048 | 2.807 |
| [4-QAM ag, 4-QAM ag] | — | 2 | — | 2.667 |

TABLE 4.8

| Harmonic mean of Euclidean distance with 8-PSK and different padding rates | | | |
|---|---|---|---|
| Labeling | $d_h^2(R_p = 1)$ | $d_h^2(R_p = 2/3)$ | $d_h^2(R_p = 1/3)$ |
| gray | 0.809 | 0.739 | 0.586 |
| SP | 1.221 | 2.607 | 4 |
| Mixed | 1.408 | 2 | 2 |
| 4-QAM agray | — | 2.667 | — |

The following simulation relate to a setting shown in table 4.9.

TABLE 4.9

| Convolutional encoder parameters | |
|---|---|
| rate | ½ |
| constraint length | 9 bits |
| generator polynomial | (561, 753) |
| decoder type | soft-input-soft-output decoder |
| interleaver type | random |
| interleaver length | 2400 uncoded bits |
| tail | tailed (forced to state zero) |

In FIG. 22 the performance of different mappings for a throughput of 1 bpt and 0.5 bpt are directly compared (SISO $N_t$=1). Additionally to the previous results, the performance for a rate ¼ code 2240 are shown. This way, asymmetric data rates are achieved rather by having several coding rates than by having several padding rates. Note, that with this method the complexity increases because several different decoders are needed. Additionally a decoder with the same constraint length (K=9) but smaller rate has a slightly higher complexity. For the SISO case the performance with the rate ¼ 2240 code is better than rate ½ 2210, 2220, 2230. Particularly for a throughput of 0.5 bpt, the rate ¼ code 2240 performs significantly better. That is because for $R_c$=¼ iterative decoding does improve the performance further while for rate $R_c$=½ it does not. The performance gap for the different mappings and $R_c$=½ can be explained by looking at Table 4.6.

For the MIMO case as shown in FIG. 29 the picture is not so clear. For 2 bpt the difference is marginal while for 1 bpt the behavior is similar to the SISO case.

For the system setup, it can be seen that SP mappings are well suited for asymmetric data rate communication using different padding rates. This has been shown by means of simulation and by evaluating the introduced metrics. Setting up asymmetric rates by using several coding rates (rather than padding rates) yields in most cases (but not always) a better performance. However, with this method the system complexity is also increased. Overall, the introduced method using different padding rates is a promising low complexity method to efficiently realize asymmetric data rate transmission.

Some embodiments according to the invention relate to an asymmetric data rate transmission using multi-resolution codes (hierarchical codes).

For asymmetric data rate transmission in asymmetric channel conditions codes with multi-resolution 2400 may be used. As shown in FIG. 24, the squares represent 16QAM constellation, which can be fully decoded by the link with good channel (e.g., from RS to BS). However, the receiver at the weak link cannot decode the full 16QAM constellations, but it can distinguish which quadrant the received signal lies. In other words, the receiver at the weak link (e.g. MS) has weak a channel and group the neighboring 16QAM constellation into 4QAM (represented by triangles). So it equivalently decode the constellation represented by the triangles. In the BRC phase of two-way DF relaying systems, the relay XOR the bits using zero-padding. The receiver at strong link can decode all the bits, while the receiver at the weak link can decode only part of the transmitted bits using this code with multi-resolution.

Some embodiments according to the invention relate to modifying the XOR scheme so that it can work well in asymmetric channel conditions and approach the capacity region promised by the Theorem mentioned at the beginning.

Some embodiments according to the invention use symbol mappings for a single antenna. Mappings for a 16-QAM constellation used before are depicted in the Figures described below. The symbols are not normalized. This can be achieved by the multiplication with the factor $$\frac{1}{\sqrt{10}}.$$

FIG. 25 shows a schematic illustration of a natural 2500*a* and a gray mapping 2500*b*.

FIG. 26 shows a schematic illustration of orthogonal set partitioning mappings (SPo) with gray set 2600*a* and anti-gray set 2600*b*.

FIG. 27 shows a schematic illustration of skewed set partitioning mappings (SPs) with gray set 2700*a* and anti-gray set 2700*b*.

FIG. 28 shows a schematic illustration of mapping schemes from "J. H. F. Schreckenbach, N. Gortz and G. Bauch, "Optimized symbol mappings for bit-interleaved coded modulation with iterative decoding," in *Proc. IEEE Global Comm. Conf.* (*GLOBECOM*), San Francisco, Calif., Dec. 1-5, 2003.". FIG. 28*a* corresponds to the M16a mapping 2800*a* and FIG. 28*b* corresponds to the M16r mapping 2800*b*.

Some embodiments according to the invention use symbol mappings for a two antennas. Symbol mappings on two antennas can be considered as mapping the binary data on 2 complex data symbols, i.e., on 4 real dimensions. Data is the decimal representation of the binary data for a label [$b_7$, $b_6$, $b_5$, $b_4$, $b_3$, $b_2$, $b_1$, $b_0$]. The symbol [a, b; c, d] has the signal space representation $$\frac{1}{\sqrt{10}}\begin{pmatrix} 2(a+b\sqrt{-1})-(3+3\sqrt{-1}) \\ 2(c+d\sqrt{-1})-(3+3\sqrt{-1}) \end{pmatrix}. \quad \text{(A.1)}$$

FIG. 45 shows a table of mapping SP4a 4500.

FIG. 46 shows a table of mapping SP4b 4600.

FIG. 47 shows a table of mapping SP4c 4700.

Some embodiments according to the invention relate to coding a modulation for two-way relaying with asymmetric channel quality.

FIG. 29 shows a schematic illustration of a two-way relaying system 2900. The relaying system 2900 comprises a base station 2920 connected to a core network 2910, a relay station 2930 and a mobile station 2940.

The combined signal, which is broadcasted from the relay, needs to be adapted to both channels (relay-base station and relay-UE), which are likely to have different capacity.

For superposition coding an adaptation is possible by different coding and modulation schemes, precoding and power allocation. For conventional XOR relaying, the weaker link determines the data rate also on the stronger link. Capacity on the stronger link is wasted. This may be avoided by using the described concept.

FIG. 30*a* shows a schematic illustration of a two-way relaying system 3000A with an indicated signal noise ratio (SNR) of 20 dB between the base station 2920 and the relay station 2930 and a variable signal noise ratio between the relay station 2930 and the mobile station 2940. In this example CSIR stands for channel state info at receiver RX and CSIT stands for channel state info at transmitter TX.

Fittingly, FIG. 30*b* shows an "average sum rate" versus "signal noise ratio" diagram 3000B. The diagram 3000B shows a slightly better performance of the XOR combining in comparison to the superposition coding. The XOR combining is preferable to superposition coding since no power is subtracted from received signal before decoding, which results in a higher signal noise ratio at the decoder input (see "I. Hammerström, M. Kuhn, C. Esli, J. Zhao, A. Wittneben and G. Bauch, MIMO Two-Way-Relaying with Transmit CSI at the Relay, IEEE Signal Processing Advances in Wireless Communications, SPAWC 2007, Helsinki, Finland, pp. 5, June 2007", "http://www.nari.ee.ethz.ch/wireless/pubs/p/spawc2007").

Some embodiments according to the invention relate to constructing an XOR signal at relay such that data rates on relay-base station and relay-UE links are adapted according to the individual capacities. For this, only the broadcast phase may be considered. In the MAC phase, standard methods for rate adaption may be applied, as for example more subcarriers for weaker link.

Fittingly, FIG. 31 shows a two-way relaying system 3100 illustrating the broadcast phase and the MAC phase.

The conventional scheme faces the problem, that the weaker link during the broadcast phase determines the data rate in both directions. Using the described concept of the invention may avoid this problem. This is schematically shown in FIG. 32.

FIG. 32*a* shows a two-way relaying system 3200A and FIG. 32*b* schematically shows the wasted capacity, if the data rate is determined by the weaker link (indicated by reference numeral 3200B).

Some further embodiments according to the invention relate to zero padding and mapping in combination with bit interleaved coded modulation with iterative decoding. FIG. 33 shows a system model of communication with asymmetric data rates using XOR combining with BICM-ID and 16-QAM constellation. FIG. 33*a* shows the relay station encoding, FIG. 33*b* the mobile station decoding and FIG. 33*c* the base station decoding. FIG. 33 corresponds to FIG. 17 described above.

The relay station may append zeros in order to make code length equal and may use a specific mapping, for example set partitioning or hierarchical modulation.

The mobile station may use the bit determiner, which may be a part of the demapping means 930, to select a subset of a block of the combined digital signal. By selecting a subset the decoding complexity may reduced.

The XOR function may flip the sign of soft demodulated code bits in the case of an one.

Some embodiments according to the invention relate to a smart selection of a mapping constellation. One example is shown in FIG. 34, wherein FIG. 34*a* shows an example for an asymmetric XOR coding corresponding to the example also shown in FIG. 8. Additionally, FIG. 34*a* shows a rectangular set partitioning (SPO) 3400*b* for a single input single output (SISO) system and FIG. 34*c* shows a skewed set partitioning (SPS) 3400*c* for a single input single output system.

$d_m$ indicates the stronger link and $d_b$ indicates the weaker link with two padded zeros for the two most significant bits. The zeros do not change the XOR result $d_r$ and therefore the subset is determined by the first two bits of the stronger link.

For the described example, the subset of bit sequences for a 16-QAM TCM constellation are marked with circles in FIGS. 34*b* and 34*c*. This illustrates, that the Euclidean distance between bit sequences of the subset are large in comparison with other possible constellations like a natural or a gray constellation.

By selecting a constellation with large Euclidean distance for bit sequences of the subset the bit error rate of the weaker link, for example the mobile station, may be significantly reduced.

Figure 35B:
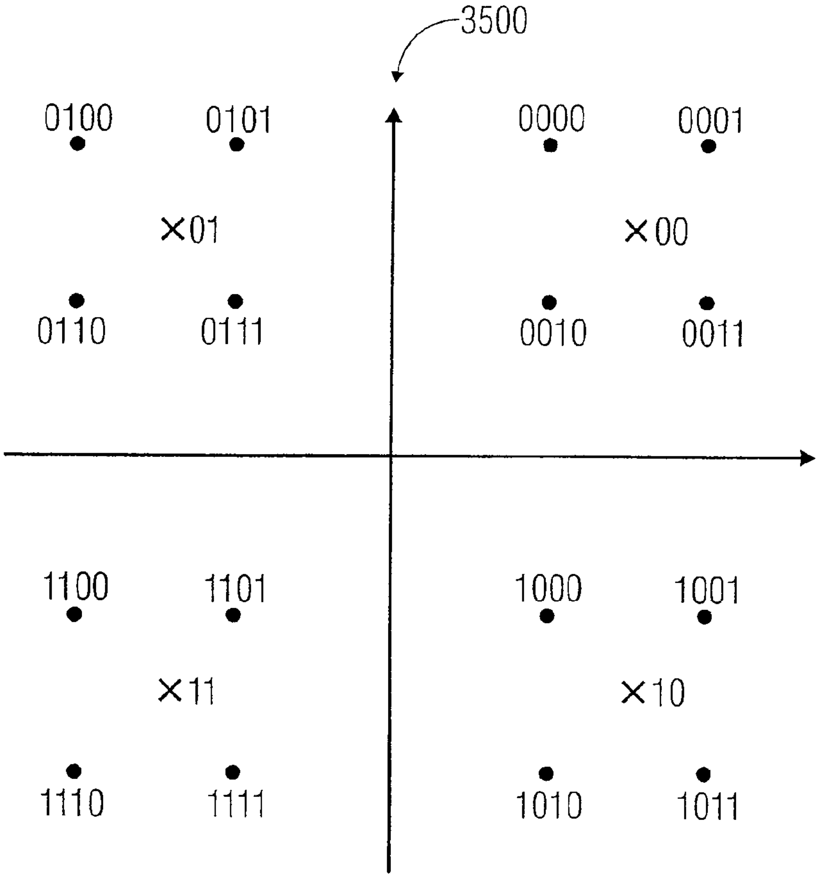

FIG. 35 shows the same asymmetric XOR coding example as before, but with a hierarchical modulation 3500 shown in FIG. 35*b*. Once again, the zeros do not change the XOR result and therefore the subset is determined by the first two bits of the stronger link.

In this example, the constellation points marked with a point (four bits per bit sequence) are transmitted. The quadrature phase shift keying (QPSK) constellation marked with an X (two bits per bit sequence) are detected by the weaker link. An offset may be taken into account as additive noise in the receiver metric.

Some further embodiments according to the invention relate to a labeling technique for multiple input multiple output (MIMO) systems. In this case, the set partitioning may be done in higher dimensional space, for example for two transmit (TX) antennas a four dimensional signal space constellation may be used.

Based on similar principles of set partitioning, the beforementioned SP4a, SP4b and SP4c labeling for the two transmit antenna case are designed.

Some embodiments according to the invention relate to an apparatus for providing a combined digital signal with encoders with different coding rates. FIG. 36 shows a system model of communication with asymmetric data rates using different coding rates at the relay station and a 16-QAM constellation. In this connection, FIG. 36*a* shows the relay station encoding, FIG. 36B the mobile station decoding and FIG. 36C the base station decoding. In principle FIG. 36 corresponds to FIG. 20 mentioned above.

By using different coding rates for the encoders, the block length of the two input signals are made equal.

The XOR function may flip the sign of soft demodulated code bits in the case of an one.

By using iterative decoding (ID) the bit error rate may be reduced.

Some embodiments according to the invention relate to a combination of different coding rates, zero padding and mapping. FIG. 37 shows an example for an encoder at the relay station, wherein FIG. 37*a* shows a pure set partitioning (SP) and FIG. 37*b* shows a mixed scheme for asymmetric data rate transmission. The principle shown in FIG. 37 corresponds to the encoder shown in FIG. 21.

The mixed scheme may allow for accurate adaptation to channel conditions and may be in the spirit of adaptive coding and modulation.

Some further embodiments according to the invention relate to a single input single output (SISO) system or a multiple input multiple output (MIMO) system.

FIG. 38 shows simulation results for bit error rates for different mappings for a SISO system (1×1×1). Decode-and-Forward (DF) relaying is used for the simulations of the two-way-relaying system. FIG. 38*a* shows a "bit error rate" versus "signal noise ratio" diagram 3800A for a bit interleaved coded modulation with iterative decoding for the half rate link (RP=½). For the half rate (relay station to mobile station) both M16A and SP schemes are good ($10^{-6}$: 6.5 dB).

Fittingly, FIG. 38*b* shows the "bit error rate" versus "signal noise ratio" diagram 3800*b* for the full rate link (RP=1). For the full rate (relay station to base station), the set partitioning (SP) schemes ($10^{-6}$: 11 dB) gain 1 dB compared to M16A.

Additionally, FIG. 38*c* shows a schematic illustration of a two-way relaying system 3800C, wherein a terminal A 3810 is connected to the relay station 3820 by the stronger link and the terminal B 3830 connected to the relay station 3820 by the weaker link.

FIG. 39 shows simulation results for bit error rates for different mappings for a MIMO system (2×2×2). FIG. 39*a* shows a "bit error rate" versus "signal noise ratio" diagram 3900A for a bit interleaved coded modulation with iterative decoding for the half rate link (RP=½). For the half rate (relay station to mobile station) SP schemes are good ($10^{-6}$: 5 dB).

Fittingly, FIG. 39*b* shows the "bit error rate" versus "signal noise ratio" diagram 3900*b* for the full rate link (RP=1). For the full rate (relay station to base station), the set partitioning (SP) scheme is also good ($10^{-6}$: 11.5 dB).

Additionally, FIG. 39*c* shows a schematic illustration of a two-way relaying system 3900C, wherein a terminal A 3810 is connected to the relay station 3820 by the stronger link and the terminal B 3830 connected to the relay station 3820 by the weaker link.

FIG. 40 shows simulation results for bit error rates for different mappings for a SISO system. FIG. 40*a* shows a "bit error rate" versus "signal noise ratio" diagram 4000A for a bit interleaved coded modulation with iterative decoding for 1 bit/16QAM transmission (Rx4xRp).

Fittingly, FIG. 40*b* shows the "bit error rate" versus "signal noise ratio" diagram 4000*b* for 2 bit/16QAM transmission.

Different coding rate scheme gains about 2~3 db at $10^{-6}$ compared to pure SP scheme (for transmission to the weaker link).

The term "old" for the pure set partitioning in this case means only that this curves relate to embodiments and simulation results mentioned before. Nevertheless, these curves relate also to the described new concept.

Additionally, FIG. 40*c* shows a schematic illustration of a two-way relaying system 3800C, wherein a terminal A 3810 is connected to the relay station 3820 by the stronger link and the terminal B 3830 connected to the relay station 3820 by the weaker link.

FIG. 41 shows simulation results for bit error rates for different mappings for a SISO system. FIG. 41*a* shows a "bit error rate" versus "signal noise ratio" diagram 4100A for a bit interleaved coded modulation with iterative decoding for 0.5 bit/16QAM transmission.

Fittingly, FIG. 41*b* shows the "bit error rate" versus "signal noise ratio" diagram 4100*b* for 2 bit/16QAM transmission.

Combinations of different coding rates scheme and SP scheme are possible (FIG. 41*a*).

Once again the term "old" for the pure set partitioning in this case means only that this curves relate to embodiments and simulation results mentioned before. Nevertheless, these curves relate also to the described new concept.

Additionally, FIG. 41*c* shows a schematic illustration of a two-way relaying system 4100C, wherein a terminal A 3810 is connected to the relay station 3820 by the stronger link and the terminal B 3830 connected to the relay station 3820 by the weaker link.

Some embodiments according to the invention relate to an XOR-based incorporation of two signals of different rates which contain independent information into one signal which is broadcasted from the relay. Incorporation of those two signals may be done by means of zero padding, specific mappings of bits to signal space constellation points including variants of set partitioning or hierarchical modulation, different code rates or a combination of the methods above.

Some further embodiments according to the invention relate to a set partitioning mapping for higher dimensional signal space, for example for multiple input multiple output systems (MIMO).

Some embodiments according to the invention relate to receivers for methods described above. These receivers may be iterative receivers.

Some further embodiments according to the invention relate to the field of wireless transmission via relay. An applicable system may be a bi-directional communication in a wireless communication system with relay. The relay may be used for coverage and capacity extension. An XOR-based two-way relaying may be adapted to the case of unequal channel quality for relay-based base station and relay-terminal channels.

The described concept avoids that the rate in the uplink and downlink is limited by the capacity of the weaker link.

Using the described concept may yield in higher user satisfaction by higher throughput and low delay at relatively low infrastructure cost. The coverage may be extended with low cost relays. An efficient use of the spectrum in the case of unequal channel quality of node B-relay link and relay-UE link may be realized. Additionally, a complexity reduction for the receiver of the weaker link (for example the terminal in downlink transmission) may by reached.

Some embodiments according to the invention relate to a novel and practical scheme to transmit asymmetric data rate in the BRC phase of two-way DF relaying systems when the XOR scheme is applied. Similar as in "T. J. Oechtering, C. Schnurr, I. Bjelakovic, and H. Boche, "Broadcast capacity region of two-phase bidirectional relaying," *IEEE Trans. Inform. Theory*, vol. 54, no. 1, pp. 454-458, January 2008." and in "R. F. Wyrembelski, T. J. Oechtering, I. Bjelakovic, C. Schnurr, and H. Boche, "Capacity of Gaussian MIMO bidirectional broadcast channels," in *IEEE Int. Symposium on Inf. Theory*, Toronto, Canada, July 2008, pp. 584-588.", it is assumed that each receiving terminal has perfect knowledge about the message that is intended for the other terminal. That is, the constraint of the MAC phase are left aside and it is assumed that the relay perfectly decodes what it receives in the MAC phase. It is shown that the transmit symbol constellation (signal labeling) design is important for the performance. The case that the XOR-ed bits are modulated using QAM or PSK modulations and retransmitted in the BRC phase is considered. Each receiving terminal knows the bits intended for the other terminal. Based on this a priori information, the receiver of the weaker link just need to decode a subset on the signal constellation. Thus the BER performance of the weaker link terminal can be greatly improved.

Some further embodiments according to the invention relate to zero padding XOR. Two asymmetric bit streams, i.e. two bit streams of different (block) lengths, are transformed to two bit streams of equal length by padding zeros to the shorter stream. The resulting two bit streams of equal length are combined using the XOR operation. This may extend the information theoretical rate regions that are achieved for the symmetric XOR approach. In a practical approach the station that not padded the zeros can take advantages from the zero padding. If it knows the positions of the inserted zeros, it knows a priori the bits that it should receive at those positions because there are its own bits back-propagated as self-interference.

Some embodiments according to the invention relate to a Practical extension by using modulation/mapping (set partitioning). Using a certain labelling described below it is possible to improve the Euclidean distance of the transmission of the bit stream that showed the lower length before zero padding based on the a priori known bits as described above. For the MIMO case a new sort of set partitioning is given that shows a very good performance in the 2×2×2 MIMO relaying case.

Some further embodiments according to the invention relate to a Practical extension by using modulation/mapping. Another option is to use a modulation similar to hierarchical modulation. Example: Four bits are mapped to a 16QAM symbol. One station A has no a priori knowledge of these four bits, the other station B knows a priori two of the four bits per 16QAM symbol. B is decoding: The not a priori known bits give the quadrant of the 16QAM constellation. The known two bits give only the mapping in the quadrant. And, as the Euclidean distances in one quadrant are known, they can be used in the decoding metric (e.g. additional noise of known variance).

Some embodiments according to the invention relate to a Practical extension by using two channel encoders of different coding rates. At the relay, the asymmetric uncoded bit streams are encoded by two encoders of different coding rates. The rates are chosen such that the two coded bit streams have the same length. These streams are combined using the XOR operation. To cancel the self-interference prior to decoding, the receivers have to encode their own data message using the same encoders that the relay was using. Then they cancel the self-interference by XOR-ing this encoded data stream and the received sequence.

Some further embodiments according to the invention relate to a Practical extension by using a combination of modulation/mapping (set partitioning) and two channel encoders of different coding rates: The choice of the mapping depends on the type of channel code. E.g. in case of a strong convolutional code the chosen set partitioning (cf. FIG. 18) shows a good performance while for a weaker convolutional code the mapping M16a (see “J. H. F. Schreckenbach, N. Gortz and G. Bauch, “Optimized symbol mappings for bit-interleaved coded modulation with iterative decoding,” in *Proc. IEEE Global Comm. Conf.* (*GLOBECOM*), San Francisco, Calif., Dec. 1-5, 2003.”) is better suited. For strong turbo codes the standard Gray Mapping is a good choice.

Some embodiments according to the invention relate to schemes using set partitioning (SP), two different encoding rates or combination of both as preferred solutions.

Some further embodiments according to the invention relate to methods, wherein two signals of different rates are mapped to one signal using a certain modulation scheme (set partitioning), two channel encoders of different coding rates or combinations thereof.

Some embodiments according to the invention relate to a new method of set partitioning for the MIMO case shown in FIGS. 45, 46 and 47.

FIG. 42 shows a flow chart of a method 4200 for providing a combined digital signal according to an embodiment of the invention. The combined digital signal contains information of a first digital input signal and a second digital input signal, wherein a block length of the first digital input signal is shorter than a block length of the second digital input signal. The method 4200 comprises adding 4210 at least one filling bit to a block of the first digital input signal to obtain an adapted first digital input signal, combining 4220 the adapted first digital input signal and the second digital input signal to obtain the combined digital signal and providing 4230 the obtained combined digital signal.

The addition 4210 of at least one filling bit to the block of the first digital input signal is done, so that the block length of the adapted first digital input signal is equal to the block length of the second digital input signal.

FIG. 43 shows a flow chart of a method 4300 for providing a combined digital signal according to an embodiment of the invention. The combined digital signal contains information of a first digital input signal and a second digital input signal, wherein a block length of the first digital input signal is shorter than a block length of the second digital input signal. The method 4300 comprises providing 4310 a first encoded digital signal, providing 4320 a second encoded digital signal, combining 4330 the first encoded digital signal and the second encoded digital signal to obtain the combined digital signal and providing 4340 the obtained combined digital signal.

The first encoded digital signal is provided based on the first digital input signal with a first coding rate and the second encoded digital signal is provided based on the second digital input signal with a second coding rate.

A ratio of the first coding rate and the second coding rate is selected, so that a block length of the first encoded digital signal is equal to a block length of the second encoded digital signal.

FIG. 44*a* shows a flow chart of a method 4400 for providing a separated digital signal based on a combined digital signal according to an embodiment of the invention. The combined digital signal contains information of a known digital signal and an unknown digital signal, wherein a block of the combined digital signal comprises a bit associated with a bit to be decoded of the unknown digital signal and a bit associated with a filling bit of the unknown digital signal. The method 4400 comprises determining 4410 the bit of the block of the combined digital signal associated with the bit to be decoded of the unknown digital signal, separating 4420 the bit to be decoded of the unknown digital signal from the combined digital signal to obtain the separated digital signal and providing 4430 the obtained separated digital signal.

The bit of the block of the combined digital signal associated with the bit to be decoded of the unknown digital signal is determined based on a bit significance information. Further, the bit to be decoded of the unknown digital signal is separated from the combined digital signal based on the known digital signal.

FIG. 44*b* shows a flow chart of a method 4450 for providing a separated digital signal based on a combined digital signal according to an embodiment of the invention. The combined digital signal contains information of a known digital signal and an unknown digital signal, wherein a block length of the known digital signal is shorter than a block length of the combined digital signal. The method comprises adding 4460 at least one filling bit to a block of the known digital signal to obtain an adapted known digital signal, separating 4470 the unknown digital signal from the combined digital signal and providing 4480 the separated digital signal.

Adding 4460 at least one filling bit to a block of the known digital signal to obtain an adapted known digital signal is done, so that the block length of the adapted known digital signal is equal to the block length of the combined digital signal.

The unknown digital signal is separated from the combined digital signal based on the known digital signal to obtain the separated digital signal.

Some embodiments according to the invention relate to an apparatus for providing a combined digital signal comprising a first bit interleaver and a second bit interleaver, wherein the first bit interleaver is configured to interleave the first digital input signal, and wherein the second bit interleaver is configured to interleave the second digital input signal, wherein the first encoder, the second encoder, the first bit interleaver and the second bit interleaver are configured to encode and interleave the first uncoded digital input signal and the second uncoded digital input signal based on a bit interleaved code modulation.

Some further embodiments according to the invention relate to a wireless communication system comprising a relay station, a first terminal and a second terminal.

The relay station comprises an apparatus for providing a combined digital signal, wherein the relay station is configured to transmit the combined digital signal to a first terminal and a second terminal.

The first terminal is configured to transmit a first transmission signal to the relay station containing the information of the first digital input signal.

The second terminal comprises an apparatus for providing a separated digital signal, wherein the separated digital signal corresponds to the first digital input signal, wherein the second terminal is configured to transmit a second transmission signal to the relay station containing the information of the second digital input signal and configured to receive the combined digital signal from the relay station.

Some embodiments according to the invention relate to a wireless communication system, wherein the relay station comprises a mapping means, wherein a mapping constellation is selected based on an Euclidean distance, a resulting bit error rate of the first terminal and a resulting bit error rate of the second terminal.

Some further embodiments of the invention relate to a wireless communication system, wherein the wireless communication system is a single input single output system or a multiple input multiple output system.

Some embodiments according to the invention relate to an apparatus for providing a modulated signal for a multiple input multiple output system, wherein the mapping means is configured to use one of the mapping constellations shown in FIG. 45, 46 or 47.

Some further embodiments of the invention relate to an apparatus for providing a separated digital signal based on a combined digital signal, wherein the filling bit is not considered for the separation of the separated digital signal from the combined digital signal.

Some embodiments of the invention relate to an apparatus for providing a separated digital signal based on a combined digital signal, wherein a bit error rate of the separated digital signal is reduced based on the filling bit.

Some further embodiments of the invention relate to an apparatus for providing a combined digital signal according, wherein the bit adder is configured to add the same filling bit to a plurality of blocks of the first digital input signal.

Some embodiments of the invention relate to an apparatus for providing a combined digital signal comprising a first encoder and a second encoder, wherein the first encoder provides the first digital input signal based on a first uncoded digital input signal, and wherein the second encoder provides the second digital input signal based on a second uncoded digital input signal.

Some further embodiments of the invention relate to an apparatus for providing a combined digital signal according, wherein the first encoder comprises a first coding rate and the second encoder comprises a second coding rate, wherein the first coding rate and the second coding rate are unequal.

Most of the above described embodiments show a weaker link between a relay station and a mobile station and a stronger link between the relay station and a base station, but it may also be the other way around.

In the present application, the same reference numerals are partly used for objects and functional units having the same or similar functional properties.

In particular, it is pointed out that, depending on the conditions, the inventive scheme may also be implemented in software. The implementation may be on a digital storage medium, particularly a floppy disk or a CD with electronically readable control signals capable of cooperating with a programmable computer system so that the corresponding method is executed. In general, the invention thus also consists in a computer program product with a program code stored on a machine-readable carrier for performing the inventive method, when the computer program product is executed on a computer. Stated in other words, the invention may thus also be realized as a computer program with a program code for performing the method, when the computer program product is executed on a computer.

The invention claimed is:

1. Apparatus for providing a modulated signal based on a combined digital signal, wherein the combined digital signal contains information of a first digital input signal and a second digital input signal, wherein a block length of the first digital input signal is shorter than a block length of the second digital input signal, comprising:

a bit adder configured to add at least one filling bit to a block of the first digital input signal to obtain an adapted first digital input signal, so that the block length of the adapted first digital input signal is equal to the block length of the second digital input signal;

a combiner configured to combine the adapted first digital input signal and the second digital input signal to obtain and provide the combined digital signal; and a mapper connected to the combiner and configured to generate a complex symbol for a block of the combined digital signal based on a selected mapping constellation to obtain and provide the modulated signal.

2. Apparatus for providing a modulated signal based on a combined digital signal according to claim 1, wherein the combiner is configured to combine a bit of the adapted first digital input signal and a bit of the second digital input signal based on an XOR function.

3. Apparatus for providing a modulated signal based on a combined digital signal according to claim 1, wherein the bit adder is configured to add a filling bit, wherein a value of the filling bit is always zero.

4. Apparatus for providing a modulated signal based on a combined digital signal according to claim 1, comprising a first encoder and a second encoder, wherein the first encoder is connected to the bit adder and provides the first digital input signal based on a first uncoded digital input signal, and wherein the second encoder is connected to the combiner and provides the second digital input signal based on a second uncoded digital input signal, wherein the first encoder comprises a first coding rate and the second encoder comprises a second coding rate, wherein the first coding rate and the second coding rate are unequal.

5. Apparatus for providing a modulated signal according to claim 1 wherein the mapper is configured to generate the complex symbol based on a selected mapping constellation, wherein the mapping constellation is selected based on an Euclidean distance between bit sequences of the mapping constellation, wherein the bit sequence comprise the same value of a bit at a bit position equal to a bit position of a filling bit.

6. Apparatus for providing a modulated signal based on a combined digital signal, wherein the combined digital signal contains information of a first digital input signal and a second digital input signal, wherein a block length of the first digital input signal is shorter than a block length of the second digital input signal, comprising:

a first encoder comprising a first coding rate and is configured to provide a first encoded digital signal based on the first digital input signal;

a second encoder comprising a second coding rate and is configured to provide a second encoded digital signal based on the second digital input signal, wherein a ratio of the first coding rate and the second coding rate is selected, so that a block length of the first encoded digital signal is equal to a block length of the second encoded digital signal; and a combiner configured to combine the first encoded digital signal and the second encoded digital signal to obtain and provide the combined digital signal; and a mapper connected to the combiner and configured to generate a complex symbol for a block of the combined digital signal based on a selected mapping constellation to obtain and provide the modulated signal.

7. Method for providing a modulated signal based on a combined digital signal, wherein the combined digital signal contains information of a first digital input signal and a second digital input signal, wherein a block length of the first digital input signal is shorter than a block length of the second digital input signal, comprising:

adding at least one filling bit to a block of the first digital input signal to obtain an adapted first digital input signal, so that the block length of the adapted first digital input signal is equal to the block length of the second digital input signal;

combining the adapted first digital input signal and the second digital input signal to obtain the combined digital signal;

generating a complex symbol for a block of the combined digital signal based on a selected mapping constellation to obtain and provide the modulated signal; and providing the modulated signal.

8. Computer program with a program code for performing the method according to claim 7, when the computer program runs on a computer or a microcontroller.

* * * * *